(12) United States Patent
Kubota et al.

(10) Patent No.: US 7,250,935 B2
(45) Date of Patent: Jul. 31, 2007

(54) FORCE-FEEDBACK SUPPLY APPARATUS AND IMAGE CORRECTING METHOD

(75) Inventors: Akira Kubota, Matsumoto (JP); Shigemi Sato, Asahi-mura (JP)

(73) Assignee: Seiko Epson Corporation (JP)

( * ) Notice: Subject to any disclaimer, the term of this patent is extended or adjusted under 35 U.S.C. 154(b) by 655 days.

(21) Appl. No.: 10/747,816

(22) Filed: Dec. 29, 2003

(65) Prior Publication Data

US 2004/0174337 A1    Sep. 9, 2004

(30) Foreign Application Priority Data

Dec. 27, 2002    (JP)    ............................. 2002-382473

(51) Int. Cl.
  *G09G 5/00*    (2006.01)
(52) U.S. Cl. .......................................... 345/156; 345/8
(58) Field of Classification Search ........ 345/156–168, 345/7–8; 715/701, 702, 773; 414/5
   See application file for complete search history.

(56) References Cited

U.S. PATENT DOCUMENTS

| | | | | |
|---|---|---|---|---|
| 5,577,981 | A * | 11/1996 | Jarvik | 482/4 |
| 5,803,738 | A * | 9/1998 | Latham | 434/29 |
| 5,977,935 | A * | 11/1999 | Yasukawa et al. | 345/8 |
| 5,980,256 | A * | 11/1999 | Carmein | 434/55 |
| 6,065,338 | A * | 5/2000 | Stoiber et al. | 73/462 |
| 6,310,604 | B1 * | 10/2001 | Furusho et al. | 345/156 |
| 6,413,229 | B1 * | 7/2002 | Kramer et al. | 600/595 |
| 6,497,672 | B2 * | 12/2002 | Kramer | 600/595 |
| 6,885,316 | B2 * | 4/2005 | Mehring | 341/21 |
| 6,979,164 | B2 * | 12/2005 | Kramer | 414/5 |
| 2002/0021277 | A1 * | 2/2002 | Kramer et al. | 345/156 |
| 2004/0024287 | A1 * | 2/2004 | Patton et al. | 600/27 |
| 2006/0092162 | A1 * | 5/2006 | Deering et al. | 345/506 |

FOREIGN PATENT DOCUMENTS

| | | |
|---|---|---|
| JP | 06-324622 | 11/1994 |
| JP | 2000-099240 | 4/2000 |
| JP | 2000-246674 | 9/2000 |

* cited by examiner

*Primary Examiner*—Ricardo Osorio
(74) *Attorney, Agent, or Firm*—Harness, Dickey & Pierce, P.L.C.

(57) ABSTRACT

A force-feedback supply apparatus and an image correcting method are provided in which sites to which a force-feedback is supplied can be properly displayed in accordance with a virtual reality image by correcting the virtual reality image in consideration of a thickness of a force-feedback supply section. In the force-feedback supply apparatus and an image correcting method, joint angles of a force-feedback supply means when a user's hand and fingers are at a reference posture and at a real grasp position are detected by means of encoders arranged in joint sections, positions of the user's fingertips at each posture are calculated on the basis of the detection data, the joint angles at a virtual grasp position are calculated, quantity of deviation in the joint angles between the real grasp position and the virtual grasp position is calculated, and a conversion rule for correcting the virtual reality image is determined on the basis of the quantity of deviation.

25 Claims, 27 Drawing Sheets

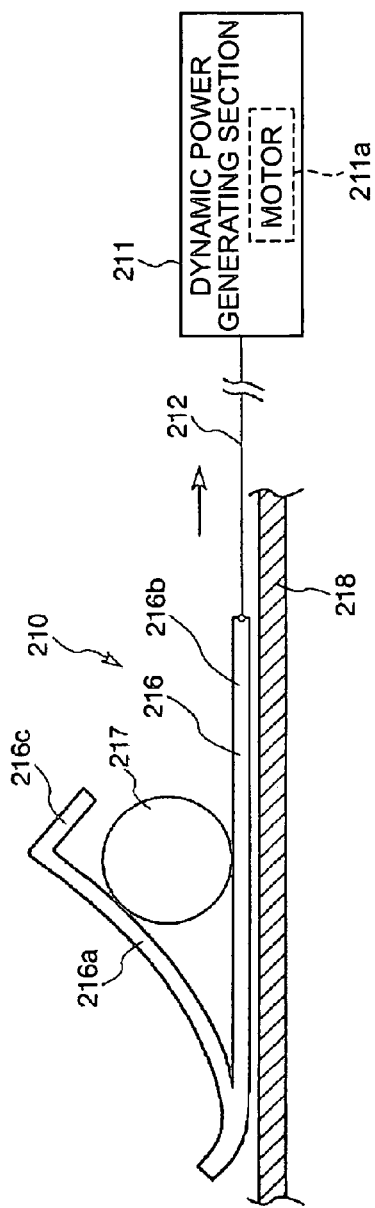
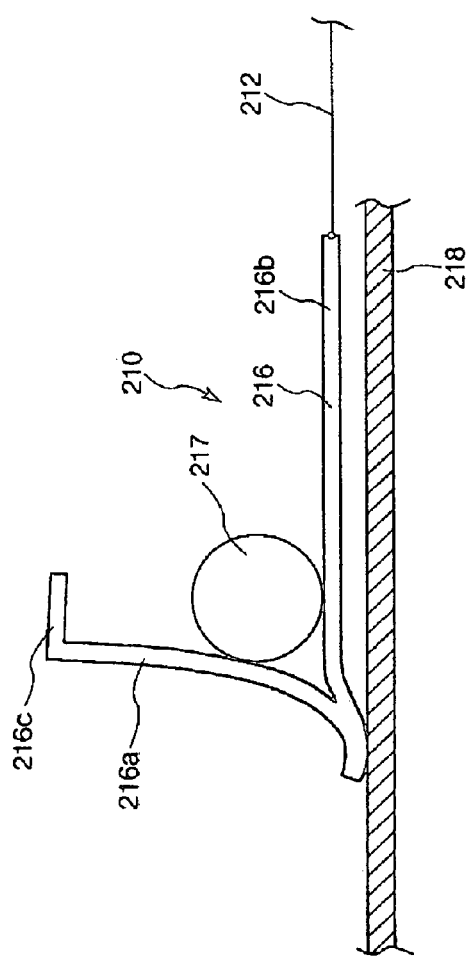
FIG. 14A
FIG. 14B

FORCE-FEEDBACK SUPPLY APPARATUS AND IMAGE CORRECTING METHOD

BACKGROUND OF THE INVENTION

1. Technical Field of the Invention

The present invention relates to a force-feedback supply apparatus and an image correcting method in the force-feedback supply apparatus, and more specifically to a force-feedback supply apparatus and an image correcting method in the force-feedback supply apparatus used for a virtual reality system.

2. Description of the Related Art

As conventional force-feedback supply apparatuses, a force-feedback supply apparatus using actuators such as motors and clutches (for example, see Japanese Unexamined Patent Application Publication No. 2000-246674), a force-feedback supply apparatus using fluids such as air or liquid (for example, see Japanese Unexamined Patent Application Publication No. 2000-99240), a force-feedback supply apparatus using wires and electric motors reeling the wires (for example, see Japanese Unexamined Patent Application Publication No. 6-324622), and so on are disclosed. Each of these express interactions between an operator and a target object using elasticity and viscosity.

However, in a case where force-feedback supply sections are mounted to cover sites (for example, fingertips, etc.) to which the force-feedback is supplied as in the conventional force-feedback supply apparatus described in Japanese Unexamined Patent Application Publication No. 2000-99240 or Japanese Unexamined Patent Application Publication No. 6-324622, when positions of the sites are detected to fetch the sites in a virtual reality image, there is a problem that in consideration of volumes or thicknesses thereof, the sites should be displayed in a virtual reality space.

That is, in the conventional force-feedback supply apparatus, since the virtual reality image is generated and displayed without consideration of the thickness or the like of the force-feedback supply section, when it is intended that a target object thinner than the thickness of the force-feedback supply section in the virtual reality space, for example, a paper, etc. is gripped (grabbed), there are disadvantages that the virtual reality image cannot be properly displayed by using the positional information of the fingertips actually detected (that is, it cannot be displayed to grasp the paper with the fingertips), and the interactions between the sites and the target objects cannot be supplied (that is, since it cannot be judged that the sites interfere with the target object, a force-feedback suitable for the target object cannot be supplied).

Therefore, it is an object of the present invention to provide a feedback supply apparatus and an image correcting method, in which a site to which a force-feedback is supplied can be properly displayed in accordance with a virtual reality image by correcting a virtual reality image in consideration of a thickness of the site to which the force-feedback is supplied in a virtual reality space.

SUMMARY

In order to provide the above object, as an aspect of the present invention, a force-feedback supply apparatus of the present invention comprises: image generating means for generating a virtual reality image; display means for displaying the virtual reality image generated by the image generating means; force-feedback generating means for generating a force-feedback to be supplied to a user's finger in accordance with the virtual reality image; force-feedback supply means mounted on the finger for supplying the force-feedback generated by the force-feedback generating means to the finger; and image correcting means for correcting the virtual reality image generated by the image generating means, such that when a fingertip mounted with the force-feedback supply means comes in contact with a target object, the quantity of deviation corresponding to a thickness of the force-feedback supply means is removed from the virtual reality image displayed by the display means.

According to the force-feedback supply apparatus of the present invention, the virtual reality image generated by the image generating means is corrected to remove the quantity of deviation corresponding to the thickness of the force-feedback supply means mounted on the user's fingertip, so that when the force-feedback generated by the force-feedback generating means is supplied to the user's finger through the force-feedback supply means, it is displayed by the display means that the user's fingertip is in contact with the target object in the virtual reality space.

Further, a force-feedback supply apparatus according to another embodiment of the present invention comprises: image generating means for generating a virtual reality image; display means for displaying the virtual reality image generated by the image generating means; force-feedback generating means for generating a force-feedback to be supplied to a user's finger in accordance with the virtual reality image; force-feedback supply means mounted on the finger for supplying the force-feedback generated by the force-feedback generating means to the finger; and image correcting means for correcting the virtual reality image generated by the image generating means, such that when two fingertips mounted with the force-feedback supply means come in contact with each other, the quantity of deviation corresponding to a thickness of the force-feedback supply means is removed from the virtual reality image displayed by the display means.

According to this force-feedback supply apparatus, the same operation is exhibited also in a case where the user's two fingertips contact (interfere) with each other, other than the aforementioned case where the user's fingertip and the target object in the virtual reality space contact (interfere) with each other.

Therefore, according to the force-feedback supply apparatus of the present invention, without influence of the thickness (bias) of the force-feedback supply section mounted on the user's fingertip, etc. in the virtual reality space, natural states such as positions and postures of the user can be expressed.

Here, the display means may display an indication, for example, a message to the user, such that the virtual reality image is corrected by the image correcting means when the force-feedback supply means is first mounted on the user, or in the force-feedback supply apparatus of the present invention, the indication may be supplied to the user by using voices. It is also preferable that the force-feedback supplied by the force-feedback supply means corresponds to reaction force from the target object in the virtual reality image.

Furthermore, it is preferable that in consideration of interference in a real space, the two fingers are a user's thumb and any one of the remaining fingers other than the thumb, and one of the two fingertips whose virtual reality image is corrected is any one of the fingers other than the thumb.

Here, it is preferable that a position detecting means for detecting a position of the finger mounted with the force-feedback supply means in the virtual reality space is further comprised, and the image correcting means removes the quantity of deviation corresponding to the thickness of the force-feedback supply means on the basis of positional information of the two fingertips detected by the position detecting means.

In this case, the position detecting means may detect positions of the fingertips in the virtual reality space, in a state where the two fingertips of the user mounted with the force-feedback supply means are at a reference posture, and the image correcting means may correct the virtual reality image on the basis of relative positional information of positions of the two fingertips when the two fingertips are in contact with each other and positions of the two fingertips at the reference posture, and relative positional information of positions of the two fingertips when the quantity of deviation corresponding to the thickness of the force-feedback supply means is removed and the positions of the two fingertips at the reference posture, such that a position of one fingertip of the two fingertips in the virtual reality space is a position proportionally expanded from a position of the other fingertip between the position at the reference posture and the contact position when the quantity of deviation corresponding to the thickness of the force-feedback supply means is removed. Here, it is preferable that the reference posture is a posture where the user spreads his hand.

In an embodiment of the present invention, the image correcting means may correct the virtual reality image by offsetting the quantity of deviation corresponding to the thickness of the force-feedback supply means.

Furthermore, in another embodiment of the present invention, the force-feedback supply means may comprise an arm section having a plurality of links and a plurality of joints for connecting the links, a force-feedback supply section mounted on the finger, and a connecting section for connecting the arm section and the force-feedback supply section to each other, and the force-feedback generating means may comprise a plurality of actuators which are motors arranged in each of the plurality of joints.

In this case, the position detecting means may detect the position of the fingertip by detecting respective rotational angles of the plurality of motors by means of a plurality of encoders connected to output shafts of the plurality of motors. In addition, the force-feedback supply apparatus of the present invention may further comprise interference judging means for judging whether the finger interferes with the target object or not, on the basis of the positional information of the finger detected by the position detecting means in the virtual reality space and positional information of the target object predetermined in the virtual reality space, and calculating means for when it is judged by the interference judging means that the finger interferes with the target object, calculating an operating force to be supplied to the finger on the basis of physical property data and state-quantity data of the target object, and the force-feedback generating means may generate a force-feedback to be supplied to the user's fingertip by the force-feedback supply means on the basis of the calculation result of the calculating means.

Furthermore, the force-feedback supply apparatus of the present invention may further comprise movement restricting means for restricting movement of the force-feedback supply means in a predetermined direction, a clutch mechanism for switching activation/inactivation of the movement restricting means, and judging means for judging whether the operating force calculated by the calculating means is more than a threshold value for causing a predetermined reaction or not, and the clutch mechanism may activate or inactivate the movement restricting means by switching its on/off on the basis of the judgment result of the judging means.

Furthermore, it is preferable that the force-feedback supply apparatus of the present invention further comprises memory means for storing at least positional information data of the target object, the physical property data, and the state-quantity data. Furthermore, it is also preferable that the image generating means updates the virtual reality image at a predetermined time interval on the basis of the positional information of the finger detected by the position detecting means in the virtual reality space, and the display means continuously displays the virtual reality image updated with movement of the finger. Furthermore, the display means may be mounted on a face for use.

Furthermore, in order to solve the above object, as another aspect of the present invention, an image correcting method of the present invention is an image correcting method of a force-feedback supply apparatus, comprising generating a virtual reality image, displaying the generated virtual reality image, generating a force-feedback to be supplied to a user's finger in accordance with the virtual reality image, and supplying the force-feedback to the finger through a force-feedback supply section mounted on the finger, wherein the virtual reality image is corrected, such that the quantity of deviation corresponding to a thickness of the force-feedback supply section is removed to bring the fingertip into contact with a target object in the virtual reality image displayed when the user's fingertip mounted with the force-feedback supply section comes in contact with the target object.

Or, the virtual reality image may be corrected, such that the quantity of deviation corresponding to a thickness of the force-feedback supply section is removed to bring two fingertips into contact with each other in the virtual reality image displayed when the user's two fingertips mounted with the force-feedback supply section come in contact with each other.

According to the image correcting method of the present invention, without influence of the thickness of the force-feedback supply section mounted on the user's fingertip, etc. in the virtual reality space, natural states such as positions and postures of the user can be expressed.

Furthermore, in the image correcting method of the present invention, it is preferable that a position of the user's finger mounted with the force-feedback supply section in the virtual reality space is detected, and the virtual reality image is corrected to remove the quantity of deviation corresponding to the thickness of the force-feedback supply section on the basis of the detected positional information of the fingertip. As a result, it is possible to accurately detect the position of the user's fingertip in the virtual reality space and to remove the quantity of deviation corresponding to the thickness of the force-feedback supply section on the basis thereof, and similarly to the above description, without influence of the thickness of the force-feedback supply section mounted on the user's fingertip, etc. in the virtual reality space, natural states such as positions and postures of the user can be expressed.

In this case, positions of the user's two fingertips in the virtual reality space are detected in a state where the user's two fingertips mounted with the force-feedback supply section are at a reference posture, positions of the two fingertips in a state where the two fingertips are in contact with each other are detected, positions of the two fingertips in the virtual reality space when the quantity of deviation corresponding to the thickness of the force-feedback supply section is removed are calculated on the basis of the positional information in a state where the two fingertips are in contact with each other, and the virtual reality image may be corrected on the basis of relative positional information of the positions of the two fingertips at the reference posture and the positions of the two fingertips in a state where the two fingertips are in contact with each other or the calculated positions of the two fingertips, such that a position of one fingertip of the two fingertips in the virtual reality space is a position proportionally expanded from a position of the other fingertip between the position at the reference posture and the contact position when the quantity of deviation corresponding to the thickness of the force-feedback supply section is removed.

Furthermore, a position of one fingertip of the two fingertips to be displayed in the virtual reality image may be corrected by offsetting the quantity of deviation corresponding to the thickness of the force-feedback supply section.

BRIEF DESCRIPTION OF THE DRAWINGS

FIG. 14 is a longitudinal sectional view illustrating a constructional example of a tactual sense generating section of a force-feedback supply apparatus according to a second embodiment.

DETAILED DESCRIPTION

Now, a force-feedback supply apparatus and an image correcting method according to the present invention will be described in detail in accordance with preferred embodiments shown in the appended drawings. The present invention should not be limited to the following embodiments.

Figure 1:
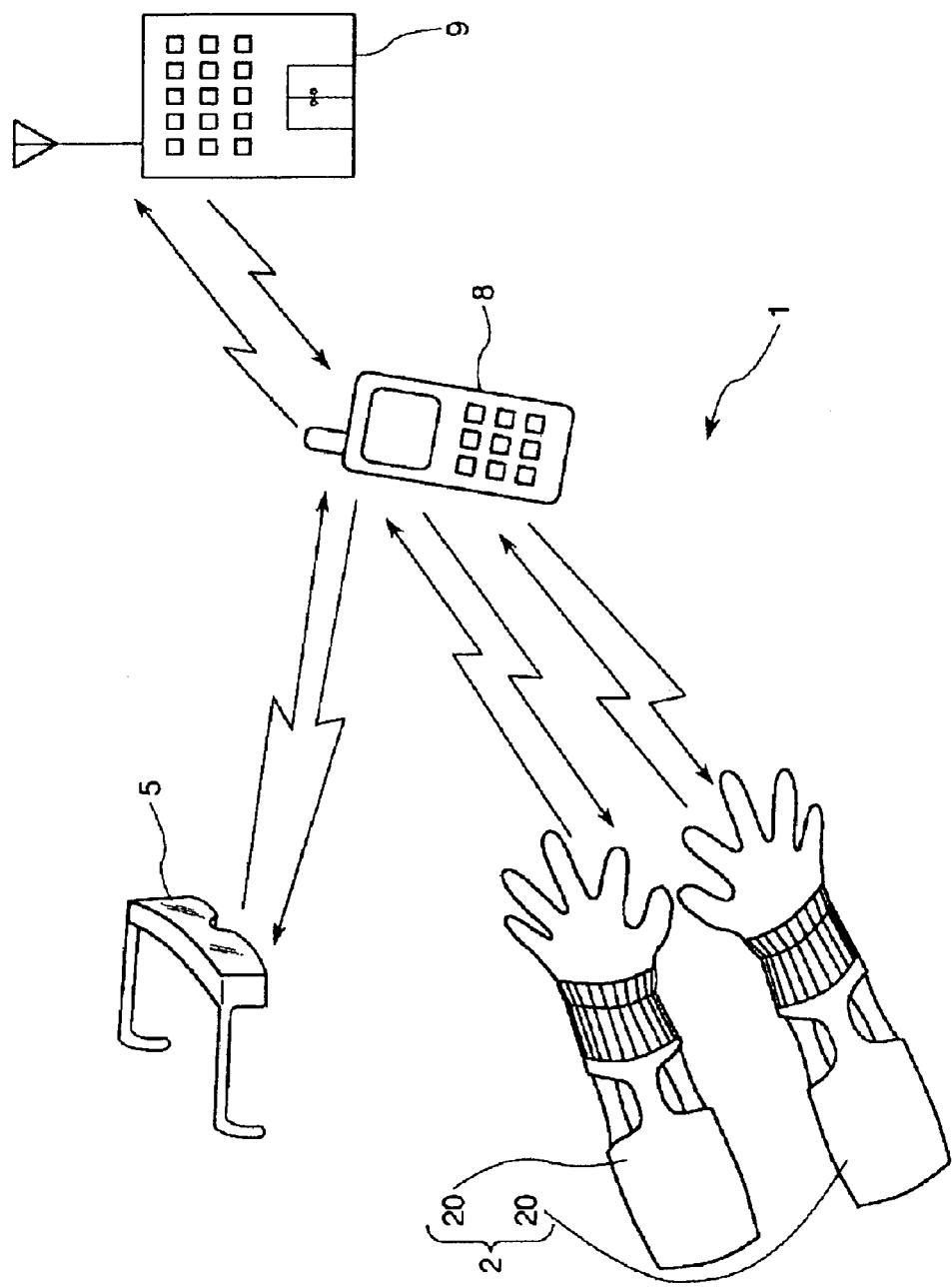
FIG. 1 is a conceptual diagram illustrating a constructional example of a first embodiment of a force-feedback supply apparatus according to the present invention and a force-feedback supply system having the force-feedback supply apparatus.
Figure 2:
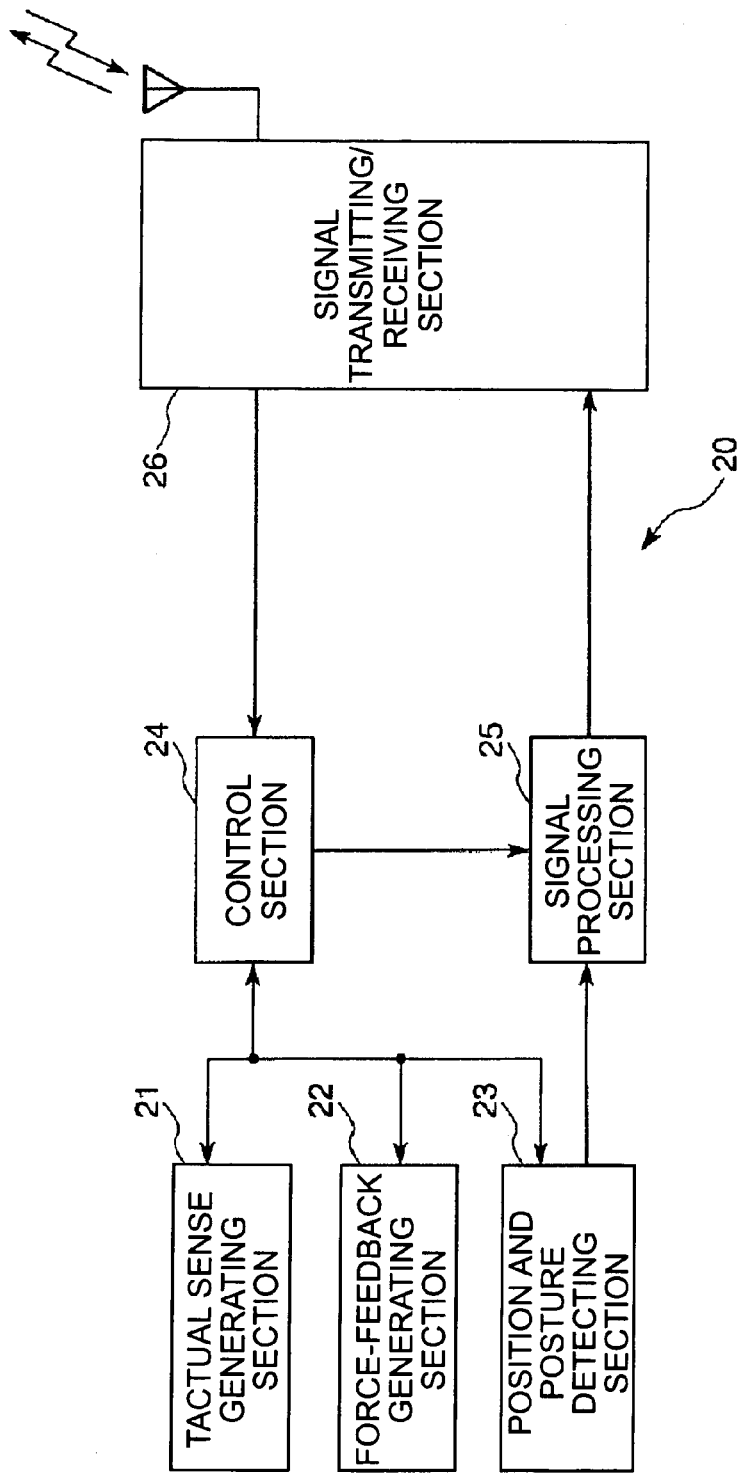
FIG. 2 is a block diagram illustrating an example of a circuit construction of a real glove shown in FIG. 1.
Figure 3:
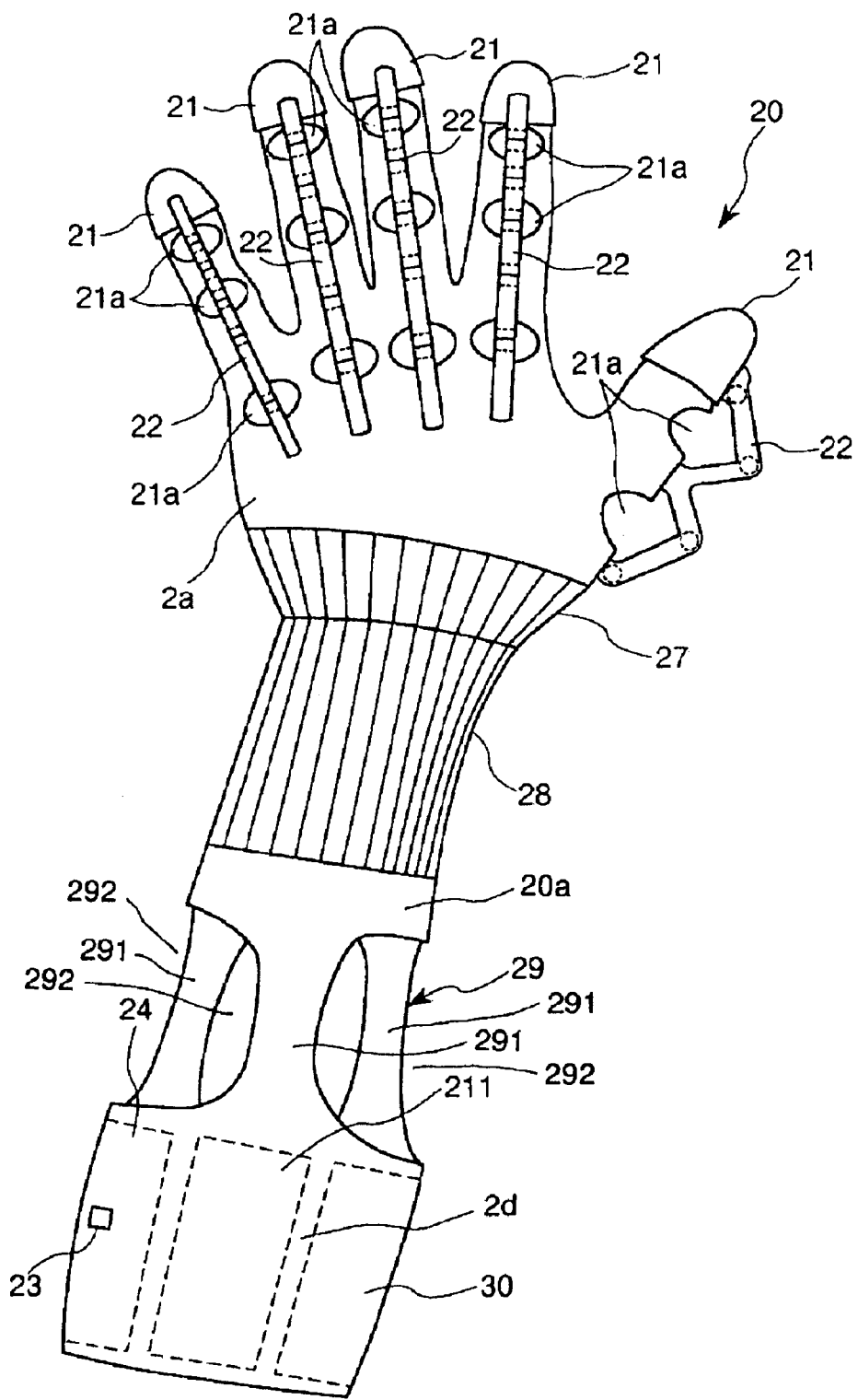
FIG. 3 is an outer view (in which some parts are omitted) illustrating an example of an outer construction of the real glove shown in FIG. 1.

FIG. 1 is a conceptual diagram illustrating a constructional example of a first embodiment of a force-feedback supply apparatus of the present invention and a force-feedback supply system having the force-feedback supply apparatus, FIG. 2 is a block diagram illustrating a constructional example of circuits of a real glove (a force-feedback supply apparatus) shown in FIG. 1, and FIG. 3 is an outer view (in which some parts are omitted) illustrating an outer constructional example of the real glove shown in FIG. 1.

As shown in FIG. 1, a force-feedback supply system 1 comprises a pair of real gloves (data gloves) 20, 20 which are mounted on user's hands (fingers) and present a tactual sense (a sense of touch by a hand, for example, distribution of a texture, a shape, contact intensity such as a strength) or a force-feedback (a sense of force applied when touched by a hand) to the hands or fingers, a virtual reality display device (a display device) 5 for displaying a virtual reality image, an information processing means 8 for performing various processes such as a drive control of the real gloves 20 and the virtual reality display device 5, and a base station 9 for preparing the virtual reality image and providing various services using the virtual reality image.

The respective real gloves 20, the virtual reality display device 5, the information processing means 8 and the base station 9 have a wireless communication function (communication means) capable of performing transmission and reception (wireless communication) of signals through a wireless (for example, wireless LAN (Local Area Network), infrared data association (IrDA), Bluetooth, etc.), so that the information processing means 8, the respective real gloves 20, the virtual reality display device 5 and the base station 9 can communicate with each other.

The force-feedback supply system 1 performs the respective processes of displaying a virtual reality image prepared (generated) by the information processing means 8 in the virtual reality display device 5 on the basis of information supplied from the base station 9, the virtual reality display device 5 and the respective real gloves 20, displaying the contact state in the virtual reality display device 5 when a hand or a finger on which the real glove 20 is mounted is moved and the hand or the finger virtually come in contact with an object displayed in the virtual reality space, and supplying a tactual sense or a force-feedback at the time of contact to the hand or the finger mounted with the real glove 20.

The information processing means 8 comprises various devices having a wireless communication function (communication means) and a control function, such as mobile phones, personal computers having a wireless communication function, portable information devices called as PDA (Personal Digital Assistants), etc.

Further, the base station 9 comprises various devices for providing information on the virtual reality image, such as various server computers connected to internets, portable phone base stations for performing wireless communication with portable phones, etc.

Furthermore, in this embodiment, although the respective real gloves 20, the virtual reality display device 5, the information processing means 8 and the base station 9 have the wireless communication function, respectively, for example, a part or all of them may be constructed to perform a wire communication.

Furthermore, the information processing means 8 may have a part or all of the functions of the base station 9. In a force-feedback supply process (force-feedback supply method) in FIG. 24 to be described later, it will be described for the purpose of convenience that all functions of the base station 9 are included in the information processing means 8.

Furthermore, the real gloves 20 may have a part or all of functions of the virtual reality display device 5, the information processing means 8 and the base station 9.

Here, in this embodiment, the force-feedback supply apparatus 2 comprises a pair of real gloves 20, 20, that is, a real glove 20 for a left hand to be mounted on a user's left hand and a real glove 20 for a right hand to be mounted on a user's right hand. In the following description, only one real glove 20 is described representatively.

Furthermore, in the present invention, the force-feedback supply apparatus 2 may comprise one real glove 20.

Furthermore, in the present invention, the force-feedback supply apparatus 2 may have any one or two or all of the virtual reality display device 5, the information processing means 8 and the base station 9, in addition to the real gloves 20. In this case, the force-feedback supply apparatus 2 may have a part or all of functions thereof.

As shown in FIG. 2, the real glove 20 comprises a tactual sense generating section (tactual sense generating means) 21 for generating a sense of the finger (for example, distribution of a texture, a shape, a contact intensity such as a strength of the finger) in contact with an object (target object) (in the virtual reality image) displayed in the virtual reality space, a force-feedback generating section (force-feedback generating means) 22 for generating a sense of intensity of a force applied to a hand or a finger in contact with the object displayed in the virtual reality space, a position and posture detecting section 23 for detecting positions of the respective portions of the real glove 20 (positions of the respective portions such as a hand, a wrist, an arm, fingers, etc. mounted with the real glove 20), a control section 24 for controlling the respective portions of the real glove 20, a signal processing section 25 for performing signal processing such as amplification of signals for transmission to the information processing means 8, and a signal transmitting/receiving section 26 for performing wireless communication with the information processing means 8.

Further, as shown in FIG. 3, the overall shape of the real glove 20 has a shape of a glove (glove shape) being roughly long. That is, the real glove 20 is a mounting means having a glove shape to be mounted on from fingers to an elbow (from fingers to an arm) of a user's arm, and has a relatively-long glove 2a comprising a cylinder shaped section 20a for covering the arm.

The user can easily and surely perform wearing and stripping off the real glove 20 by using the glove 2a.

Further, since the glove 2a is mounted on from a hand to an arm of the user, it is possible to easily and surely perform actions (manipulations) in the virtual reality space.

The glove 2a is provided with a slack absorbing section 27 for suppressing or preventing slack of portions corresponding to the fingertips, a wrist fixing section 28 for fixing the real glove 20 to the wrist, an arm fixing section 2d for fixing the real glove 20 to the arm, and a twist absorbing section 29 for absorbing twist of portions corresponding to the arm.

The slack absorbing section 27 is provided at a portion corresponding to a wrist of the glove 2a. The slack absorbing section 27 is made of an elastic body such as various rubbers.

If a user mounts the real glove 20, the glove 2a is pulled toward the elbow (toward a base end) by means of a restoring force (elastic force) of the slack absorbing section 27, and then is kept in that state. As a result, it is possible to prevent or suppress generation of slack in fingertips.

Further, even when it is used by a plurality of users having different measures such as lengths of fingers, it is possible to prevent or suppress generation of slack in the respective users' fingertips by means of the slack absorbing section 27.

The wrist fixing section 28 is provided successively to the slack absorbing section 27 in an elbow side (base end side) of the slack absorbing section 27 of the glove 2a. The wrist fixing section 28 is made of an elastic body such as various rubbers.

If a user mounts the real glove 20, the glove 2a is fixed to the wrist by means of a restoring force (elastic force) of the wrist fixing section 28. As a result, it is possible to prevent the real glove 20 from being stripped off in use.

Furthermore, a bundle 212a of actuator wires 212 of a tactual sense generating section 21 to be described later is kept at a predetermined position by means of the wrist fixing section 28 or the slack absorbing section 27, such that the respective actuator wires 212 can be moved in a longitudinal direction thereof.

The arm fixing section 2*d* is provided at an elbow end side (base end side) of the cylinder shaped section 20*a* of the glove 2*a*. The arm fixing section 2*d* is made of an elastic body such as various rubbers.

If a user mounts the real glove 20, the glove 2*a* is fixed to the arm by means of a restoring force (an elastic force) of the arm fixing section 2*d*. As a result, it is possible to prevent the real glove 20 from being deviated in use.

The twist absorbing section 29 is provided in an intermediate portion of the cylinder shaped section 20*a* of the glove 2*a*, that is, between the wrist fixing section 28 and the arm fixing section 2*d*.

The twist absorbing section 29 comprises three band shaped sections 291 obtained by forming three openings 292 in parts of the cylinder shaped section 20*a*. Each of the band shaped sections 291 is made of members having elasticity such as cloth made of material having elasticity.

If a user mounts the real glove 20 and then twists his wrist, the respective band shaped sections 291 are converted into expansion and contraction, and as a result, a twist of the cylinder shaped section 20*a* is absorbed.

Accordingly, since the twist of the real glove 20 can be prevented by means of the twist absorbing section 29, it is possible to allow a user to easily and smoothly move his hand or arm.

Further, the number of band shaped sections 291 of the twist absorbing section 29 may be two or less, and may be four or more.

Furthermore, openings 21*a* are formed in portions corresponding to the respective back side joints of the respective fingers of the glove 2*a*, respectively.

Due to the openings 21*a*, a user can easily and smoothly move the respective joints of the respective fingers.

Further, in the real glove 20, a control section 24, a power supply section 30, a dynamic power generating section 211, etc. are provided in a portion positioned toward the elbow from the twist absorbing section 29, which corresponds to the arm of the glove 2*a*, that is, in the elbow end side (base end side) of the cylinder shaped section 20*a* of the glove 2*a*.

By arranging the control section 24, the power supply section 30 and the dynamic power generating section 211 as described above, a weight of the fingertip side (front end side) of the real glove 20 can be made light (small in inertia), and thus a user can easily execute actions (manipulations).

Important portions of the tactual sense generating sections 21 are provided at positions covering from first joints (joints between distal phalanxes and middle phalanxes) of the user's respective fingers to the fingertips when the user mounts the real glove 20. Since the tactual sense generating sections 21 have similar constructions and operations, only one of them will be described representatively.

FIG. 4 is a longitudinal sectional view illustrating a constructional example of the tactual sense generating section 21. In order to avoid complication of the figure, thicknesses of some members are omitted in the figure.

Figure 4A:
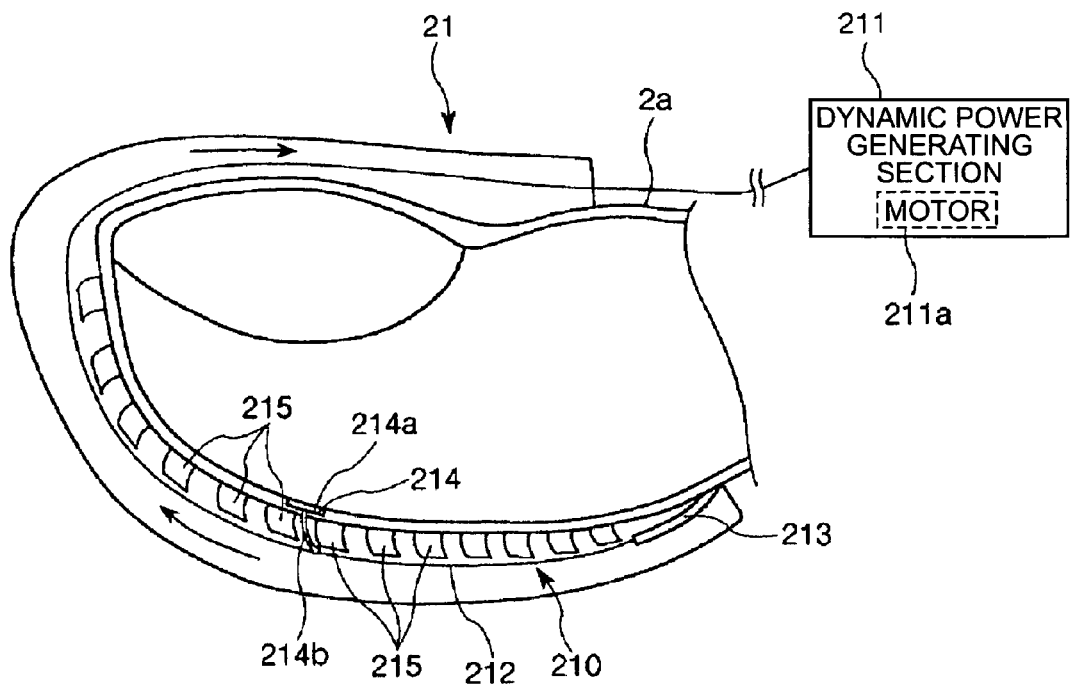
FIG. 4 is a longitudinal sectional view illustrating a constructional example of a tactual sense generating section of the real glove shown in FIG. 1.

The tactual sense generating section 21, as shown in FIG. 4A, has a plurality of unit tactual sense generating sections (actuators) 210, each unit tactual sense generating section comprising a dynamic power generating section (moving means) 211 having a motor (driving source) 211*a*, an actuator wire (filamentous substances having flexibility) 212 provided to be movable in a longitudinal direction, a wire holding section (energizing means) 213 for holding one end of the actuator wire 212, a tactual sense supplying pin (pressing section) 214 for pressing a front side of a finger to generate a tactual sense, and a tactual sense supplying pin support portion (moving direction restricting means) 215 for supporting the tactual sense supply pin 214 and restricting a moving direction of the tactual sense supply pin 214. The respective unit tactual sense generating sections 210 are independent each other.

Furthermore, the dynamic power generating section 211, the actuator wire 212 and the tactual sense supply pin support portion 215 constitute a driving mechanism for driving the tactual sense supply pin 214.

The dynamic power generating section 211 makes rotate the built-in motor 211*a*, for example, in accordance with control signals from the control section 24, and performs a process (a process of moving the actuator wire 212 in a longitudinal direction of the actuator wire 212) of reeling the actuator wire 212 by means of rotation drive of the motor 211*a*. The control section 24 controls the dynamic power generating section 211 in accordance with instructions from the information processing means 8, such that the rotation drive of the motor 211*a* is executed with a predetermined torque for a predetermined time. The dynamic power generating section 211 performs the process of reeling the actuator wire 212 by a predetermined length, by applying a rotation power to the motor 211*a* in accordance with instructions from the information processing means 8.

In this embodiment, the wire holding section 213, as shown in FIG. 4A, holds one end (terminating end) of the actuator wire 212 in the vicinity of the first joint of a finger. The wire holding section 213 is made of a member (elastic body) having elasticity such as a rubber or a spring.

Therefore, when the actuator wire 212 is reeled by means of drive of the motor 211*a* of the dynamic power generating section 211 and the actuator wire 212 is moved clockwise in FIG. 4A, the wire holding section 213 is accordingly expanded, and the actuator wire 212 is biased counterclockwise (in a direction inverse to the moving direction of the actuator wire 212 when the tactual sense supply pin 214 is projected) in FIG. 4A by means of a restoring force (elastic force) of the wire holding section 213. Then, when drive of the motor 211*a* of the dynamic power generating section 211 is stopped and the reeled state of the actuator wire 212 is released, the wire holding section 213 is contracted by means of the restoring force (elastic force), and as a result, the actuator wire 212 having been reeled is withdrawn to be moved counterclockwise in FIG. 4A.

Further, the dynamic power generating section 211 is positioned at the other end side (starting end side) of the actuator wire 212.

The tactual sense supply pin 214 is used for applying a sense of touch (touch or touchless, or intensity of touch) to a front side of the user's finger, and comprises a fine contact plate (contact means) 214*a* which comes in contact with the front side of the finger and a support portion 214*b* for supporting the contact plate 214*a*. One end of the support portion 214*b* is fixed to an intermediate portion of the actuator wire 212, and the other end thereof is provided with the contact plate 214*a*.

In this embodiment, as shown in FIG. 4A, in the glove 2*a* of the real glove 20, a mounting section mounted on (covering) a fingertip has a double structure (for example, a structure where two sheets of members such as cloth are superposed and a member is inserted between the two sheets of members superposed), and inside of the section covering the fingertip (inside of the double structure) is provided with a part of the actuator wire 212, a wire holding section 213, a support portion 214b, and a tactual sense supply pin support portion 215 for restricting movement of the tactual sense supply pin 214 in the moving direction of the actuator wire 212. In addition, one end of the support portion 214b is projected and the contact plate 214a is positioned in inside of the glove 2a in which the finger is received.

In this embodiment, the contact plate 214a is always in contact with the fingertip of the hand mounted with the real glove 20. Further, not limited to this, the contact plate 214a may be put in a state where the contact plate is separated from the fingertip (a state where the contact plate 214a is not in contact with the fingertip).

In FIG. 4A, for the purpose of simplifying description, one unit tactual sense generating section 210 (one tactual sense supply pin 214) is illustrated representatively, but as described above, the tactual sense generating section 21 actually has a plurality of unit tactual sense generating sections 210. The plurality of tactual sense supply pins 214 are arranged at a position corresponding to the front side of the user's fingertip when the user mounts the real glove 20, for example, along a front side of the finger and in a matrix shape against the front side of the finger.

Before and behind each tactual sense supply pin 214, tactual sense supply pin support portions 215 for restricting movement of the support portion 214b of each tactual sense supply pin 214 in the moving direction of the actuator wire 212 are provided.

Furthermore, the tactual sense supply pins 214 may be arranged regularly or irregularly.

Next, an operation of generating a tactual sense by the tactual sense generating section 21 will be described.

When a user mounts the real glove 20 and the fingertip (front side of the finger) is virtually in contact with an object (a virtual object) displayed in the virtual reality space, that is, a target object by moving his hand or finger, the information processing means 8 calculates a pressing force in a case of assuming real contact on the basis of physical property data and physical features of the target object by means of a calculation processing section 81 to be described later, and then converts the pressing force into PWM data (for example, data representing exciting patterns for rotating the motor 211a) in the dynamic power generating section 211 on the basis of the calculation result.

In this case, X axis, Y axis and Z axis orthogonal to each other, that is, X-Y-Z coordinates (three dimensional coordinates) are supposed in advance in the virtual reality space (three dimensional space). Agreement between coordinates (positional information) of the object and coordinates (positional information) of the user's fingertip is detected, and when the agreement is detected, it is judged that a site of the object corresponding to the coordinates and a site of the user's fingertip corresponding to the coordinates are in contact. The coordinates of the user's fingertip is induced on the basis of signals (information) transmitted to the information processing means 8 through the signal transmitting/receiving section 26 from a position and posture detecting section 23 to be described later.

Next, the information processing means 8 transmits the induced PWM data and data of specifying (designating) a dynamic power generating section 211 for moving the contact plate 214a for applying the pressing force to the contact position in a case of assuming real contact, to the real glove 20. The real glove 20 drives the specified dynamic power generating section 211 and reeling the actuator wire 212, in accordance with the received PWM data.

Figure 4B:
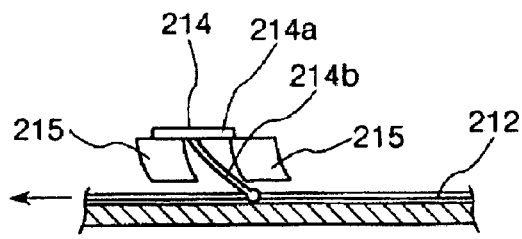

When the actuator wire 212 is reeled, the actuator wire 212 disposed at the front side of the finger is moved toward the fingertip end along the front side of the finger, and as shown in FIG. 4B, the tactual sense supply pin 214 attached and fixed to the actuator wire 212 is also moved toward the fingertip end along the front side of the finger.

Figure 4C:
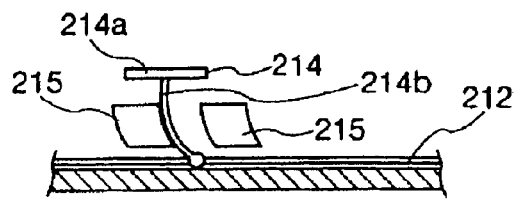

At that time, as shown in FIG. 4C, the tactual sense supply pin 214 has its movement toward the front end of the fingertip restricted and guided by means of the tactual sense supply pin support portion 215, to be moved upwardly in FIG. 4C (be projected toward the front side of the finger). That is, the contact plate 214a of the tactual sense supply pin 214 is moved roughly vertically and upwardly against the front side surface of the finger. The support portion 214b of the tactual sense supply pin 214 is, as shown in FIG. 4B, inclined toward the front end of the finger from the vertical direction in a wait state (in an initial state), and by applying a force for moving the contact plate 214a roughly vertically and upwardly, the contact plate 214a roughly vertically presses the front side of the finger, thereby supplying the pressing force to the front side of the user's finger.

This action is performed by the specified unit tactual sense generating section 210 of the plurality of unit tactual sense generating sections 210, and as a result, a tactual sense is supplied (applied) to the front side of the user's finger. Therefore, the user can obtain a sense corresponding to contact of the front side of the finger with the object (target object) in the virtual reality image from the front side of the finger.

In the specified unit tactual sense generating section 210, when the drive of the motor 211a of the dynamic power generating section 211 is stopped and the reeled state of the actuator wire 212 is released, the wire holding section 213 is contracted by means of the restoring force (elastic force), and as a result, the actuator wire 212 having been reeled is withdrawn.

When the actuator wire 212 is withdrawn, the actuator wire 212 disposed at the front side of the finger is moved toward a base end (toward a right side in FIG. 4C) of the finger along the front side of the finger, the tactual sense supply pin 214 attached and fixed to the actuator wire 212 is also moved toward the base end of the finger along the front side of the finger, so that the tactual sense supply pin 214 is restored to the initial state shown in FIG. 4B. Accordingly, the pressing force applied to the front side of the user's finger from the tactual sense supply pin 214 is substantially extinguished.

In this tactual sense generating section 21, since the actuator wire 212 is arranged roughly in parallel to the front side of the finger (along the front side of the finger) and a force roughly vertical to the front side of the finger is applied to the front side of the finger by reeling the actuator wire 212, it is possible to make a mechanism for applying the tactual sense thinner, and as a result, it is possible to considerably suppress the thickness of the real glove 20 at the front side of the finger.

Further, since the slack of the actuator wire 212 can be prevented, it is possible to more accurately and surely apply the pressing force having a desired magnitude to the front side of the user's finger from the tactual sense supply pin 214.

Figure 5:
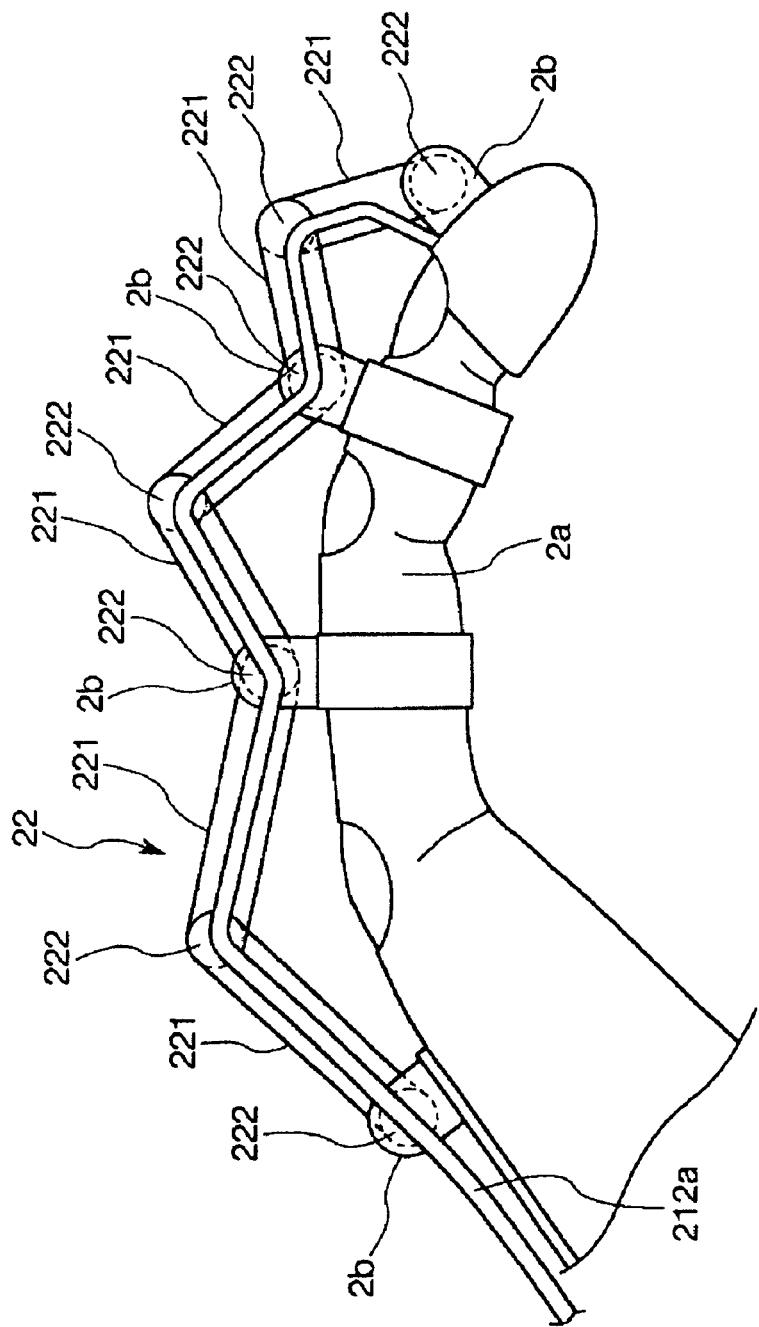
FIG. 5 is an outer view illustrating a constructional view of a force-feedback generating section of the real glove shown in FIG. 1.
Figure 6:
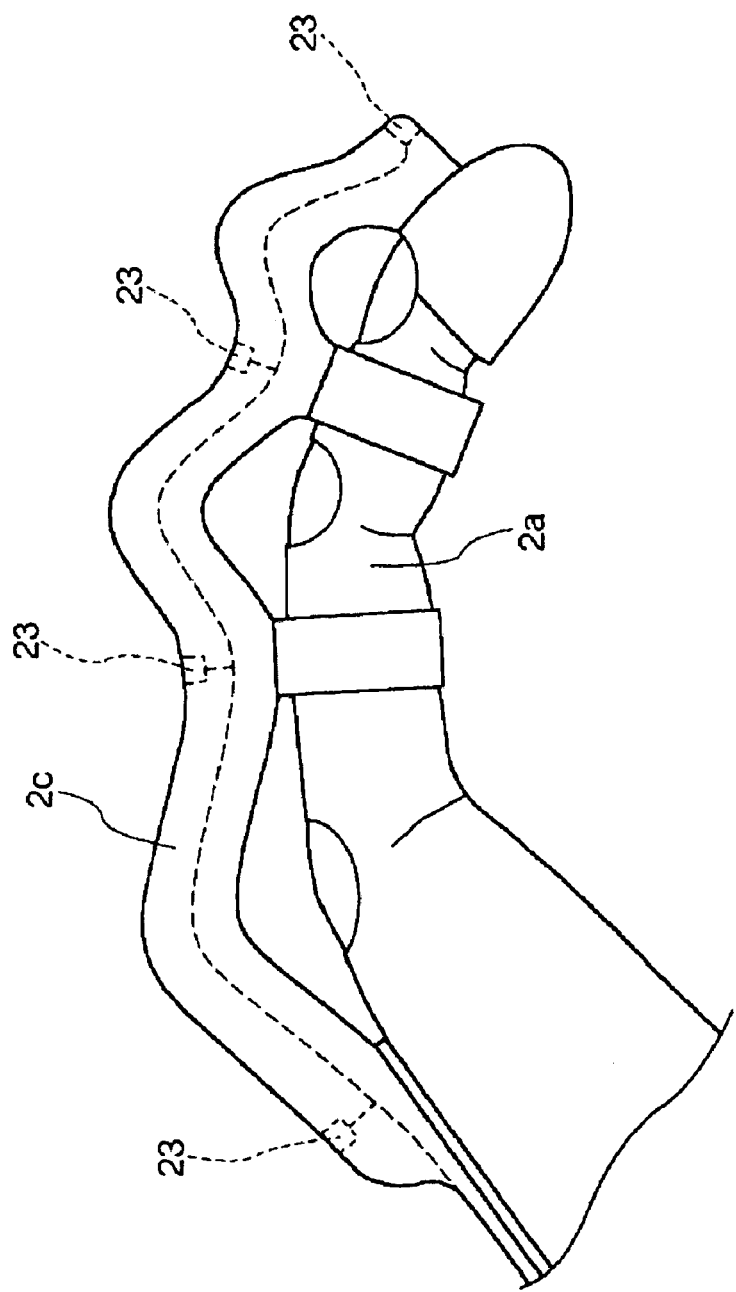
FIG. 6 is an outer view illustrating a constructional example of the force-feedback generating section of the real glove shown in FIG. 1.

FIGS. 5 and 6 are outer views illustrating an constructional example of the force-feedback generating section 22. FIG. 5 further shows a state where a frame cover is removed.

As shown in FIG. 5, the force-feedback generating section 22 is provided at a back side of the user's finger when the real glove 20 is mounted. Since the constructions and operations of the force-feedback generating sections 22 are almost similar to each other, only one of them will be described representatively.

The force-feedback generating section 22 comprises a link mechanism having a plurality of frames 221 (six in this embodiment) pivotably connected to each other, a plurality of link motors (driving sources) 222 (seven in this embodiment) for pivoting the frames 221, and a plurality of frame holders 2b (four in this embodiment) provided in the glove 2a.

The frame holders 2b are provided in a mounting section positioned toward the front end from a first joint of the user's finger, a mounting section positioned between the first joint and a second joint (a joint between a middle phalanx and a proximal phalanx), a mounting section positioned between the second joint and a third joint, and a mounting section positioned toward the base end from the third joint (a joint between the proximal phalanx and a metacarpal), respectively, when the real glove 20 is mounted by the user.

The link mechanism is attached to the back side of the user's finger in the glove 2a when the real glove 20 is mounted, through the frame holders 2b.

That is, the frame 221 at the end of a front end side (right side in FIG. 5) of the link mechanism is arranged such that its end is positioned toward the front end side from the first joint of the user's finger when the user mounts the real glove 20, and the front end of the frame 221 is provided to be pivotable on the frame holder 2b.

Further, the frame 221 at a base end side (left side in FIG. 5) of the link mechanism is arranged such that its end is positioned toward the base end side from the third joint of the user's finger when the user mounts the real glove 20, and the base end of the frame 221 is provided to be pivotable on the frame holder 2b.

The remaining frames 221 of the link mechanism are arranged such that one of two frame connecting sections is positioned at a site between the first joint and the second joint of the user's finger and at a site between the second joint and the third joint when the user mounts the real glove 20, and the frames are provided to be pivotable on the frame holders 2b in the frame connecting sections arranged every two.

A driving force (rotating force) of each link motor 222 is delivered to the corresponding frame 221 through dynamic power delivering sections not shown. That is, if the link motors 222 are rotated in a predetermined direction, the corresponding frame 221 is rotated in the predetermined direction, and as a result, angles of the frames 221 are changed (adjusted).

A bundle 212a of the aforementioned actuator wires 212 is shown in FIG. 5.

The frames 221 or the link motors 222 of the force-feedback generating section 22 are received in a frame cover 2c made of, for example, cloth as shown in FIG. 6.

As shown in FIG. 6, inside of the frame cover 2c is provided with a plurality of position and posture detecting sections (position detecting means) 23 (four in this embodiment) for detecting a position and posture of a predetermined site of the hand or finger. The position and posture detecting sections 23 are provided in the vicinity of the sites (detecting positions) whose the position and postures should be detected, that is, the sites corresponding to the vicinities of the finger joints, respectively, to keep a constant positional relation with the detecting positions.

That is, the position and posture detecting sections 23 are attached and fixed to the link motors 222 fixed to the positions provided with the frame holders 2b in this embodiment. Therefore, the positional relation between the sites provided with the position and posture detecting sections 23 and the predetermined sites (detecting positions) at the palm side of the user is kept constant. Therefore, by allowing the position and posture detecting sections 23 to detect their own positions or postures, it is possible to easily and accurately detect the positions or postures of the predetermined sites of the user's palm side.

Since the position and posture detecting sections 23 are arranged at the back side of the hand, it is possible to considerably suppress the thickness of the real glove 20 at the front side of the finger.

As shown in FIG. 3, the position and posture detecting sections 23 are provided also at positions corresponding to the sites of the real glove 20 at the base end side of the arm when the user mounts the real glove 20.

By means of these position and posture detecting sections 23, it is possible to surely detect the positions and postures of fingers, a hand, a wrist and an arm mounted with the real glove 20, respectively.

In place of the position and posture detecting sections 23 described above, encoders not shown may be connected to the link motors 222 arranged in the link mechanism of the finger, and one way clutches and clutch mechanisms for controlling activation/inactivation of the one way clutches may be interposed between the link motors 222 and the dynamic power delivering sections.

In this case, since the rotational angles of the link motors 222 and the rotational angles of the joint sections (joints) are matched, the angles of the joint sections of the link mechanism can be detected, and on the basis of the rotational angles of the link motors 222, the position of the finger relative to the back of hand can be specified.

Next, operations of generating the force-feedback by means of the force-feedback generating section 22 will be described.

When a user mounts the real glove 20 and his hand or finger is virtually in contact with an object (a virtual object) displayed in the virtual reality space, that is, a target object by moving his hand or finger, the information processing means 8 calculates a reaction force applied from the object to the finger (the finger joins) in a case of assuming real contact on the basis of physical property data and physical features of the target object by means of a calculation processing section 81 to be described later, and then converts the reaction force into PWM data (for example, data representing exciting patterns for rotating the link motors 222) of the link motors 222 on the basis of the calculation result.

Here, judgment of contact between the object and the user's hand or finger is similar to a case of the tactual sense generating section 21.

The information processing means 8 transmits the induced PWM data and data of specifying the link motors 222 to be driven to the real glove 20. The real glove 20 rotates the specified link motors 222 in a predetermined direction in accordance with the received data, and pivots the corresponding frames 221 in the predetermined direction, so that the angles of the frame 221, that is, the angles of the frames 221 at both ends of the link mechanism and the angles of the frame connecting sections are adjusted.

By adjustment in the angles of the frames 221, predetermined forces are applied to the predetermined frame holders 2b, respectively, and as a result, a force corresponding to the reaction force from the object displayed in the virtual reality space is supplied to the joints. That is, the force-feedback is supplied (applied) to the finger joints.

Here, the force-feedback generating section 22 has a function of adjusting gaps between the plurality of mounting sections to be mounted on a plurality of sites of the finger (also serves as an adjusting means).

For example, as shown in FIG. 5, by pivoting the predetermined frames 221 to adjust the angels of the frames 221, it is possible to make the gaps between the frame holders 2b long or short.

In a case where one way clutches and clutch mechanisms are provided, when the reaction force calculated by the information processing means 8 is larger than a predetermined threshold value, a current flows through coils of the clutch mechanisms, so that the clutch mechanisms are turned on to lock the rotation of the one way clutches in a predetermined direction. As a result, since the user cannot move his finger in the locked direction from the position, it is possible to obtain a larger reaction force (here, a force itself when the user presses the object). That is, by means of the one way clutches and the clutch mechanisms, the force-feedback generating section 22 can indicate the larger reaction force.

Figure 7:
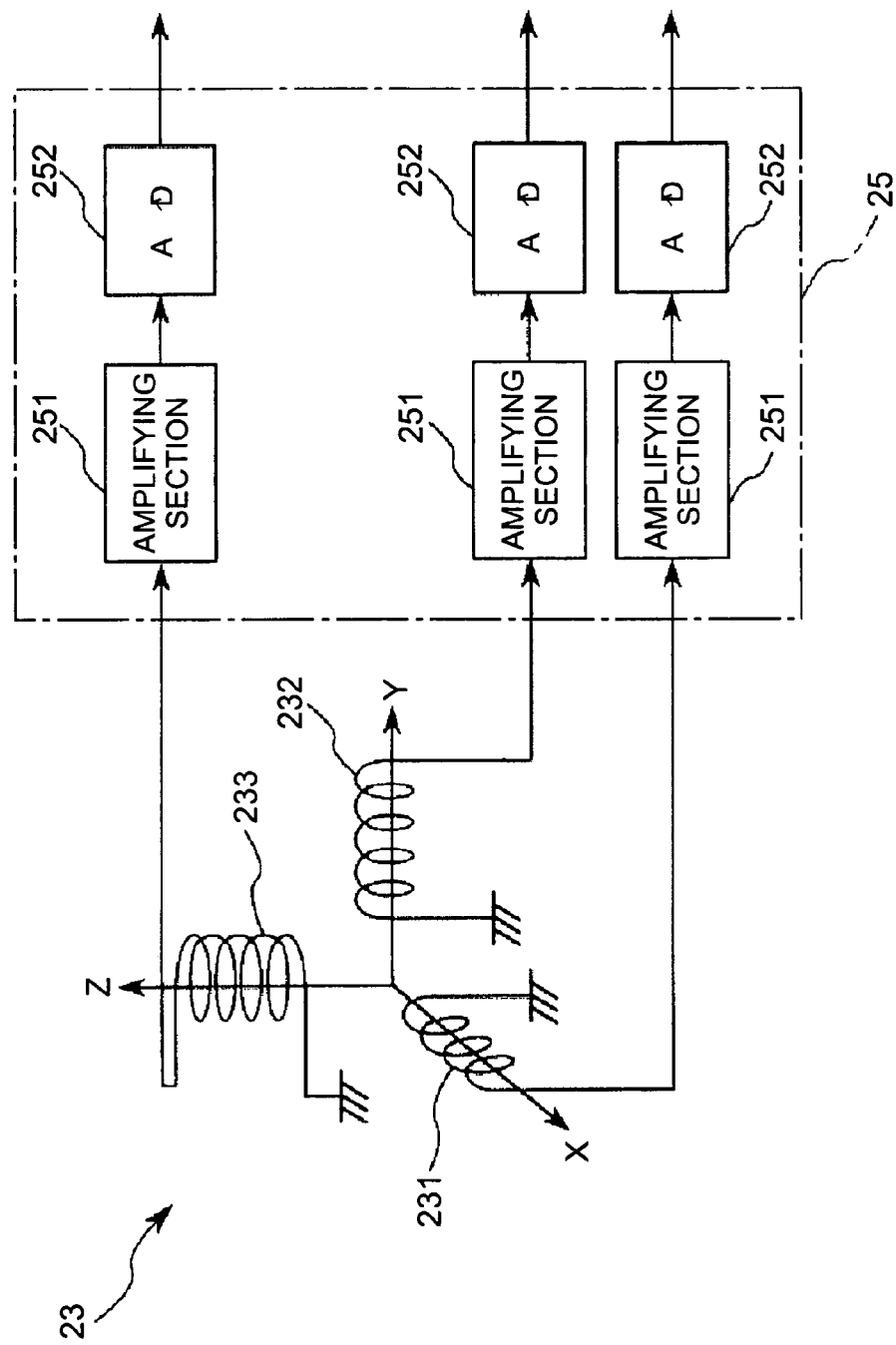
FIG. 7 is a block diagram illustrating a constructional example of a position and posture detecting section of the real glove shown in FIG. 1.

FIG. 7 is a block diagram illustrating a constructional example of a position and posture detecting section 23. In this embodiment, an orthogonal coil type position sensor (position detecting means) is used as the position and posture detecting section 23. That is, the position and posture detecting section 23, as shown in FIG. 7, comprises an X direction detecting coil (first coil) 231, an Y direction detecting coil (second coil) 232, and a Z direction detecting coil (third coil) 233, central axes of which are orthogonal to each other. Here, the X direction (X axial direction), the Y direction (Y axial direction) and the Z direction (Z axial direction) are orthogonal to each other.

On the other hand, the information processing means 8 is provided with a magnetic field generating section 88 for generating a magnetic field to be described later. For the magnetic field generating section 88, the construction almost equal to the position and posture detecting section 23, that is, a orthogonal coil type magnetic field generator (X direction coil, Y direction coil, Z direction coil) is employed.

The magnetic field generated from the magnetic field generating section 88 is detected by the position and posture detecting section 23. In this case, the magnetic fields are sequentially generated from the X direction coil, the Y direction coil and the Z direction coil of the magnetic field generating section 88, the magnetic fields are detected by three coils of the X direction detecting coil 231, the Y direction detecting coil 232 and the Z direction detecting coil 233 of the position and posture detecting section 23, respectively.

Signals (detected data) detected in the X, Y and Z directions by the position and posture detecting section 23 are amplified by the amplifying section 251 of a signal processing section 25, converted into digital signals by an A/D converting section 252, then output to the signal transmitting/receiving section 26 shown in FIG. 2, and transmitted to the information processing means 8 through the signal transmitting/receiving section 26.

The information processing means 8 receives the signals transmitted from the real glove 20, calculates positions and postures of the respective portions of the fingers, the hand, the wrist and the arm mounted with the real glove 20, that is, the coordinates of the respective portions, based on the signals (information) and then uses the information for the respective processes.

Like this, by providing the position and posture detecting section 23, it is possible to accurately and surely obtain the positions and postures of the respective portions of the fingers, the hand, the wrist and the arm mounted with the real glove 20.

Figure 8:
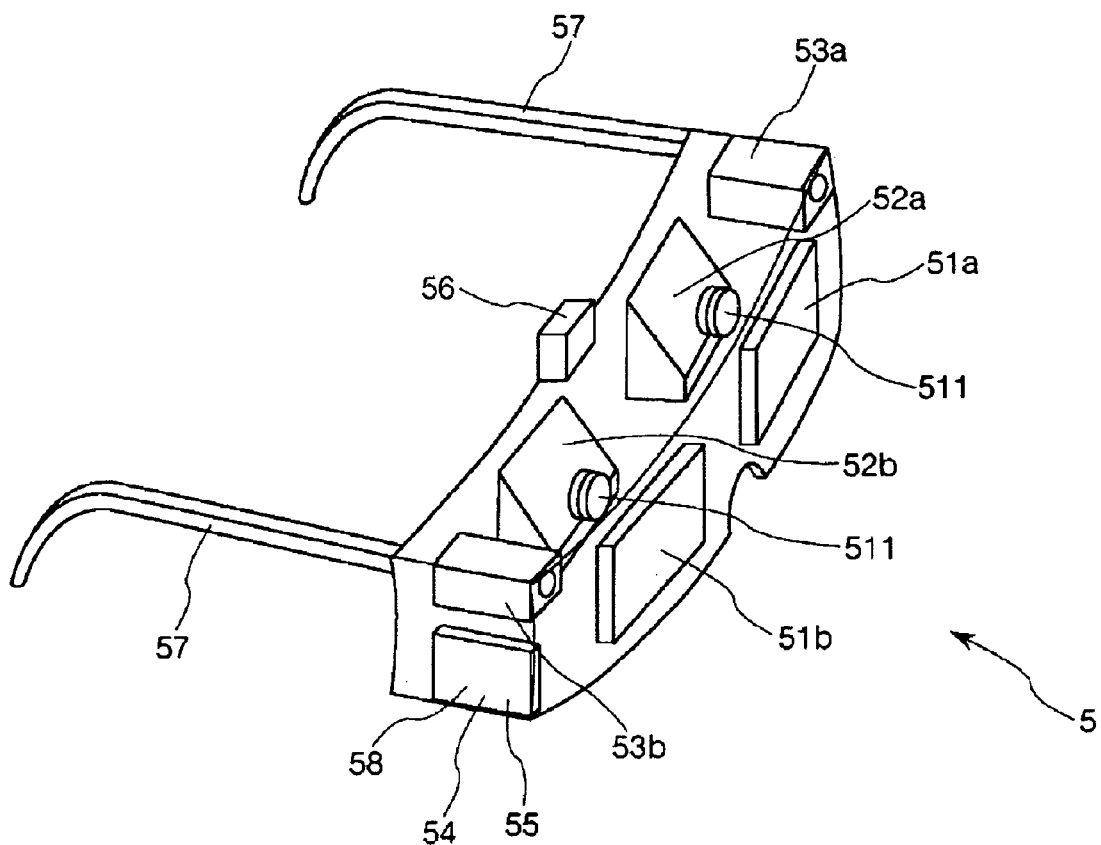
FIG. 8 is a perspective view illustrating an outer constructional example of a virtual reality display device shown in FIG. 1.
Figure 9:
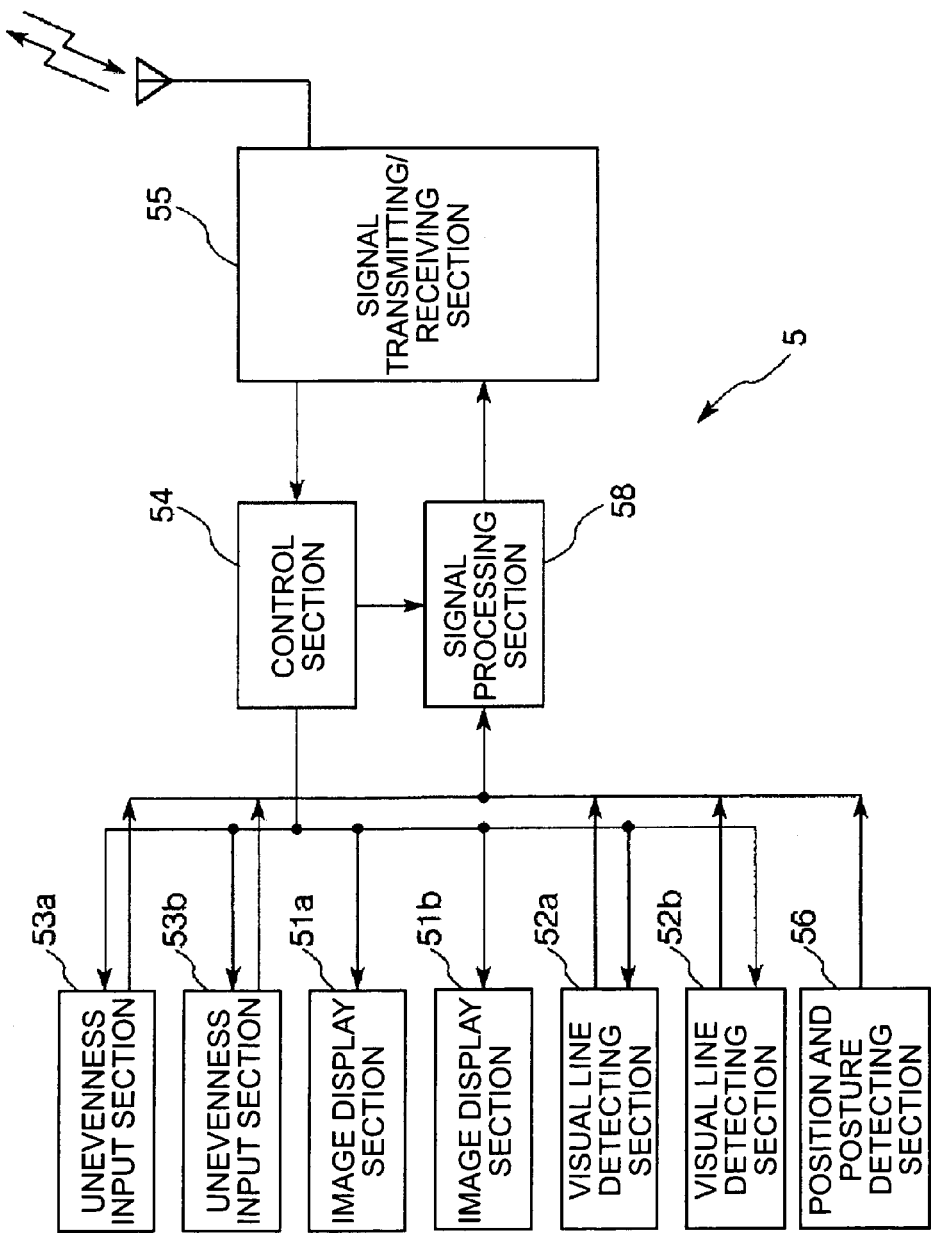
FIG. 9 is a block diagram illustrating an example of a circuit construction of the virtual reality display device shown in FIG. 1.

In this embodiment, a device mounted on a face for use, that is, a glasses shaped device called as HMD (Head Mount Display) is used as the virtual reality display device 5. FIG. 8 is a perspective view illustrating an example of an outer construction of the virtual reality display device 5, and FIG. 9 is a block diagram illustrating an example of a circuit construction of the virtual reality display device 5.

The virtual reality display device 5 comprises image display sections 51a, 51b for displaying a virtual reality image to a mounted person (a user), visual line detecting sections 52a, 52b for detecting a visual line of the mounted person, unevenness input sections 53a, 53b for picking up peripheral images and taking in the peripheral images, a control section 54 for controlling the whole device, a signal transmitting/receiving section 55 for transmitting and receiving signals with the information processing means 8, a position and posture detecting section 56, mounting sections 57, and a signal processing section 58. Now, for elements having bilateral symmetry, only several elements will be described representatively.

Figure 10:
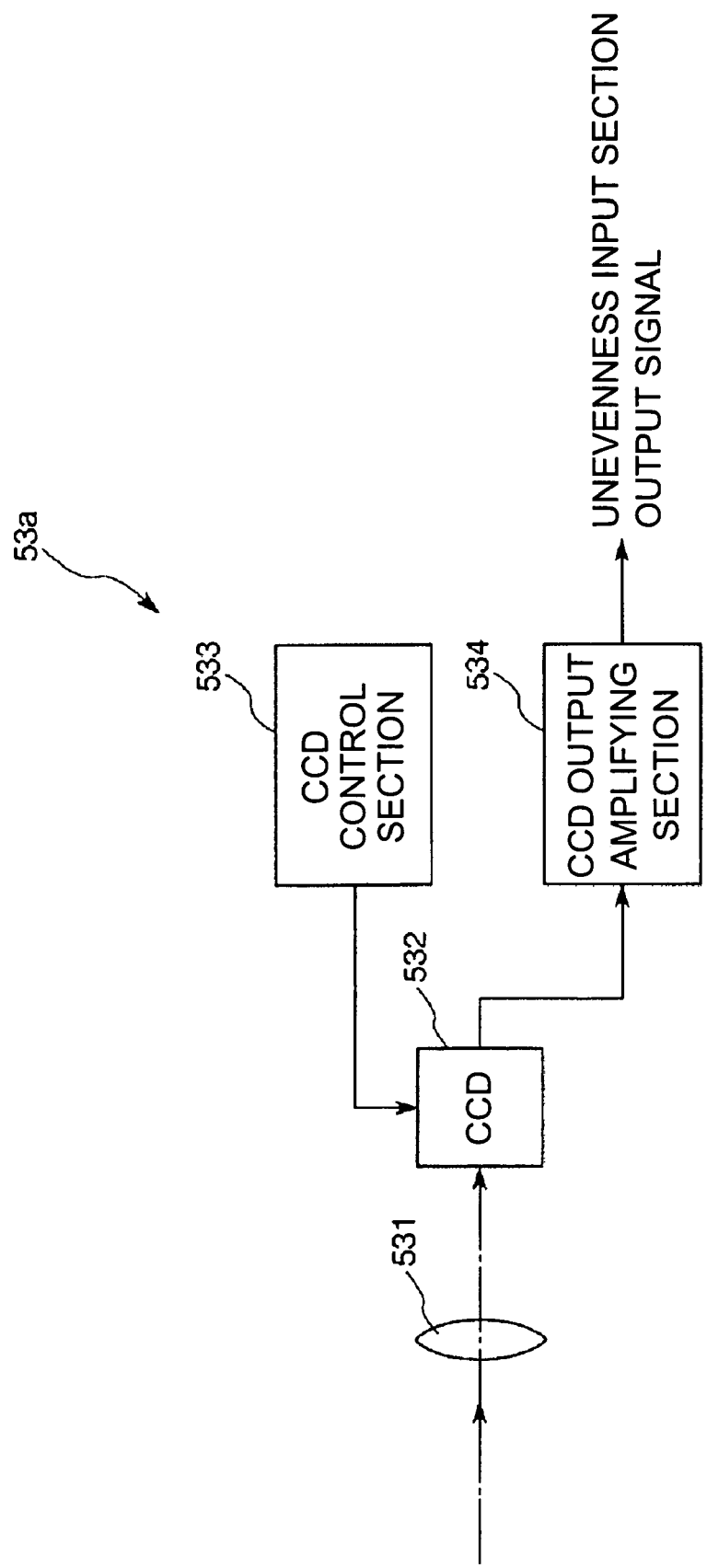
FIG. 10 is a view (a block diagram, a schematic view) illustrating a constructional example of an unevenness input section of the virtual reality display device shown in FIG. 1.

FIG. 10 is a view (a block diagram, a schematic view) illustrating a constructional example of the unevenness input section 53a of the virtual reality display device 5. As shown in FIG. 10, the unevenness input section 53a comprises a lens 531, a CCD (image pickup element) 532, a CCD control section 533 and a CCD output amplifying section 534.

Light (light flux) input to the lens 531 is guided onto a light receiving surface (image pickup surface) of the CCD 532 by means of the lens 531 and forms an image, and the image of a subject (the peripheral image) is picked up by the CCD 532. Drive of the CCD 532 is controlled by the CCD control section 533.

Signals output from the CCD 532 are amplified in the CCD output amplifying section 534, output from the unevenness input section 53a, and then input to the signal processing section 58 shown in FIG. 9. Then, the signals are processed in the signal processing section 58, and transmitted to the information processing means 8 through the signal transmitting/receiving section 55.

Since the construction and operation of the unevenness input section 53b are similar to the unevenness input section 53a, description thereof will be omitted, but a roughly equal area is picked up by the unevenness input section 53b and the unevenness input section 53a.

Figure 11:
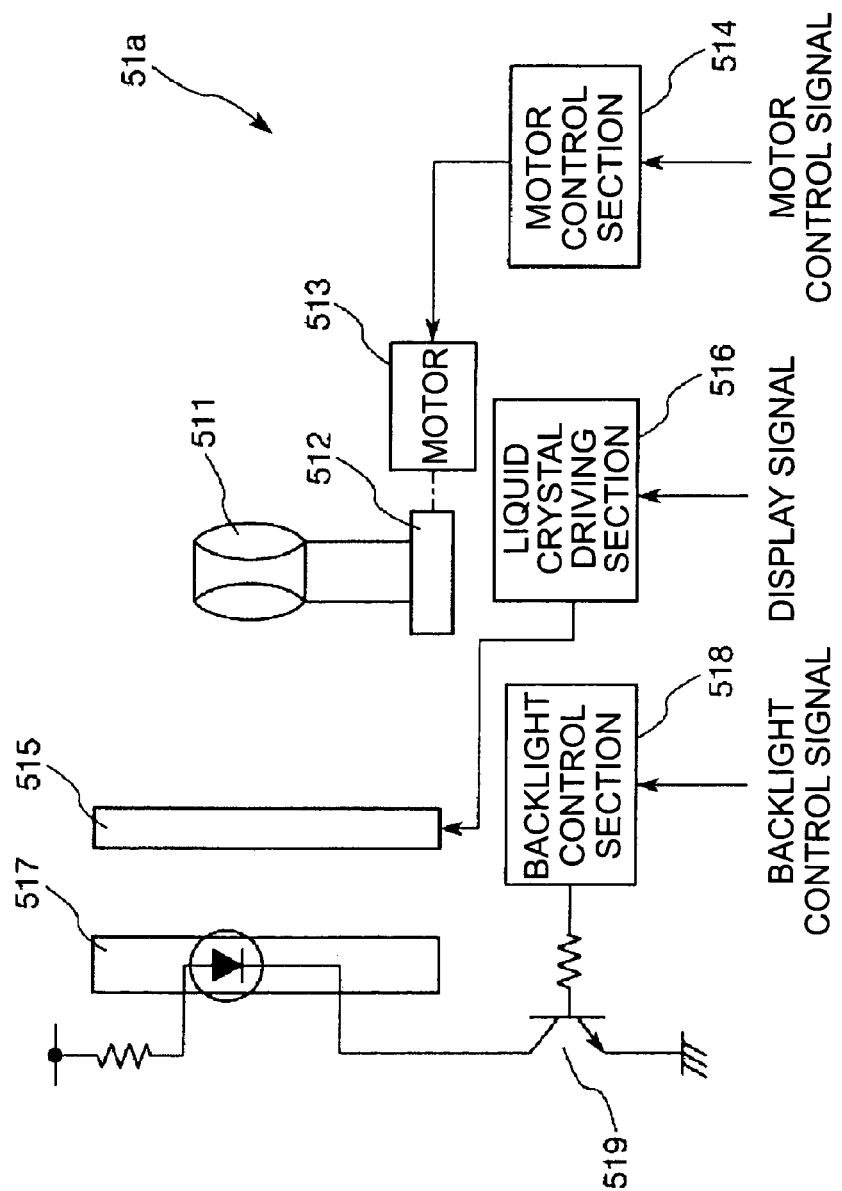
FIG. 11 is a view (a block diagram, a schematic view) illustrating a constructional example of the image display section of the virtual reality display device shown in FIG. 1.

FIG. 11 is a view (a block diagram, a schematic view) illustrating a constructional example of the image display section 51a of the virtual reality display device 5. As shown in FIG. 11, the image display section 51a comprises a lens 511, a lens moving mechanism 512 for moving the lens 511, a stepping motor 513, a motor control section 514, a liquid crystal display panel 515 having a color filter not shown, a liquid crystal driving section 516, a backlight 517, a backlight control section 518 and a transistor 519.

When the virtual reality image is displayed by the image display section 51a, the transistor 519 is turned on by control of the backlight control section 518 to drive the backlight 517, so that light is input to the liquid crystal display panel 515 from the backlight 517.

Then, the liquid crystal driving section 516 controls the drive of the liquid crystal display panel 515 on the basis of display signals (image data) input from the control section 54, and as a result, the virtual reality image is displayed in the liquid crystal display panel 515.

A mounted person (user) can see the virtual reality image displayed in the liquid crystal display panel 515 through the lens 511 and a half mirror 521 of the visual line detecting section 52a to be described later, with his eyes.

The drive of the stepping motor 513 is controlled by the motor control section 514, and when the stepping motor 513 is rotated in a predetermined direction, the lens 511 is moved in a direction of coming closer to the liquid crystal display panel 515, that is, in a direction of being separated from the eyes of the mounted person, by means of the lens moving mechanism 512.

On the other hand, when the stepping motor 513 is rotated in the direction reverse to the aforementioned direction, the lens 511 is moved in a direction of being separated from the liquid crystal display panel 515, that is, in a direction of coming closer to the eyes of the mounted person, by means of the lens moving mechanism 512.

In the virtual reality display device 5, by varying the position of the lens 511, the perspective representation of the virtual reality image can be varied.

The adjustment of position of the lens 511, that is, the adjustment of the perspective representation of the virtual reality image is performed on the basis of visual line information of the mounted person detected by the visual line detecting sections 52a, 52b to be described later.

The construction and operation of the image display section 51b is similar to those of the image display section 51a, and thus description thereof will be omitted.

The visual line detecting sections 52a, 52b have a function of detecting what direction the visual line of the mounted person looks (on what point of the virtual reality image the visual line is focused), and a function of reading out the iris pattern of the mounted person to be used as security information.

Figure 12:
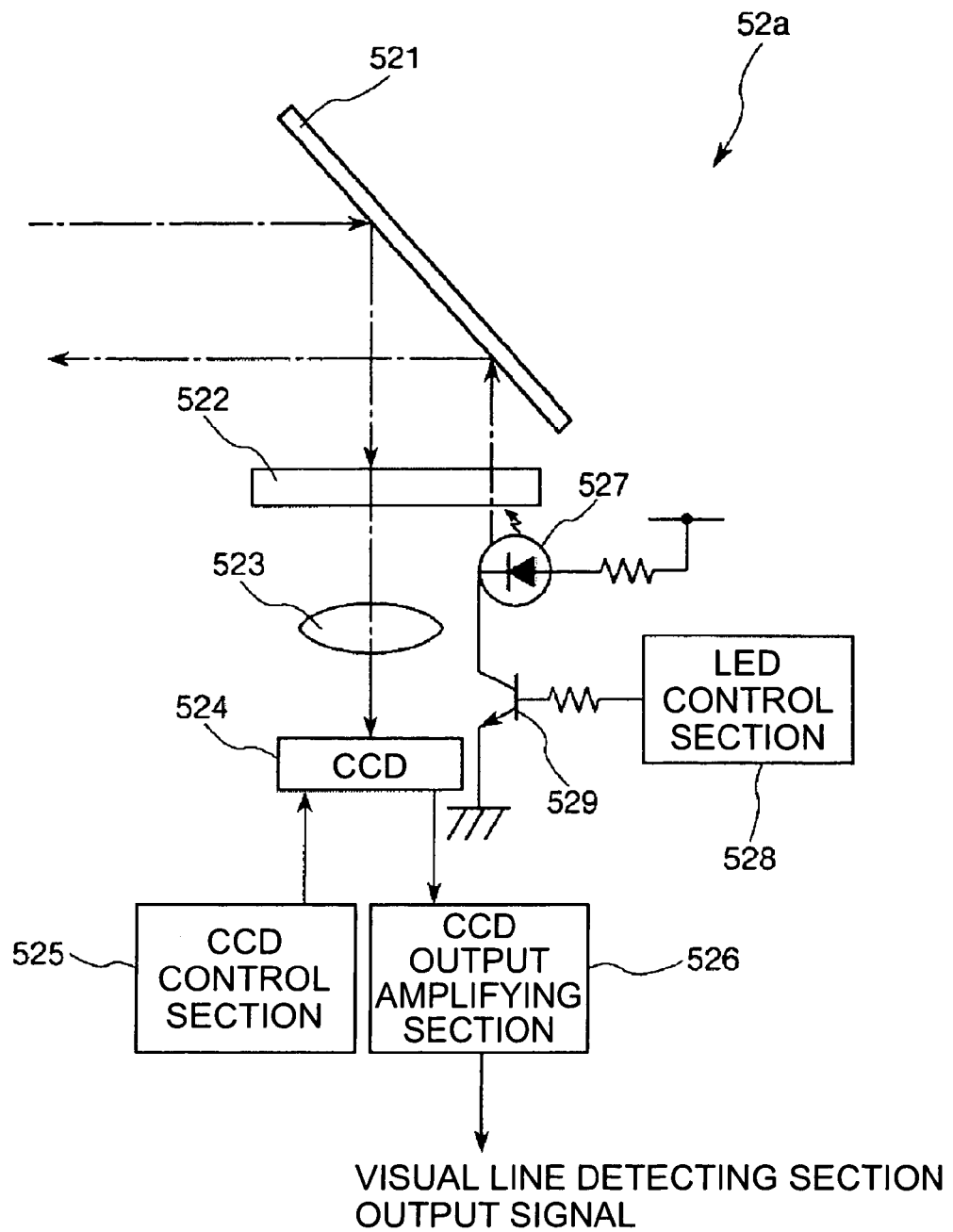
FIG. 12 is a view (a block diagram, a schematic view) illustrating a constructional example of a visual line detecting section of the virtual reality display device shown in FIG. 1.

FIG. 12 is a view (a block diagram, a schematic view) illustrating a constructional example of the visual line detecting section 52a of the virtual reality display device 5. As shown in FIG. 12, the visual line detecting section 52a comprises a half mirror 521, a filter 522 for removing visible rays and allowing infrared rays to pass, a lens 523, a CCD (image pickup element) 524, a CCD control section 525, a CCD output amplifying section 526, an LED (Light Emitting Diode) 527 for emitting infrared rays, an LED control section 528 and a transistor 529.

Drive of the LED 527 is controlled by the LED control section 528, and when the transistor 529 is turned on through control of the LED control section 528, the LED 527 is driven, so that the infrared rays are emitted from the LED 527.

The infrared rays emitted from the LED 527 pass through the filter 522, and a part thereof is reflected from the half mirror 521 and input to the eyes of the mounted person.

Then, a part of the reflected light (light flux) from the eyes of the mounted person is reflected from the half mirror 521, passes through the filter 522, and is guided on a light receiving surface (image pickup surface) of the CCD 524 by means of the lens 523 to form an image, and the image of a subject (the image of the eyes of the mounted person) is picked up by the CCD 524. Drive of the CCD 524 are controlled by the CCD control section 525.

The signals output from the CCD 524 are amplified by the CCD output amplifying section 526, output from the visual line detecting section 52a, and input to the signal processing section 58 shown in FIG. 9. Then, the signals are subjected to the predetermined process by the signal processing section 58, and then transmitted to the information processing means 8 through the signal transmitting/receiving section 55.

The information processing means 8 receives the signals from the virtual reality display device 5, detects what direction the visual line of the mounted person looks (on what point of the virtual reality image the visual line is focused) on the basis of the signals (information), and reads out and analyzes the iris pattern of the mounted person to be used as security information.

On the other hand, since the visible rays input to the filter 522 from the lens 523 is removed by the filter 522, it is possible to prevent the visible rays from being input to the eyes of the mounted person. As a result, it is possible to prevent deterioration in visibility of the virtual reality image displayed in the liquid crystal display panel 515.

Since the construction and operation of the visual line detecting section 52b are similar to those of the visual line detecting section 52a, description thereof will be omitted.

The virtual reality display device 5 picks up and fetches in the peripheral image using two image fetching-in devices, that is, the unevenness input sections 53a, 53b, and transmits the picked-up image data to the information processing means 8 through the signal transmitting/receiving section 55.

The information processing means 8 induces a viewing angle difference from the image picked up by the unevenness input sections 53a, 53b, that is, the picked-up image data, and on the basis of the peripheral unevenness obtained from the viewing angle difference, etc., prepares the virtual reality image, that is, the image data of the virtual reality space.

Further, the information processing means 8 transmits the image data to the virtual reality display device 5, the image data representing a synthesized image obtained by synthesizing the prepared virtual reality image and an image for arranging a predetermined virtual object such as a virtual wall paper, a virtual personal computer, a virtual book, etc. in the virtual reality space in accordance with the peripheral unevenness.

The virtual reality display device 5 displays the image using the image display sections 51a, 51b on the basis of the image data from the information processing means 8.

When the mounted real glove 20, that is, the user's hand or arm enters the image area displayed by the image display sections 51a, 51b, the virtual reality display device 5 also displays the quantity of deviation corresponding to the hand or arm in the image display sections 51a, 51b.

In this case, as described above, since the detection data of the plurality of position and posture detecting sections 23 provided in the real glove 20 is transmitted to the information processing means 8, the position and posture of the real glove 20, that is, the positions and postures of the user's fingers, hand, wrist and arm can be recognized by the information processing means 8. That is, the information processing means 8 sequentially specifies the positions and postures of the user's fingers, hand, wrist and arm on the basis of the detection data from the real glove 20. When they enter the image area displayed by the image display sections 51a, 51b, the information processing means obtains the synthesized image (image data of the synthesized image) by preparing the virtual reality image representing them and synthesizing the image with the basic image, and transmits the image data to the virtual reality display device 5.

Therefore, when the user's hand or arm enters the image area displayed by the image display sections 51a, 51b, the quantity of deviation corresponding to the hand or arm is displayed in the image display sections 51a, 51b.

In the virtual reality display device 5, it is displayed that the user's hand or fingers are moved in the virtual reality image displayed in the image display sections 51a, 51b, in conjunction with the actual action of the user's hand or fingers mounted with the real glove 20.

The position and posture detecting section 56 is a sensor for detecting a position and posture of the virtual reality display device 5, that is, a position and posture of the face (head portion) of the mounted person. In this embodiment, an orthogonal coil type position sensor, that is, a sensor similar to the position and posture detecting section 23 is used as the position and posture detecting section 56.

Signals (detection data) from the position and posture detecting section 56 is input to the signal processing section 58, processed, and then sequentially transmitted to the information processing means 8 through the signal transmitting/receiving section 55. The information processing means 8 sequentially updates the virtual reality image on the basis of the detection data.

Therefore, for example, when the user mounted with the virtual reality display device 5 moves his neck, the virtual reality image displayed in the image display sections 51a, 51b is varied to be an image corresponding to a direction in which the user faces.

The three dimensional acceleration sensor 59 is to detect acceleration of the virtual reality display device 5 in three directions substantially orthogonal to each other. The three dimensional acceleration sensor 59 may be any one of a piezoelectric type, a servo type, a strain gauge type, etc., only if it can be provided within the HMD and has accuracy to some extent. However, a more accurate acceleration sensor such as a semiconductor acceleration sensor using CMOS is suitable for the present invention.

The signals (acceleration data) detected by the three dimensional acceleration sensor 59 are output to the signal processing section 58, subjected to the predetermined process such as amplification, etc., and transmitted to the information processing means 8 through the signal transmitting/receiving section 55.

Figure 13:
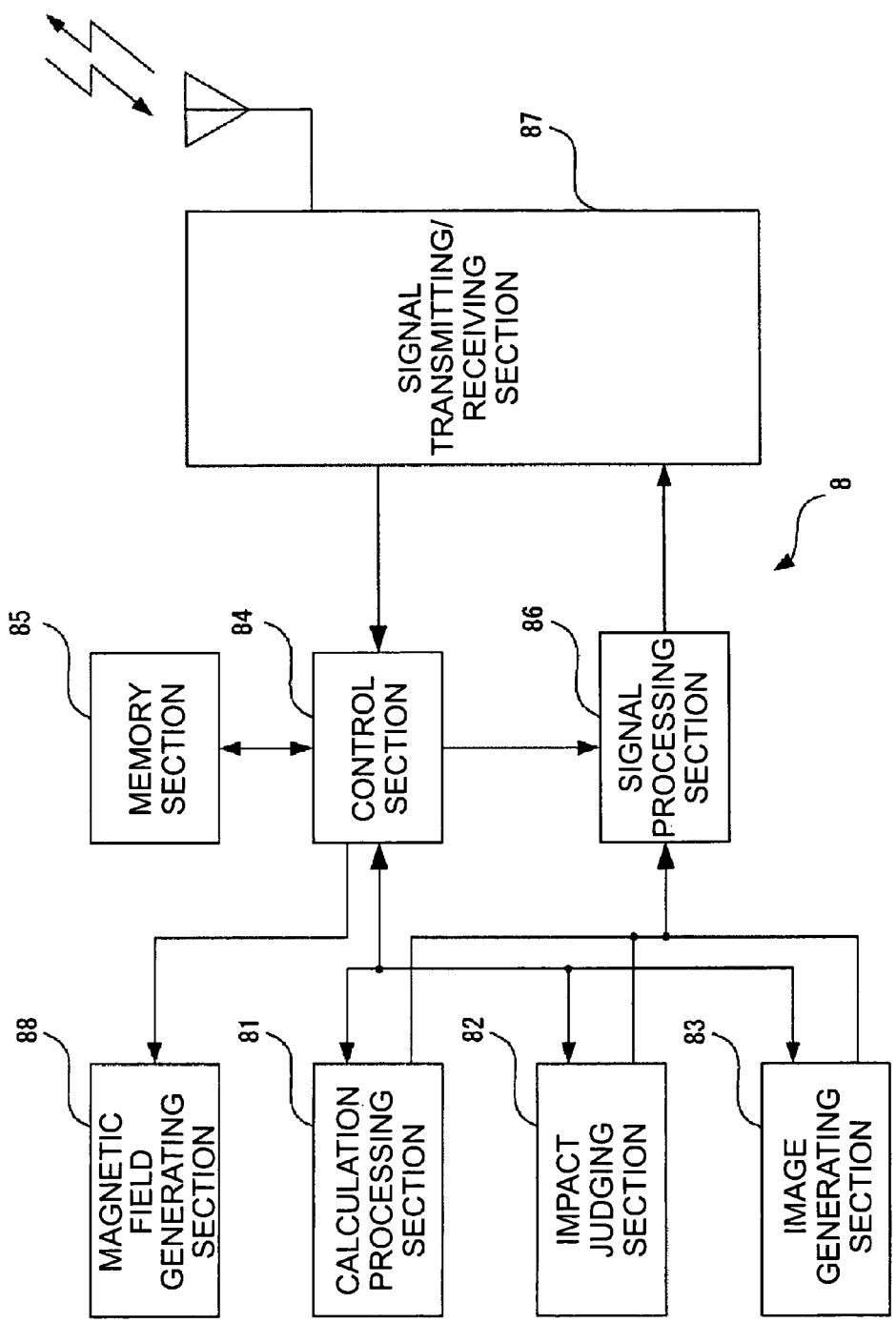
FIG. 13 is a block diagram illustrating an example of a circuit construction of an information processing means shown in FIG. 1.

FIG. 13 is a block diagram illustrating an example of a circuit construction of the information processing means 8 shown in FIG. 1.

In FIG. 13, the information processing means 8 comprises a calculation processing section (calculating means) 81, an impact judging section (impact judging means) 82, an image generating section (image generating means) 83, a control section (control means) 84, a memory section (memory means) 85, a signal processing section 86, a signal transmitting/receiving section (communication means) 87, and a magnetic field generating section 88.

When a finger or hand of the aforementioned real glove 20 comes in contact with a target object in the virtual reality space (be judged by the impact judging section 82 to be described later), the calculation processing section 81 judges what the target object is on the basis of physical property data and quantity of state stored in the memory section 85 to be described later, calculates a reaction force from the target object to the finger points of the finger), converts the reaction force into the PWM data of the link motors 222 of the real glove 20 from the calculation result, and then transmits the converted data to the real glove 20 through the signal processing section 86 and the signal transmitting/receiving section 87.

Further, in a case where the one way clutches and the clutch mechanisms are applied to the real glove 20, the calculation processing section 81 judges whether the reaction force calculated above is larger than a predetermined threshold value or not Budging means), and on the basis of the judgment result, determines whether operation signals are transmitted to the clutch mechanisms or the PWM data signals are transmitted to the link motors 222.

Furthermore, in an image correcting process to be described later, the calculation processing section 81 determines a conversion rule for correcting positions fetched in the virtual reality image on the basis of positional information of two fingertips (for example, a thumb and a forefinger) at a reference posture and positional information of the two fingertips (hereinafter, referred to as real grasp position) in a state where the two fingertips are in contact. The calculation processing section 81 determines the conversion rule for correcting image by calculating quantity of deviation of angles of the joint sections 205, for example, in a construction of the fifth embodiment.

The impact judging section 82 judges whether the fingers of the real glove 20 impact the virtual object in the virtual reality space or not. The judgment result of the impact judging section 82 is output to the control section 84.

The image generating section 83 generates a synthesized virtual reality image by superposing image of the user's arm or fingers with the virtual reality image received previously from the base station 9 or the virtual reality image picked up by the unevenness input sections 53a, 53b of the virtual reality display device 5 and converted from the picked-up image, in accordance with instructions from the control section 84, and outputs data of the virtual reality image to the signal processing section 86. Further, as the real glove 20 displayed in the virtual reality space or the virtual reality display device 5 moves, the image generating section 83 updates and generates the virtual reality image at a predetermined time interval and output it to the signal processing section 86.

The control section 84 comprises a CPU not shown, and makes the calculation processing section 81 calculate the aforementioned reaction force on the basis of the judgment result of the impact judging section 82. Further, the control section 84 controls operations of the calculation processing section 81, the impact judging section 82 and the image generating section 83 described above, stores the calculation result, the impact judgment result and the generated image data in predetermined area of the memory section 85, and transmits the data to the corresponding means through the signal processing section 86 and the signal transmitting/receiving section 87.

The memory section 85 has a storage medium in which programs or data are memorized in advance and which is readable by a computer not shown. The storage medium comprises magnetic or optical recording mediums such as RAM (Random Access Memory: including both of volatile and nonvolatile RAMs), FD (Floppy Disk (Floppy is a registered trademark)), HD (Hard Disk), CD-ROM (Compact Disc Read-Only Memory), etc., or semiconductor memory. The storage medium may be fixedly or detachably provided in the memory section 85, and in the storage medium, various application programs, displayed-image modifying process programs, displayed-image synthesizing process programs corresponding to the virtual reality display device 5, the information processing means 8 and the force-feedback supply apparatus 2, and data or document data processed through the various process programs are stored.

Some or all of the programs or data stored in the storage medium may be received from the signal transmitting/ receiving section 87 through a transmission medium such as network circuits (for example, internet, phone wire, etc.) from another apparatus such as a server or a client (the base station 9 in this embodiment) and stored, and the storage medium may be a storage medium in a server of the base station 9 constructed on the network. Furthermore, the programs may be transmitted from a server or a client through the transmission medium such as network circuits and installed in the information processing means 8. Furthermore, the programs may be programs capable of realizing some of the aforementioned functions, and may be programs capable of realizing the aforementioned functions in combination with programs recorded in advance in a computer system.

The signal processing section 86 performs the signal process such as amplification of the image data or the control signals to be transmitted to the virtual reality display device 5 or the force-feedback supply apparatus 2. The signal transmitting/receiving section 87 performs the control for transmitting and receiving the signals or data processed by the signal processing section 86 to/from external means such as the virtual reality display device 5 or the force-feedback supply apparatus 2.

Although its details are not shown, the magnetic field generating section 88 is, for example, an orthogonal coil type magnetic field generator (X direction coil, Y direction coil, Z direction coil) corresponding to the position and posture detecting section 23 shown in FIG. 7. The magnetic field generating section 88 generates the magnetic fields in the order of the X, Y and Z direction coils in accordance with instructions from the control section 84, so that the X, Y and Z direction detecting coils 231, 232, 233 of the position and posture detecting sections 23 of the real glove 20 are allowed to detect the generated magnetic fields and the position and posture detecting section 56 of the virtual reality display device 5 is also allowed to detect the generated magnetic fields.

Furthermore, the magnetic field generating section 88 may be provided within the information processing means 8 as shown, but may be a magnetic field generating device constructed separately from the information processing means 8. Specifically, when a portable phone or a PDA is used as the information processing means 8, since the magnetic field generating section cannot be provided therein later, the separate construction is useful. Even if the magnetic field generating device (or magnetic field generating section) is provided separately like this, the control thereof can be performed by means of the control signal from the information processing means 8.

Next, actions (operations) of the force-feedback supply system 1 according to a first embodiment will be described. Here, a case where a user performs manipulation of a virtual personal computer displayed in a virtual reality space using the force-feedback supply system 1 is exemplified.

The user turns on power sources of the respective means, mounts the real gloves 20 on both hands, and wears the virtual reality display device 5 having a glasses shape (mounts it on a face). Then, a virtual reality image including the virtual personal computer is displayed in the image display sections 51*a*, 51*b* of the virtual reality display device 5.

When the user's arm is allowed to enter the virtual reality image displayed in the image display sections 51*a*, 51*b*, the image of the hand or arm prepared by the image generating section 83 of the information processing means 8 is displayed as a virtual object in the virtual reality image. When the user moves his hand or fingers, the hand or fingers displayed in the virtual reality image are moved in conjunction with actual movement of the hand or fingers.

When the information processing means 8 detects by means of the impact judging section 82 that a target object in the virtual reality image, that is, a part (for example, a keyboard) of, for example, the virtual personal computer in this embodiment and a part of the user's fingers have the same coordinates, the information processing means 8 sends instructions of generating a tactual sense and a force-feedback to the real gloves 20 on the basis of the calculation result of the calculation processing section 81. Specifically, the information processing means 8 transmits data to the real gloves 20 through the signal transmitting/receiving section 87, the data including the dynamic power generating section 211 to be driven and the PWM data to be used for the driving, or the link motor 222 to be driven and the PWM data to be used for the driving, which are obtained from the calculation result of reaction force by the calculation processing section 81.

The real gloves 20 drive the specified dynamic power generating sections 211 by means of the PWM control for a time designated with specified torques, in accordance with instructions from the information processing means 8. As a result, the contact plates 214*a* of the tactual sense supply pin 214 arranged at sites having the same coordinates as a part of the virtual personal computer are projected, so that a tactual sense is applied to the user's fingertips having the same coordinates as a part of the virtual personal computer. That is, the fingertips are supplied with a sense such as a sense of touch, a texture, a shape, an intensity, etc.

At the same time, the real gloves 20 drive the specified link motors 222 by means of the PWM control for a time designated with specified torques, in accordance with instructions from the information processing means 8. As a result, for example, in a case of a real personal computer, the force-feedback applied to the finger joints in contact with the keyboard, that is, a force corresponding to the pressing force (reaction force) applied to the finger joints is supplied to the user's finger joints.

Furthermore, when the user moves his fingers in a direction of pressing keys of the virtual personal computer, the virtual reality image representing a figure of pressing the keys is displayed in the image display sections 51*a*, 51*b* in accordance with variation in coordinates of the fingers.

In this case, the information processing means 8 generates the image data of the virtual reality image for reproducing variation of the display state due to the pressed keys in the virtual reality image by means of the image generating section 83, and transmits the image data to the virtual reality display device 5 through the signal transmitting/receiving section 87. Then, the virtual reality display device 5 displays the image having reflected the pressed key in the display image of the virtual personal computer, on the basis of the image data of the virtual reality image received from the information processing means 8.

As described above, according to the force-feedback supply apparatus 2 and the force-feedback supply system 1, it is possible to easily and surely execute the mounting and the removing of the real gloves 20, and it is also possible to accurately and surely obtain positions and postures of predetermined sites of the user's hand and fingers in the virtual reality space.

Furthermore, according to the force-feedback supply apparatus 2 and the force-feedback supply system 1, it is possible to accurately and surely present the force-feedback and the tactual sense to the user's fingers in accordance with the virtual reality image.

As a result, the user can perform actions (manipulations) in the virtual reality space pleasantly, easily and surely.

Furthermore, in the tactual sense generating sections 21, since the slack of the actuator wires 212 can be prevented, it is possible to more accurately and surely apply the pressing force having a desired magnitude to the front sides of the user's fingers from the tactual sense supply pins 214.

As a result, the user can more accurately and surely feel a sense corresponding to contact of the front sides of the fingers with the object (target object) in the virtual reality image from the front sides of the fingers.

Furthermore, in the tactual sense generating sections 21, since the actuator wires 212 are arranged roughly in parallel to the front sides of the fingers (along the front sides of the fingers) and almost vertical force is applied to the front sides of the fingers by reeling the actuator wires 212, it is possible to make the mechanism for supplying a tactual sense thin, and as a result, to considerably suppress the thickness of the real gloves 20 at the front side of the fingers.

Furthermore, since the force-feedback generating sections 22 have the link mechanisms, it is possible to cope with any one of a state where the fingers are spread and a state where the fingers are bent, and as a result, to more surely present the force-feedback to the fingers.

Furthermore, since the real gloves 20 have the gloves 2a, it is possible to easily and surely execute the mounting and the removing of the real gloves 20, and also to easily and surely execute actions (manipulations) in the virtual reality image.

Furthermore, although a case where the personal computer displayed in the virtual reality image is virtually manipulated has been described as an example in the aforementioned embodiment, the present invention is not limited to this, but may be used for treating other objects such as a virtual book. In a case of treating the virtual book, for example, when touching edges of the virtual book or turning pages, it is possible to feel the tactual sense or the force-feedback applied to the fingers when touching edges of a real book or turning pages.

In the present invention, the virtual reality image may not be displayed. That is, there may be existed predetermined data corresponding to the virtual reality image, and on the basis of the predetermined data, the tactual sense or the force-feedback may supplied to the fingers.

Next, a second embodiment of the force-feedback supply apparatus and the image processing apparatus according to the present invention will be described. FIG. 14 is a longitudinal sectional view illustrating a constructional example of the tactual sense generating section of the force-feedback supply apparatus according to the second embodiment.

Now, the force-feedback supply apparatus 2 according to the second embodiment will be described focusing on differences between the aforementioned first embodiment and the second embodiment, and description of the same contents will be omitted.

As shown in FIG. 14A, in the force-feedback supply apparatus 2 according to the second embodiment, each of the unit tactual sense generating sections (actuators) 210 of the tactual sense generating section 21 comprises a dynamic power generating section (moving means) 211 having a motor (driving source) 211a, an actuator wire (filamentous substances having flexibility) 212 provided to be movable in a longitudinal direction, and a tactual sense supply section 216 for pressing a front side of a finger to generate a tactual sense.

The tactual sense supply section 216 is used for applying a sense of touch (contact/non-contact states, intensity, etc.) to the front side of the user's finger, and is made of an elastic member (elastic body) such as a plate spring. In this case, it is preferable that the tactual sense supply section 216 has a proper rigidity, and can be made of an elastic body such as various metals.

The tactual sense supply section 216 comprises a first plate piece (pressing portion) 216a and a second plate piece (sliding portion) 216b. One end of the first plate piece 216a and one end of the second plate piece 216b are bonded each other, and the other end of the first plate piece 216a is provided with a fine contact portion 216c which is a portion for coming in contact with the front side of the finger. The contact portion 216c can be formed, for example, by bending an end of the first plate piece 216a toward the second plate piece 216b.

Further, one end of the tactual sense supply section 216, that is, a left end portion in FIG. 14A is curved to be convex downwardly in FIG. 14A.

A cylinder shaped guide section (moving direction restricting means) 217 for restricting the moving direction of the first plate piece 216a is disposed between the first plate piece 216a and the second plate piece 216b.

A pressing plate 218 is provided at a lower side of the tactual sense supply section 216 in FIG. 14A, and the tactual sense supply section 216 is movable (slidable) along the pressing plate 218. In this case, since the left end portion of the tactual sense supply section 216 in FIG. 14A is curved, the tactual sense supply section 216 can be smoothly and surely moved.

The guide section 217 is fixed to the pressing plate 218, and the pressing plate 218 is fixed to the glove 2a. That is, both of the guide section 217 and the pressing plate 218 are fixed to the glove 2a.

Further, one end of the actuator wire 212 is fixed to a right end portion of the second plate piece 216b of the tactual sense supply section 216 in FIG. 14A.

When the actuator wire 212 is reeled by means of the drive of the. motor 211a of the dynamic power generating section 211, the actuator wire 212 is moved toward the right side in FIG. 14A (toward the base end of the finger) along the front side of the finger, and at the same time, the tactual sense supply section 216 attached and fixed to the actuator wire 212 is also moved toward the right side in FIG. 14A along the front side of the finger.

At that time, as shown in FIG. 14B, movement of the first plate piece 216a of the tactual sense supply section 216 toward the right side in FIG. 14B is restricted by means of the guide section 217, and the first plate piece is guided by the guide section 217 and thus moved upwardly in FIG. 14B (be projected toward the front side of the finger). That is, the tactual sense supply section 216 is elastically deformed, and a posture of the first plate piece 216a is changed into the posture shown in FIG. 14B, so that the contact portion 216c is moved roughly perpendicularly and upwardly with respect to the front side surface of the finger (be pushed upwardly).

On the other hand, the actuator wire 212 is energized toward the left side in FIG. 14B (in a direction inverse to the moving direction of the actuator wire 212 when the first plate piece 216a is projected) by means of the restoring force (elastic force) of the tactual sense supply section 216. That is, the tactual sense supply section 216 (first plate piece 216a) also serves as an energizing means.

By application of a force for moving the contact portion 216c roughly vertically and upwardly, the contact portion 216c presses the front side of the finger vertically, and as a result, the pressing force is applied to the front side of the user's finger.

This operation is carried out by means of the specified unit tactual sense generating section 210 of the plurality of unit tactual sense generating sections 210, and as a result, the tactual sense is supplied (applied) to the front side of the user's finger. Therefore, the user can feel a sense corresponding to the contact of the front side of the finger with the object (target object) in the virtual reality image, from the front side of the finger.

In the specified unit tactual sense generating section 210, when the drive of the motor 211a of the dynamic power generating section 211 is stopped and the reeled state of the actuator wire 212 is released, the tactual sense supply section 216 returns to the initial state shown in FIG. 14A, by means of the restoring force (elastic force) of the tactual sense supply section 216 and the pressure from the user's finger.

As a result, the pressing force applied to the front side of the user's finger from the tactual sense supply section 216 is substantially extinguished. According to the force-feedback supply apparatus 2, advantages similar to the first embodiment described above are obtained.

Next, a third embodiment of the force-feedback supply apparatus and the force-feedback supply system according to the present invention will be described.

Figure 15:
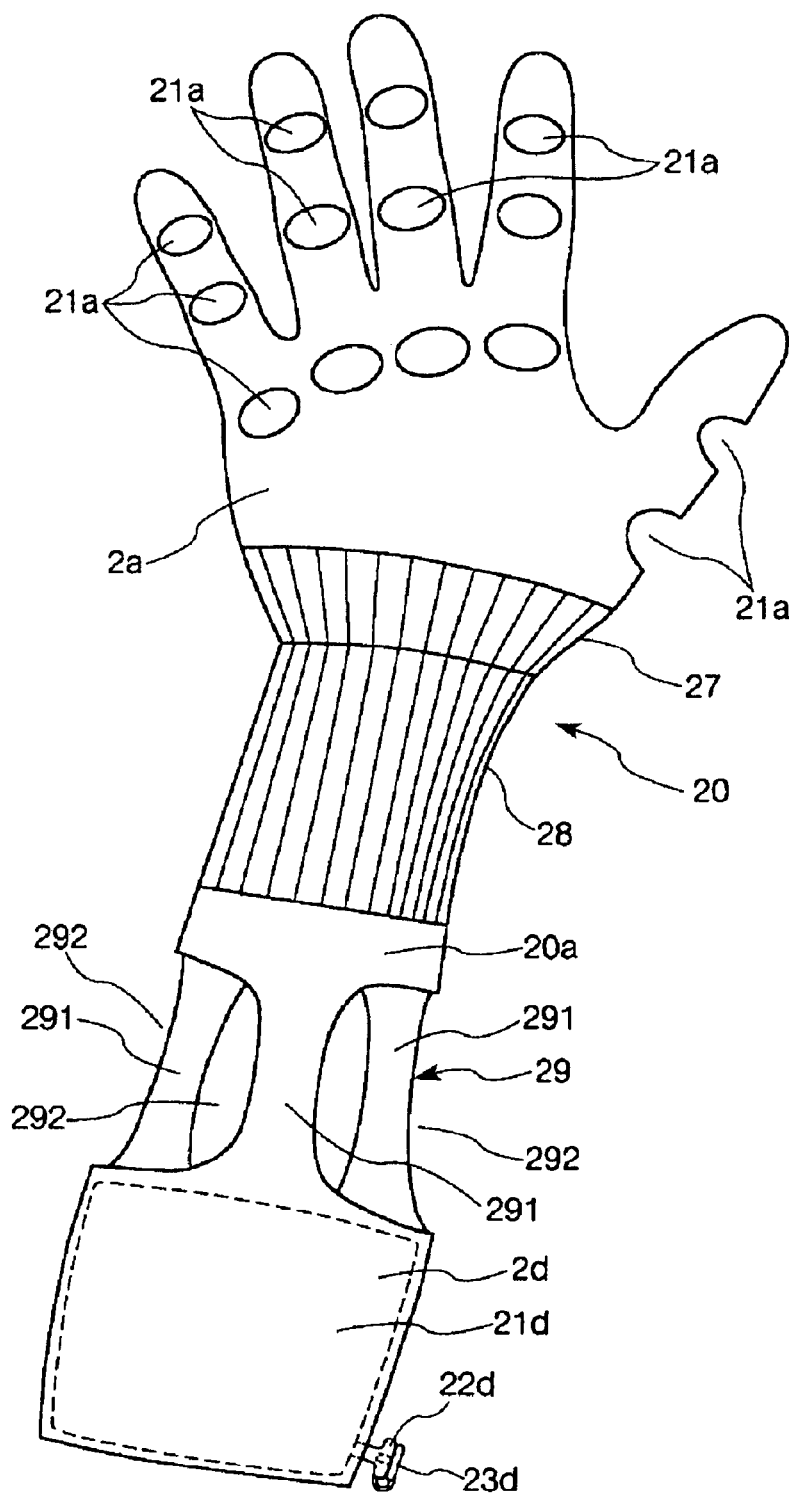
FIG. 15 is an outer view (in which some parts are omitted) illustrating an example of an outer construction of a real glove of a force-feedback supply apparatus according to a third embodiment.

FIG. 15 is an outer view (in which some parts are omitted) illustrating an example of an outer construction of the real glove of the force-feedback supply apparatus according to the third embodiment. For the purpose of simplifying the figure, the tactual sense generating section 21, the dynamic power generating section 211, the force-feedback generating section 22, the position and posture detecting section 23, the control section 24 and the power supply section 30 shown in FIG. 3 are not shown in FIG. 15.

Now, the force-feedback supply apparatus 2 according to the third embodiment will be described focusing on differences between the first embodiment described above and the third embodiment, and description of the same contents will be omitted.

As shown in FIG. 15, in the force-feedback supply apparatus 2 according to the third embodiment, an end portion in the elbow side (base end side) of the cylinder shaped section 20a of the glove 2a of the real glove 20 is provided with an arm fixing section 2d of a type (air injection type) in which the arm fixing section is fixed to the arm by means of air pressure due to the injection of air.

The arm fixing section 2d comprises an arm fixing section body 21d having a bag shape into which air is injected, and an air injecting section 22d provided in the arm fixing section body 21d. The outer appearance of the arm fixing section body 21d forms a cylinder shape.

A hollow portion of the air injecting section 22d communicates with inside of the arm fixing section body 21d, and a front end portion of the air injecting section 22d is provided with a cap 23d.

When the cap 23d is mounted on the front end portion of the air injecting section 22d, air tightness in the arm fixing section body 21d is kept, and when the cap 23d is separated, injection and ejection of air is carried out to the arm fixing section body 21d through the air injecting section 22d.

The arm fixing section 2d is shaped using a mold such as rubber mold so as to adapt a shape of a user's arm for each user.

When a user mounts the real glove 20, the glove 2a is first mounted, and then air is injected into the arm fixing section body 21d of the arm fixing section 2d.

In injection of air, the cap 23d is separated from the front end portion of the air injecting section 22d, and then air is injected into the arm fixing section body 21d through the air injecting section 22d.

When a predetermined quantity of air has been injected, the cap 23d is mounted on the front end portion of the air injecting section 22d.

As described above, the real glove 20 is fixed to the user's arm by means of the air pressure of the arm fixing section 2d, and is also fixed to the user's wrist by means of the restoring force (elastic force) of the wrist fixing section 28.

When the user takes off the real glove 20, the air is first discharged from inside of the arm fixing section body 21d of the arm fixing section 2d, and then the real glove 20 is separated from the hand.

According to the force-feedback supply apparatus 2, the advantages similar to those in the first embodiment described above are obtained, and since the arm fixing section 2d of the force-feedback supply apparatus 2 is an air injection type, it is possible to easily and rapidly perform the mounting and the removing of the real glove 20.

Further, in the present invention, the unit tactual sense generating section 210 of the tactual sense generating section 21 may be constructed as in the second embodiment described above.

Next, a fourth embodiment of the force-feedback supply apparatus and the force-feedback supply system according to the present invention will be described.

Figure 16:
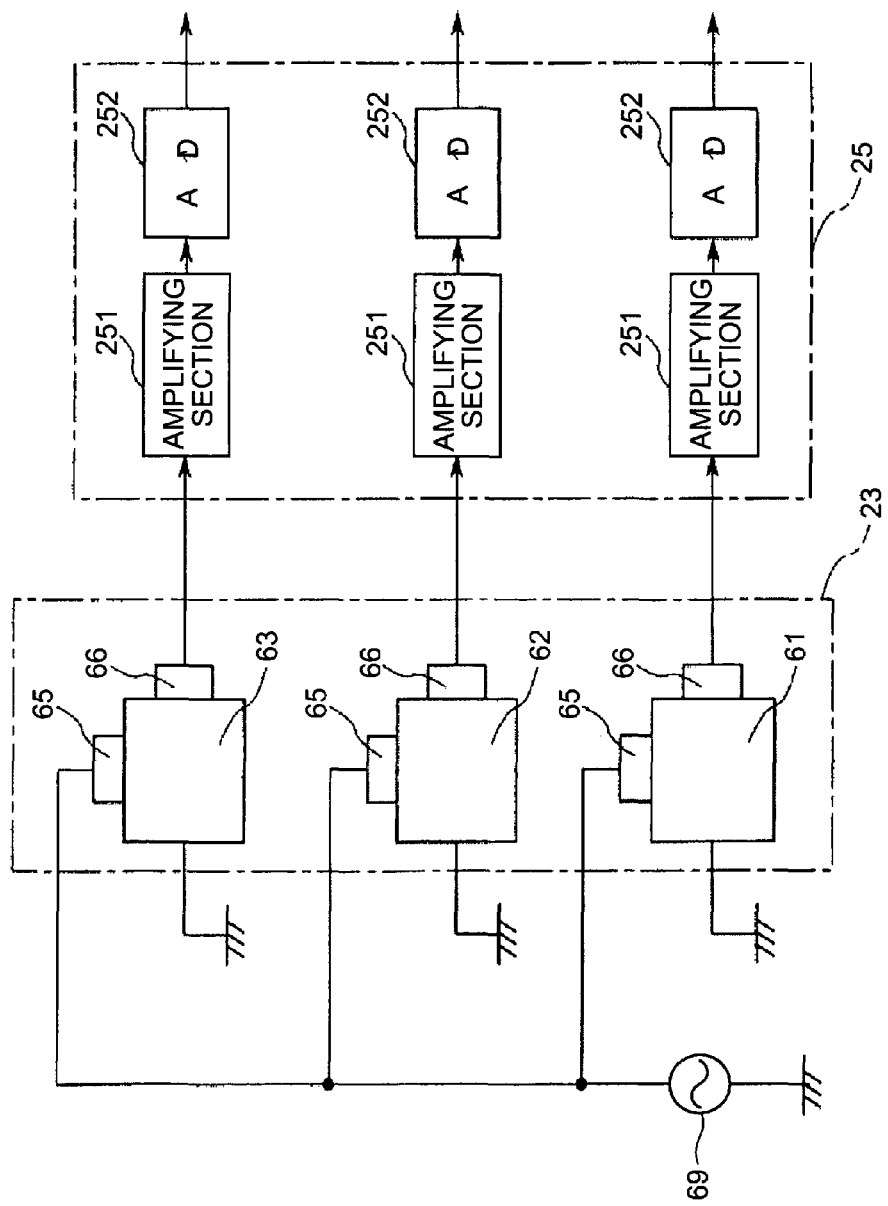
FIG. 16 is a block diagram illustrating a constructional example of a position and posture detecting section of a force-feedback supply apparatus according to a fourth embodiment.
Figure 17:
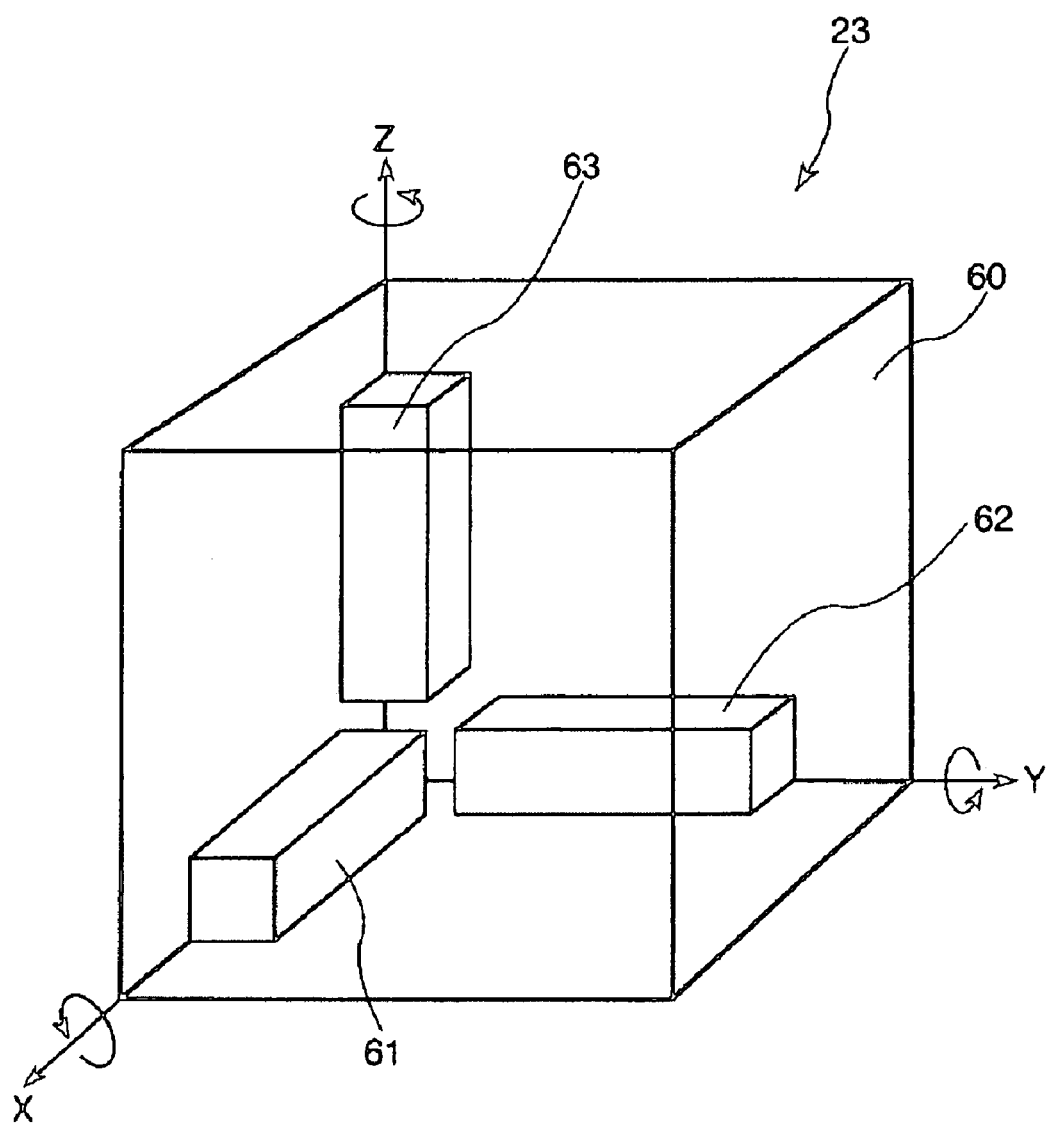
FIG. 17 is an outer view (in which some parts are omitted) illustrating a constructional example of the position and posture detecting section of the force-feedback supply apparatus according to the fourth embodiment.
Figure 18:
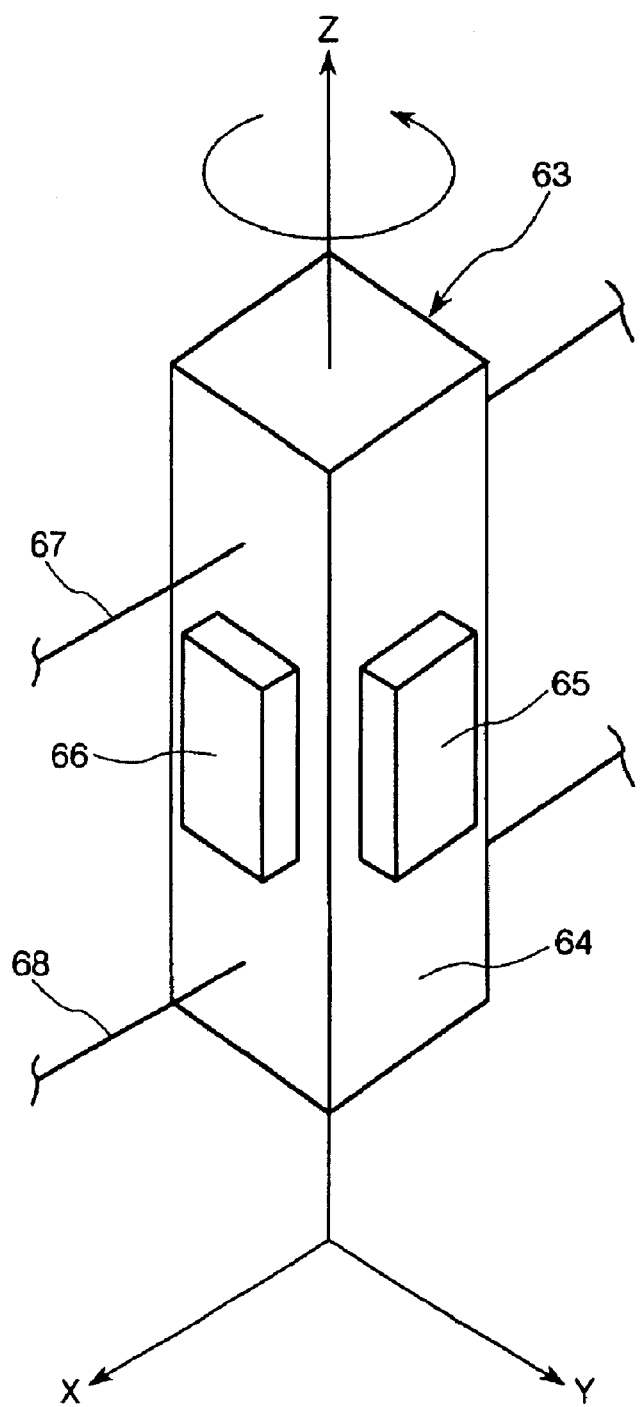
FIG. 18 is an outer view illustrating a constructional example of a Z direction detecting sensor of the position and posture detecting section shown in FIG. 17.

FIG. 16 is a block diagram illustrating a constructional example of the position and posture detecting section of the force-feedback supply apparatus according to the fourth embodiment, FIG. 17 is an outer view (in which some parts are omitted) illustrating a constructional example of the position and posture detecting section of the force-feedback supply apparatus according to the fourth embodiment, and FIG. 18 is an outer view illustrating a constructional example of a Z direction detecting sensor of the position and posture detecting section shown in FIG. 17. In FIGS. 17 and 18, it is assumed that an X axis, a Y axis and a Z axis are orthogonal to each other.

Now, the force-feedback supply apparatus 2 according to the fourth embodiment will be described focusing on differences between the first embodiment described above and the fourth embodiment, and description of the same contents will be omitted.

The force-feedback supply apparatus 2 according to the fourth embodiment employs a gyro-sensor (gyroscope) for detecting the angular velocities of the X axis, the Y axis and the Z axis orthogonal to each other using Coriolis force, as the position and posture detecting section (position detecting means) 23.

In the force-feedback supply apparatus 2, the peripheral image is picked up by means of the unevenness input sections (image pickup means) 53a, 53b, positions of the fingers are obtained on the basis of the image data from the unevenness input sections 53a, 53b, when portions corresponding to the fingers are included in the picked-up peripheral image, and the positions of the fingers are detected by means of the position and posture detecting sections 23 and the positions of the fingers are obtained on the basis of information from the position and posture detecting sections 23, when the portions corresponding to the fingers are not included in the picked-up peripheral image.

As shown in FIG. 17, a position and posture detecting section 23 comprises a casing 60, an X direction detecting sensor (first detecting sensor) 61 provided in the casing 60 for detecting an angular velocity around the X axis, a Y direction detecting sensor (second detecting sensor) 62 for detecting an angular velocity around the Y axis, a Z direction detecting sensor (third detecting sensor) 63 for detecting an angular velocity around the Z axis.

Further, as shown in FIG. 18, the Z direction detecting sensor 63 comprises an elinvar (base support) 64, a vibrating piezoelectric element 65 provided in the elinvar 64, and a detecting piezoelectric element 66. The Z direction detecting sensor 63 is supported by two wires 67, 68.

The elinvar 64 has a substantially rectangular parallelepiped shape extending in the Z axial direction, one plane of two planes roughly orthogonal each other is provided with the vibrating piezoelectric element 65, and the other plane is provided with the detecting piezoelectric element 66. In this case, the vibrating piezoelectric element 65 is arranged in a plane perpendicular to the Y axis, and the detecting piezoelectric element 66 is arranged in a plane perpendicular to the X axis, but the arrangement may be inverted.

When an AC voltage is applied to the vibrating piezoelectric element 65 of the Z direction detecting sensor 63 from an AC power source 69 shown in FIG. 16, the vibrating piezoelectric element 65 vibrates in the X axial direction (flexuously vibrates), and as a result, the elinvar 64 also vibrates in the X axial direction. At that time, when a rotation (angular velocity) occurs around the Z axis, a voltage (signal) having a level corresponding to the angular velocity is detected by means of the detecting piezoelectric element 66.

Since the construction of the X direction detecting sensor 61 and the Y direction detecting sensor 62 are similar to that of the Z direction detecting sensor 63, description thereof will be omitted. In operations thereof, when a rotation (angular velocity) occurs around the X axis, a voltage (signal) having a level corresponding to the angular velocity is detected by means of the detecting piezoelectric element 66 of the X direction detecting sensor 61, and when a rotation (angular velocity) occurs around the Y axis, a voltage (signal) having a level corresponding to the angular velocity is detected by means of the detecting piezoelectric element 66 of the Y direction detecting sensor 62.

As shown in FIG. 16, a signal (detection data) corresponding to the angular velocity around the X axis detected by the X direction detecting sensor 61, a signal (detection data) corresponding to the angular velocity around the Y axis detected by the Y direction detecting sensor 62 and a signal (detection data) corresponding to the angular velocity around the Z axis detected by the Z direction detecting sensor 63 of the position and posture detecting section 23 are amplified in the amplifying sections 251 of the signal processing sections 25, are converted into digital signals in the A/D converting section 252, output to the signal transmitting/receiving section 26 shown in FIG. 2, and then transmitted to the information processing means 8 through the signal transmitting/receiving section 26.

The information processing means 8 receives the signals transmitted from the real glove 20, on the basis of the signals (information), calculates positions and postures of the respective portions of the fingers, the hand, the wrist and the arm mounted with the real glove 20, that is, the coordinates of the respective portions, and then stores the information in a predetermined storage area of the memory section 85 for use in the respective processes.

Next, a fifth embodiment of the force-feedback supply apparatus and the force-feedback supply system according to the present invention will be described.

Figure 19:
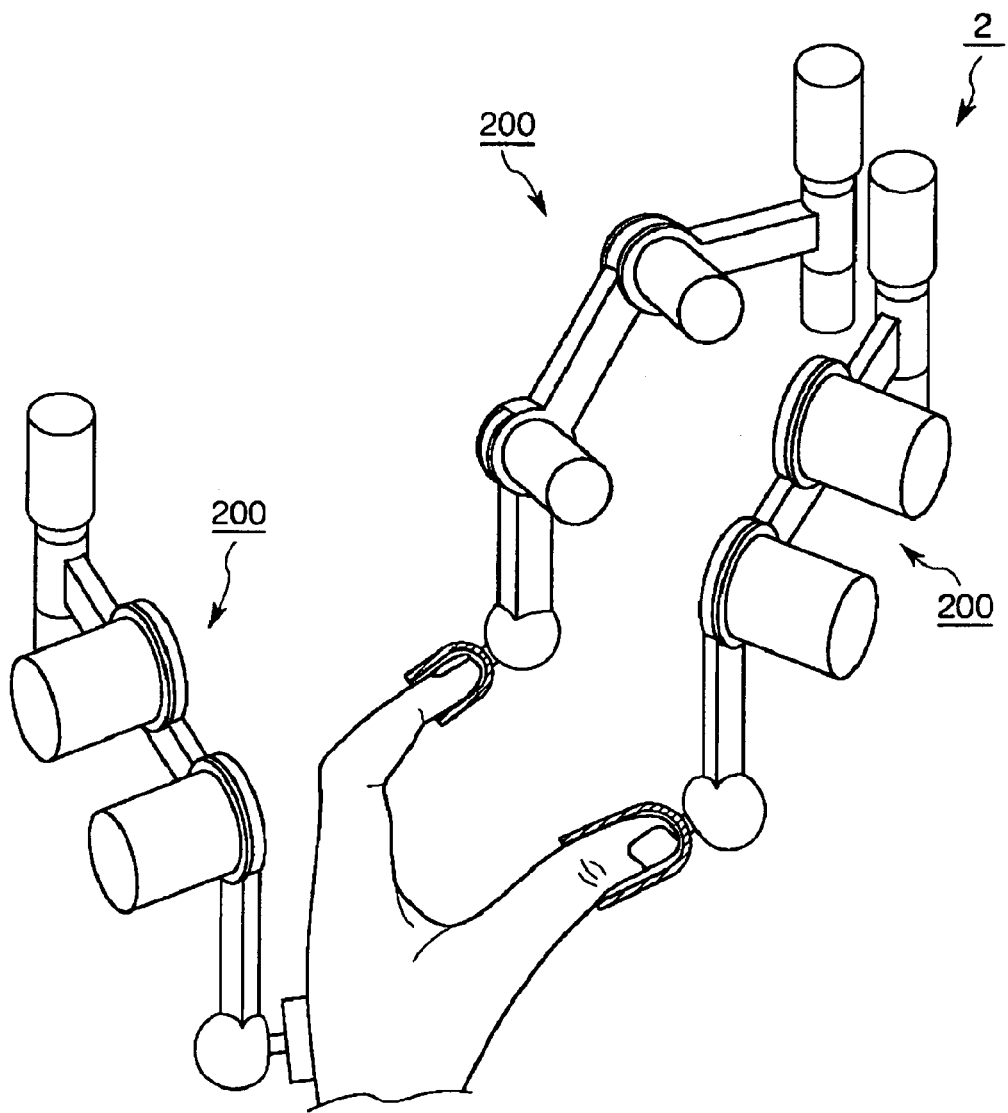
FIG. 19 is a perspective view schematically illustrating a force-feedback supply apparatus according to a fifth embodiment.
Figure 20:
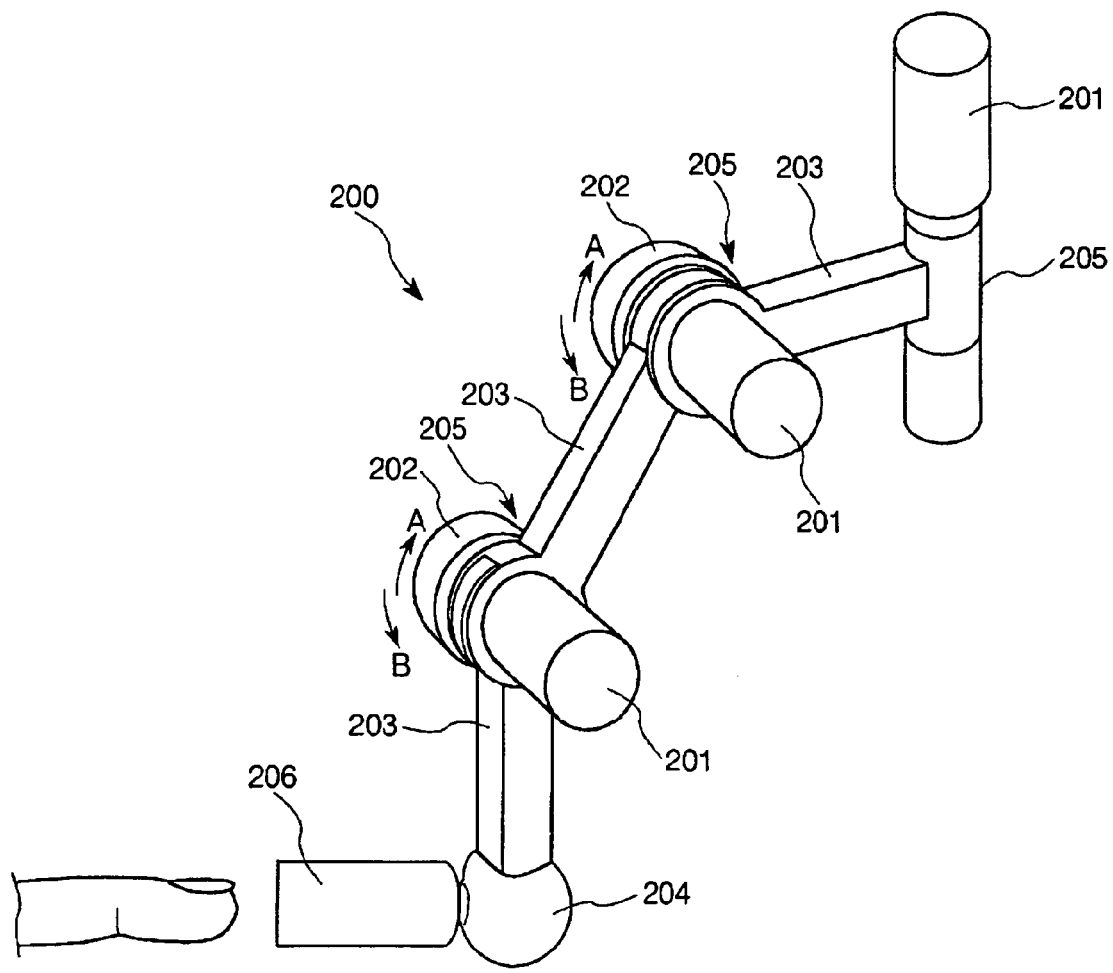
FIG. 20 is an enlarged view of an arm section corresponding to one finger in the force-feedback supply apparatus shown in FIG. 19.
Figure 21:
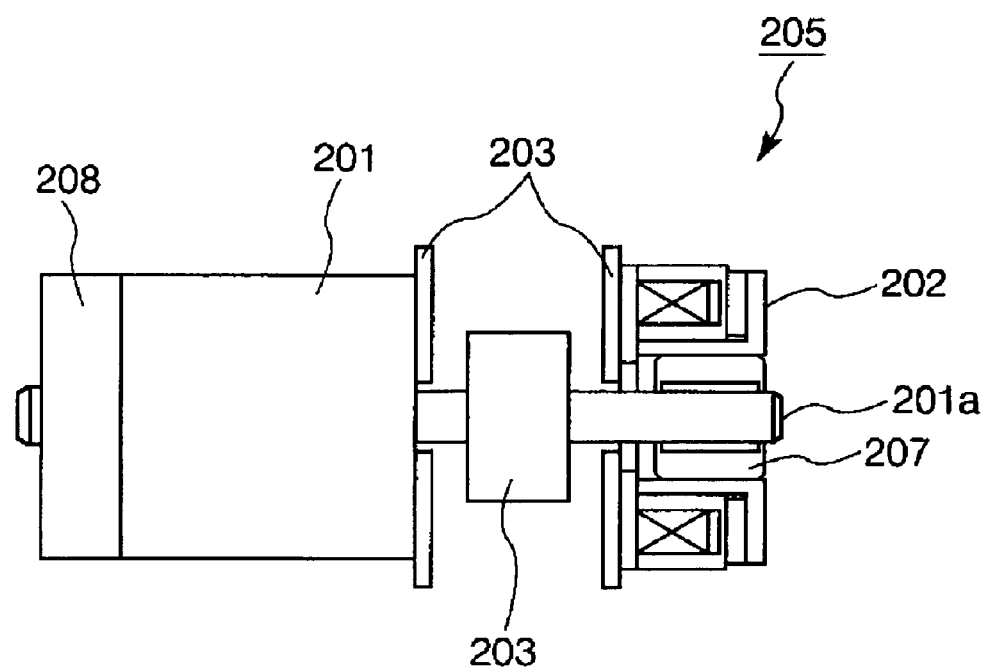
FIG. 21 is a cross-sectional view of a joint section of the arm section shown in FIG. 20.
Figure 22:
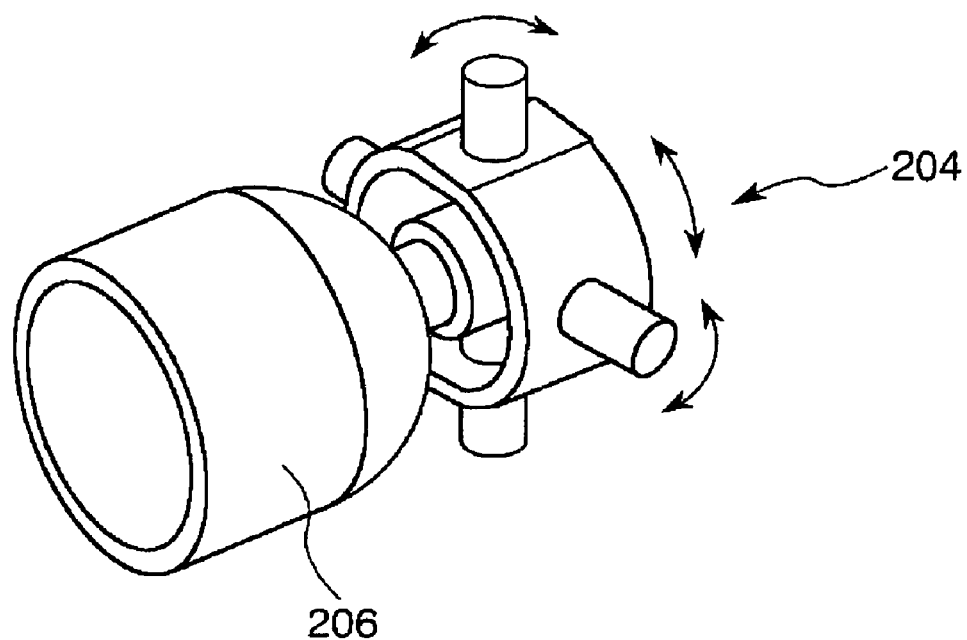
FIG. 22 is an enlarged view of a force-feedback supply section, which a finger is inserted into, of the arm section shown in FIG. 20.

FIG. 19 is a perspective view schematically illustrating the force-feedback supply apparatus according to a fifth embodiment of the present invention, FIG. 20 is an enlarged view of the arm section corresponding to one finger in the force-feedback supply apparatus shown in FIG. 19, FIG. 21 is a cross-sectional view of a joint section of the arm section shown in FIG. 20, and FIG. 22 is an enlarged view of the force-feedback supply section, which a finger is inserted into, of the arm section shown in FIG. 20.

Now, the force-feedback supply apparatus 2 according to the fifth embodiment will be described focusing on differences between the first embodiment described above and the fifth embodiment, and description of the same contents will be omitted.

The force-feedback supply apparatus 2 according to the fifth embodiment employs a plurality of motors 201 for supplying the force-feedback to the user's fingertips as the force-feedback generating section 22, and employs a plurality of links 203, a plurality of encoders 208 and a connecting section 204 to be described later, as the position and posture detecting section (position detecting means) 23.

As shown in FIG. 19, the force-feedback supply apparatus 2 according to the fifth embodiment comprises a plurality of arm sections 200 (only two arm sections 200 are shown in FIG. 19, but in this embodiment, the arm sections are used for all of the user's five fingers) for applying to the user's fingers, and an arm section 200 for applying to the back side of the user's hand.

In FIG. 19, it is shown that one end of each arm section 200 is mounted on the user's fingertips or back of the user's hand, and the other end thereof is floated in the air, but in this embodiment, all the arm sections 200 are unified into one at the other end side and the control section 24, the signal processing section 25 and the signal transmitting/receiving section 26 are arranged at the other end side. However, the present invention is not limited to the above construction, but, for example, the other end sides of the arm sections 200 may be provided with the control section 24, the signal processing section 25 and the signal transmitting/receiving section 26, respectively.

Since the structure (construction) of the arm sections 200 are substantially equal each other, the construction thereof will be described in detail, in conjunction with an arm section 200 for applying to the fingertip shown in FIG. 20, a joint section 205 of the arm section 200 shown in FIG. 21, and a force-feedback supply section 206 and a connecting section 204 shown in FIG. 22.

In FIG. 20, the arm section 200 comprises three links 203, three joint sections 205 for connecting the link 203 and the link 203, three motors 201 provided in each joint section 205, clutches 202 provided in the joint sections 205 corresponding to the motors 201, a force-feedback supply section 206 for being mounted on the user's fingertip, and a connecting section 204 constituting a joint of the force-feedback supply section 206 and the link 203.

In this embodiment, although the arm section 200 having three links 203 is described, the force-feedback supply apparatus 2 of the present invention is not limited to this, but the arm section 200 may employ any number of links 203. It is preferable that the number of links 203 is determined properly, considering degree of freedom of the user's fingertip mounted with the force-feedback supply apparatus 2 according to this embodiment and detection ability (processing ability such as detection time) of the position and posture detecting section 23.

Here, a structure of a joint section 205 will be described with reference to FIG. 21. As shown in FIG. 21, the joint section 205 for connecting two links 203 comprises a motor 201, an encoder 208 connected to a motor shaft 201a, one way clutch (movement restricting means) 207 for suppressing (restricting) rotation of the motor 201 in a predetermined direction, and a clutch (clutch mechanism) 202 connected to the motor shaft 201a through the one way clutch 207. Further, as shown in FIG. 21, one link 203 is connected to the motor shaft 201a, and the other link 203 is connected to the clutch 202.

The motor 201 can be rotated in any direction of directions A and B shown in FIG. 20, and by varying the rotation angle of the motor 201, the angle of the two links 203 connected to the joint section 205 provided with the motor 201 can be adjusted. That is, one of the two links 203 is attached to the motor shaft 201a which is an output axis of the motor 201, and the rotation angle of the motor 201 and the rotation angle of the joint section 205 are equal each other.

When the impact judging section 82 of the aforementioned information processing means 8 judges that the user's fingertip comes in contact with (impacts) a target object in a virtual reality image, the force-feedback supply apparatus 2 receives through the signal transmitting/receiving section 26 an operating force (reaction force) calculated on the basis of physical property data and quantity of state of the target object stored in the memory section 85. Then, the motor 201 is turned on and driven (rotated) to present the reaction force (force-feedback) to the user's fingertip on the basis of the operating force data. The motor 201 is a motor the rotational motor shaft 201a of which is freely rotatable when not turned on.

The encoder 208 is connected to, for example, the motor shaft 201a of the motor 201 as described above, and constitutes the position and posture detecting section 23. The encoder 208 can detect the rotation angle of the motor 201, that is, a relative rotation angle of the two links 203. The detected angle information (signals) between the two links 203 is processed in the signal processing section 25, and then is transmitted to the information processing means 8 through the signal transmitting/receiving section 26 (see FIG. 2).

A sleeve of the clutch 202 is connected to the motor shaft 201a of the motor 201 through the one way clutch 207. The clutch 202 restricts (prevents rotation) the drive of the motor 201 by allowing a current to flow in inner coil of the clutch 202, but since the one way clutch 207 is interposed, rotation in one direction is not restricted.

In FIG. 20, when the one way clutch 207 is activated, the joint sections 205 are freely rotatable in the direction A, but not rotatable in the direction B. Now, the direction A is referred to as a forward direction, and the direction B is referred to as a lock direction.

The one way clutch 207 comprises an inner wheel and an outer wheel not shown therein, and the outer wheel is fixed to the sleeve of the clutch 202 or is not rotatable. As a result, when the one way clutch 207 is rotated in the forward direction, the inner wheel is rotated, while when the one way clutch 207 is rotated in the lock direction, the inner wheel and the outer wheel are rotated together with a rotor of the clutch 202.

When the user moves his finger mounted with the arm sections 200 in the virtual reality space without contact with the target object, the motor 201 and the clutch 202 are turned off, so that the user can freely move his fingertip.

Here, all the motors 201 constitute the force-feedback generating means, the links 203, the joint sections 205, the connecting sections 204 and the force-feedback supply sections 206 constitute the force-feedback supply means.

Further, the encoders 208 and the connecting sections 204 constitute the position detecting means.

As shown in FIG. 22, the force-feedback supply section 206 has a hollow cylinder shape so that the user's fingertip can be inserted as shown in FIG. 20. When the motor 201 is activated or when the clutch 202 is turned on to activate the one way clutch 207, the force-feedback supply section 206 presents the operating force (force-feedback) generated therefrom to the user's fingertip.

Figure 23:
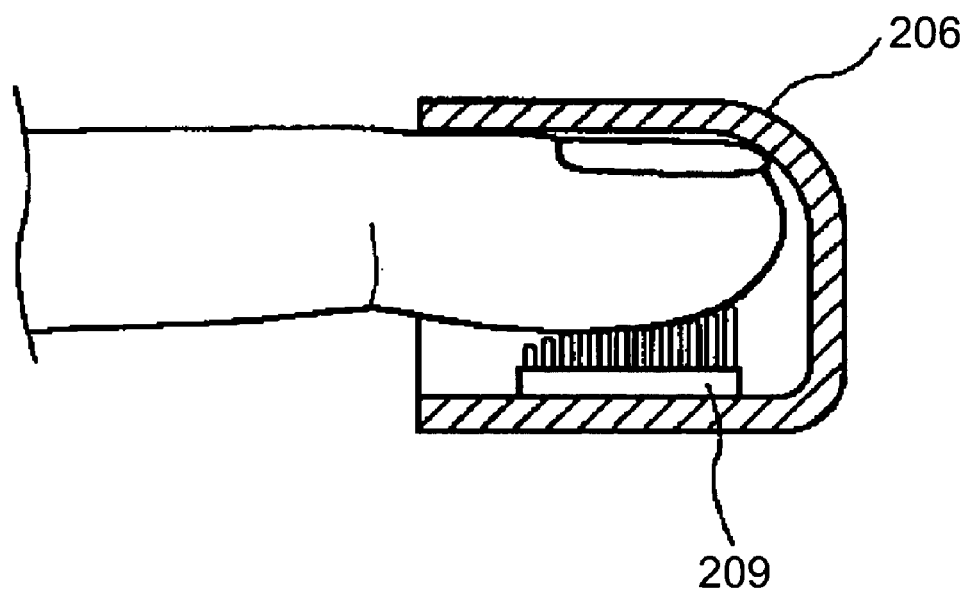
FIG. 23 is a cross-sectional view of the force-feedback supply section shown in FIG. 20 according to one embodiment of the present invention.

FIG. 23 is a cross-sectional view of the force-feedback supply section 206 according one embodiment of the present invention, and the force-feedback supply section 206 may comprise, as shown in FIG. 23, a tactual sense supply section by pin drive 209 at portions of the inner surface which come in contact with the front side of the user's finger.

As a result, advantages similar to those in the first embodiment can be obtained.

In FIG. 22, the cover of the connecting section 204 shown in FIG. 20 is removed. The connecting section 204 has a gimbal structure, and is rotatable in the arrow direction shown in FIG. 22.

The connecting section 204 comprises a rotation angle detecting means such as a potentiometer not shown, and thus can detect a posture of the force-feedback supply section 206. Further, a ball joint may be used as the connecting section 204, but in that case, it is required that a means for detecting the posture of the force-feedback supply section 206 should be provided separately.

As described above, the force-feedback supply apparatus 2 according to this embodiment can present the force-feedback to the user's fingertips by turning on/off the motors 201 or activating/inactivating the one way clutches 207 through the clutches 202 in accordance with instructions from the information processing means 8.

Figure 24:
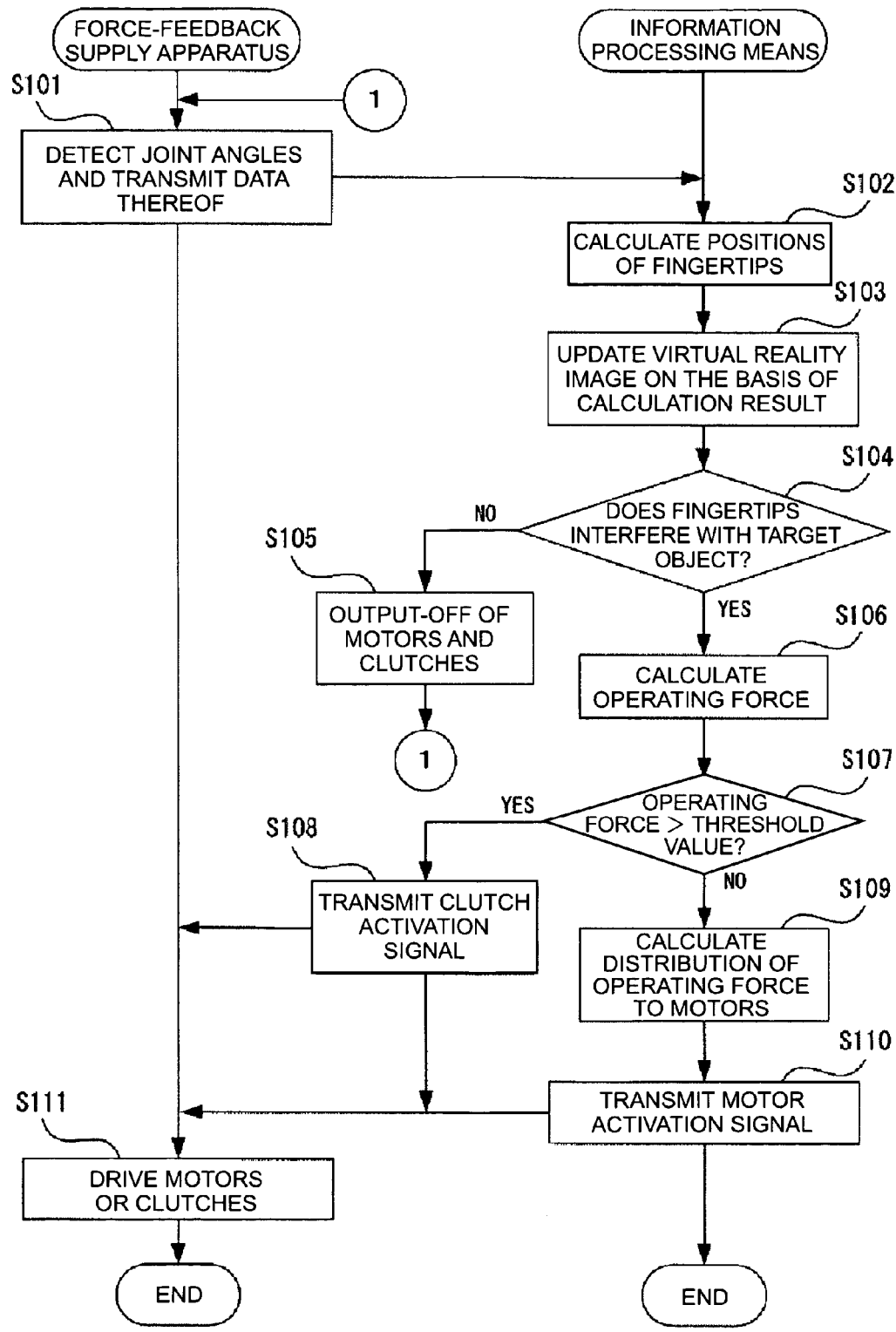
FIG. 24 is a flowchart illustrating a force-feedback supply process according to the present invention.

Next, actions (operations) of the force-feedback supply apparatus 2 according to the fifth embodiment will be described. FIG. 24 is a flowchart illustrating a force-feedback supply process (force-feedback supply method) according to the present invention. As known from the flowchart, the force-feedback supply method according to the present invention is mainly performed through data transmission/reception between the force-feedback supply apparatus 2 and the information processing means 8 in the force-feedback supply system 1. For this reason, operations of the virtual reality display device 5 are omitted in this flowchart, but explanation thereof is added as needed.

Before use, a user turns on each means (each device), mounts the force-feedback supply apparatus 2 on both hands, and wears the virtual reality display device 5 having a glasses shape (mounts on a face). As a result, a virtual reality image previously stored as image data in the memory section 85 of the information processing means 8, or a virtual reality image generated from image data picked up by the image pickup means of the virtual reality display device 5 is displayed in the image display sections 51a, 51b of the virtual reality display device 5.

Then, the respective means is initially set in the force-feedback supply system 1. In this initial setting, rotation angles of the motors 201 of the force-feedback supply apparatus 2, that is, angles of the joint sections 205 of the arm sections 200 are detected by means of the encoders 208 and the connecting sections 204, and the detected angle data are transmitted to the information processing means 8 through the signal transmitting/receiving section 26.

In the information processing means 8, the calculation processing section 81 calculates positions and postures of the user's fingertips and back of the user's hand mounted with the force-feedback supply apparatus 2 in the virtual reality space on the basis of the angle data, and the calculation result, that is, coordinates of the respective points in the virtual reality space are output to the control section 84 and the signal processing section 86.

The control section 84 allows the image generating section 83 to generate image of the user's hand in the virtual reality space in accordance with the coordinates. The image generating section 83 synthesizes the image data of the user's hand with the virtual reality image data displayed currently in the virtual reality display device 5, and transmits the synthesized image data to the virtual reality display device 5 through the signal processing section 86 and the signal transmitting/receiving section 87.

The virtual reality display device 5 displays the received virtual reality image data in the image display sections 51a, 51b. Therefore, the initial setting is completed.

When the initial setting is completed, the force-feedback supply system 1 is in a usable state. Now, operations of the force-feedback supply apparatus 2 and the force-feedback supply system 1 according to this embodiment will be described with reference to the flowchart in FIG. 24.

First, in the force-feedback supply apparatus 2, the position and posture detecting sections 23 detect angles of the joint sections 205 of the arm sections 200. That is, the position and posture detecting sections 23 detect the rotation angles of the corresponding motors 201 using the encoders 208 arranged in the joint sections 205, and detect postures of the force-feedback supply sections 206 using the rotation angle detecting means of the connecting sections 204.

Then, the detection data are output to the signal processing section 25 from the position and posture detecting sections 23, and transmitted to the information processing means 8 through the signal transmitting/receiving section 26 (step S101).

When receiving the detected data transmitted from the force-feedback supply apparatus 2 through the signal transmitting/receiving section 87, the information processing means 8 inputs the data to the calculation processing section 81 through the control section 84. Then, the calculation processing section 81 calculates the positions and the postures of the user's fingers and hands in the virtual reality space on the basis of the detected data (step S102).

That is, the calculation processing section 81 direct-kinematically calculates the positions of the user's fingertips using arm lengths of the arm sections 200 stored in advance in the memory section 85, that is, link lengths of the links 203, coordinate data of support portions (not shown) for supporting the arm sections 200, and the detected data, that is, the detected rotation angles of the joint sections 205. The calculation result is displayed as coordinates (positional information) of the user's fingertips and back of the user's hand in the virtual reality space.

The calculation result is input to the image generating section 83 through the control section 84. The image generating section 83 prepares the image of the user's hands in the virtual reality space on the basis of the calculation result, and superposes the image of hands to update the virtual reality image (step S103).

Then, the image data updated and generated are transmitted to the virtual reality display device 5 through the signal processing section 86 and the signal transmitting/receiving section 87. The virtual reality display device 5 displays the updated virtual reality image in the image display sections 51a, 51b on the basis of the received image data. As a result, the user can see his hands displayed in the virtual reality image by the image display sections 51a, 51b of the virtual reality display device 5.

Here, in a case where the calculation result of the calculation processing section 81 indicates that the user's fingers are not moved, that is, in a case that the detected data is equal to the previous detected data (here, data in the initial setting), a step S104 may be performed with no update of the virtual reality image by the image generating section 83.

In the step S104, the impact judging section (interference judging means) 82 of the information processing means 8 judges whether the user's fingertips interfere with (impact) the target object in the virtual reality space or not, on the basis of the positional information of the user's fingertips obtained by the calculation processing section 81 and the positional information of the target object in the virtual reality space stored in advance in the memory section 85. Then, when it is judged that they do not interfere with each other (No in the step S104), outputs of the motors 201 and the clutches 202 become off, that is, they are turned off (step S105), and the procedure is returned to the step S101 to repeat the same processes. Since the motors 201 or the clutches 202 are turned off currently, the procedure is returned to the step S101 as it is to repeat the same processes.

In the step S104, when it is judged that the user's fingertips interfere with the target object (Yes in the step S104), the control section 84 reads out the physical property data and the state-quantity data of the target object from the predetermined storage area of the memory section 85, and outputs the data to the calculation processing section 81. The calculation processing section 81 calculates the operating force of the target object on the user's fingers on the basis of the data (step S106).

In a step S107, the control section 84 (here, judging means) judges whether the operating force calculated by the calculation processing section 81 is larger than a predetermined threshold value previously set and stored in the predetermined storage area of the memory section 85 or not. Then, when it is judged that the operating force is larger than the predetermined threshold value, the control section 84 transmits an operating signal (activating signal) of the clutches 202 to the force-feedback supply apparatus 2 through the signal processing section 86 and the signal transmitting/receiving section 87 (step S109).

On the other hand, when it is judged that the operating force is smaller than the predetermined threshold value, the calculation processing section 81 calculates a ratio of distributing the operating force to the respective motors 201 of the force-feedback supply apparatus 2 (step S109), and transmits the calculation result as a motor activation signal to the force-feedback supply apparatus 2 through the signal processing section 86 and the signal transmitting/receiving section 87 (step S110).

The force-feedback supply apparatus 2 receiving the activation signal of the motors 201 or the activation signal of the clutches 202 inputs the activation signals to the force-feedback generating sections 22 through the control section 24. Then, the force-feedback generating sections 22 turn on the motors 201 or the clutches 202 in accordance with the activation signals. When the signals are the activation signals of the motors 201, the force-feedback generating sections 22 drive the motors 201 to generate the operating force (force-feedback), and when the signals are the activation signals of the clutches 202, the force-feedback generating sections 22 drive the clutches 202 to activate the one way clutches 207 (step S111), thereby completing the force-feedback supply process.

As a result, the user is supplied with the force-feedback generated in the motors 201 through the force-feedback supply sections 206, or movement of the user's fingertips in a predetermined direction is restricted by means of activation of the one way clutches 207.

The detection step of the joint sections 205 in the step S101 in the force-feedback supply process shown in the flowchart of FIG. 24 is performed at a predetermined time interval, for example, every one or two seconds, in accordance with the calculation ability of the calculation processing section 81 of the information processing means 8. The more a detection frequency in the detection step is, that is, the shorter the time interval is, the closer the force-feedback supplied to the user is to a natural state. Therefore, the detection frequency should be determined properly in accordance with the calculation ability of the calculation processing section 81.

Figure 25:
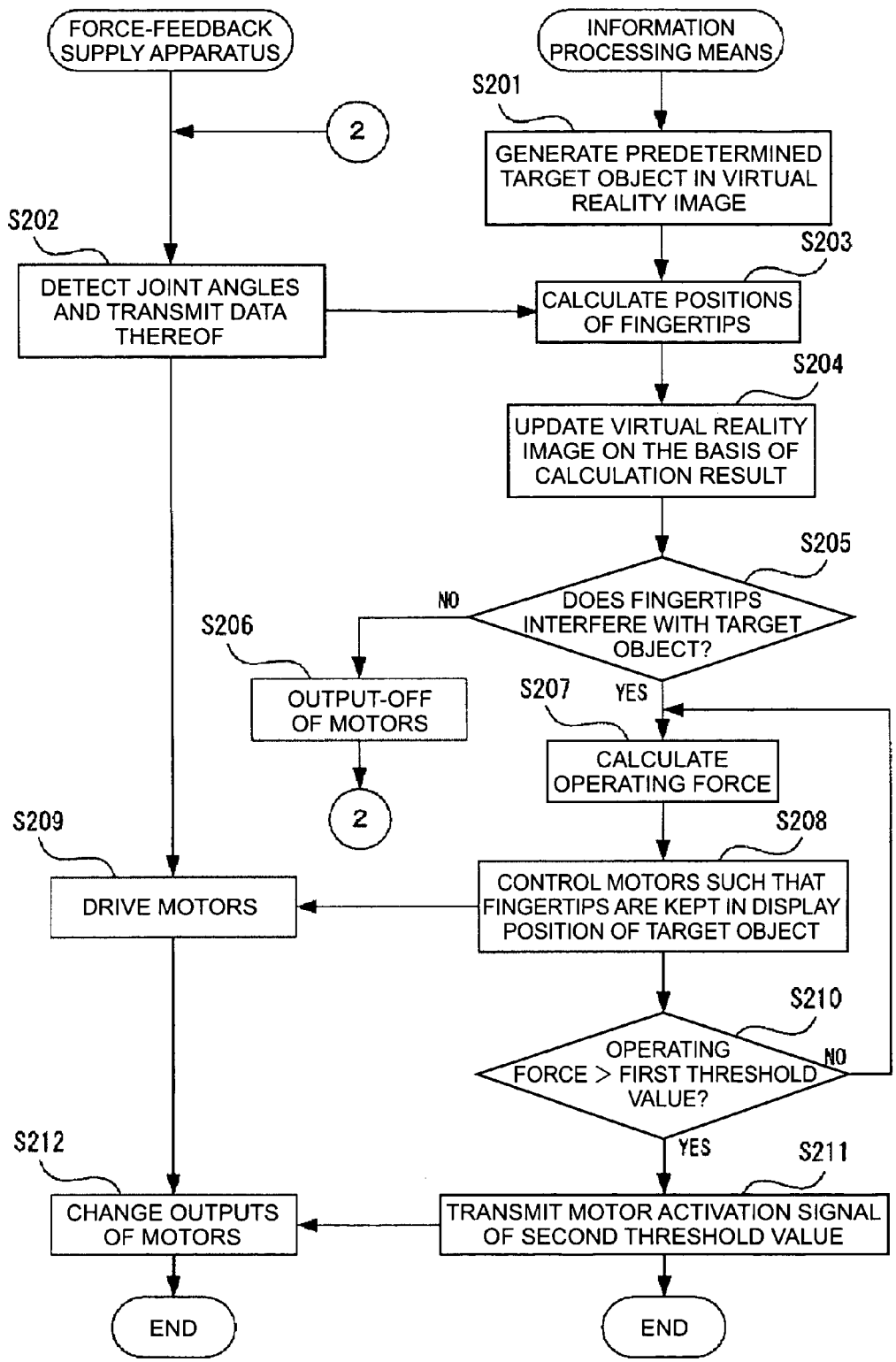
FIG. 25 is a flowchart illustrating a contrast supply process according to the present invention.

Next, a contrast supply process according to the present invention will be described with reference to a flowchart of FIG. 25. FIG. 25 is a flowchart illustrating a contrast supply process (contrast supply method) according to the present invention. It is preferable that the contrast supply process is performed when the user mounts the force-feedback supply apparatus 2 according to the present invention, that is, when use of the force-feedback supply apparatus 2 is started. The contrast supply process is a process corresponding to calibration of the force-feedback applied to the user's fingers, that is, calibration of the force-feedback supply apparatus 2.

Similarly to the flowchart of the force-feedback supply process (FIG. 24), operations of the virtual reality display device 5 are omitted in this flowchart, but description thereof is added properly as needed. Although description rambles, the force-feedback supply process is always performed in normal use after the aforementioned initial setting is completed and the contrast supply process of the present invention is performed.

First, in order to present contrast of the force-feedback to the user, the image generating section 83 of the information processing means 8 generates image of predetermined objects in the virtual reality image on the basis of the image data stored in advance in the memory section 85 (step S201). Then, the generated image is transmitted to the virtual reality display device 5 through the signal processing section 86 and the signal transmitting/receiving section 87. In the virtual reality display device 5, the image data is displayed in the image display sections 51a, 51b.

In a state where the virtual reality image is displayed in the virtual reality display device 5, the position and posture detecting sections 23 in the force-feedback supply apparatus 2 detect the angles of the joint sections 205 of the arm sections 200. That is, the position and posture detecting sections 23 detect the rotation angles of the corresponding motors 201 using the encoders 208 provided in the joint sections 205, and detect the postures of the force-feedback supply sections 206 using the rotation angle detecting means of the connecting sections 204.

Then, the detected data is output to the signal processing section 25 from the position and posture detecting section 23, and transmitted to the information processing means 8 through the signal transmitting/receiving section 26 (step S202).

When receiving the detected data transmitted from the force-feedback supply apparatus 2 through the signal transmitting/receiving section 87, the information processing means 8 inputs the data to the calculation processing section 81 through the control section 84. Then, the calculation processing section 81 calculates positions and postures of the user's fingers and hands in the virtual reality space on the basis of the detected data (step S203).

That is, the calculation processing section 81 direct-kinematically calculates the positions of the user's fingertips using arm lengths of the arm sections 200 stored in advance in the memory section 85, that is, link lengths of the links 203, coordinate data of support portions (not shown) for supporting the arm sections 200, and the detected data, that is, the detected rotation angles of the joint sections 205. The calculation result is displayed as coordinates (positional information) of the user's fingertips and back of the user's hand in the virtual reality space.

The calculation result is input to the image generating section 83 through the control section 84. The image generating section 83 prepares image of the user's hands in the virtual reality space on the basis of the calculation result, and superposes the image of hands to update the virtual reality image (step S204). In the contrast supply process, it is preferable that a proper message is displayed in the virtual reality display device 5 to press the displayed predetermined target objects with a proper intensity of force in starting.

Then, the image data updated and generated are transmitted to the virtual reality display device 5 through the signal processing section 86 and the signal transmitting/receiving section 87. The virtual reality display device 5 displays the updated virtual reality image in the image display sections 51a, 51b on the basis of the received image data. As a result, the user can see his hands displayed in the virtual reality image by the image display sections 51a, 51b of the virtual reality display device 5.

In a step S205, the impact judging section 82 of the information processing means 8 judges whether the user's fingertips interfere with (impact) the target object in the virtual reality space or not, on the basis of the positional information of the user's fingertips obtained by the calculation processing section 81 and the positional information of the target object in the virtual reality space stored in advance in the memory section 85. Then, when it is judged that they do not interfere with each other (No in step S205), outputs of the motors 201 become off, that is, they are turned off (step S206), and the procedure is returned to the step S202 to repeat the same processes. In a case where indications of interfering with the target object is displayed to the user, since the user moves his hands and fingers to intend to touch the target object in the virtual reality space, such process is rarely performed.

In the step S205, when it is judged that the user's fingertips interfere with the target object (Yes in step S205), the control section 84 reads out the physical property data and the state-quantity data of the target object from the predetermined storage area of the memory section 85, and outputs these data to the calculation processing section 81. The calculation processing section 81 calculates the initial operating force of the target object on the user's fingers on the basis of the data (step S207). In this contrast supply process, since the user as a subject presses the predetermined target object, a reaction force (interaction) inverse to the operating force is generated by means of the drive of the motors 201 which are the force-feedback generating sections 22 in order to hold (fix) the user's fingertips to the display position of the predetermined target object in the virtual reality space. For this reason, the calculation processing section 81 calculates the operating force with which the user presses the target object, using the input signal (control signal) for driving the motors 201 (or monitoring outputs of the motors by means of other sensors (not shown)).

The control section 84 controls the drive of the motors 201 which are the force-feedback generating sections 22 of the force-feedback supply apparatus 2, following the operating force by the user, so that positions of the user's fingertips are not moved from predetermined positions (steps S208, S209). In this case, the operating force by the user is also distributed to the motors 201 on the basis of the calculation result of the calculation processing section 81.

In a step S210, the control section 84 of the information processing means 8 judges whether the operating force with which the user presses the target object is larger than a first threshold value or not. When it is judged that the operating force is not larger than the first threshold value, the procedure is returned to the step S207 and the same processes (calculating the operating force and distributing the operating force to the motors 201) are repeated.

In the step S210, when it is judged that the operating force by the user is larger than the first threshold value, the control section 84 transmits the activation signals (control signal) of the motors 201 corresponding to a second threshold value stored in advance in the memory section 85, to the force-feedback supply apparatus 2 through the signal processing section 86 and the signal transmitting/receiving section 87 (step S211).

The force-feedback supply apparatus 2 receiving the activation signals of the motors 201 changes outputs of the motors 201 on the basis of the signals (step S212), and finishes the contrast supply process.

The first and second threshold values may be set to the information processing means 8 (that is, the force-feedback supply system 1) in advance, or may be constructed to be properly changed by the user utilizing the force-feedback supply system 1 (the force-feedback supply apparatus 2).

It is preferable that the first threshold value has a magnitude by which the user can sufficiently feel his touch on a predetermined object and by which the force-feedback supply apparatus 2 is not overloaded, for example, about 5 kgf (50N (Newton)).

The second threshold value may be small contrary to the first threshold value so that the user, that is, a person can feel the contrast sufficiently, and it is preferable that the operating force generated by the motors 201 is a value corresponding to about zero, that is, a value of the operating force (load) when the motors 201 are turned off (when the user's fingertips are freely movable).

As a result, since the first threshold value and the second threshold value are sufficiently apart (separated) from each other, the contrast to the user is supplied further excellently.

Figure 26:
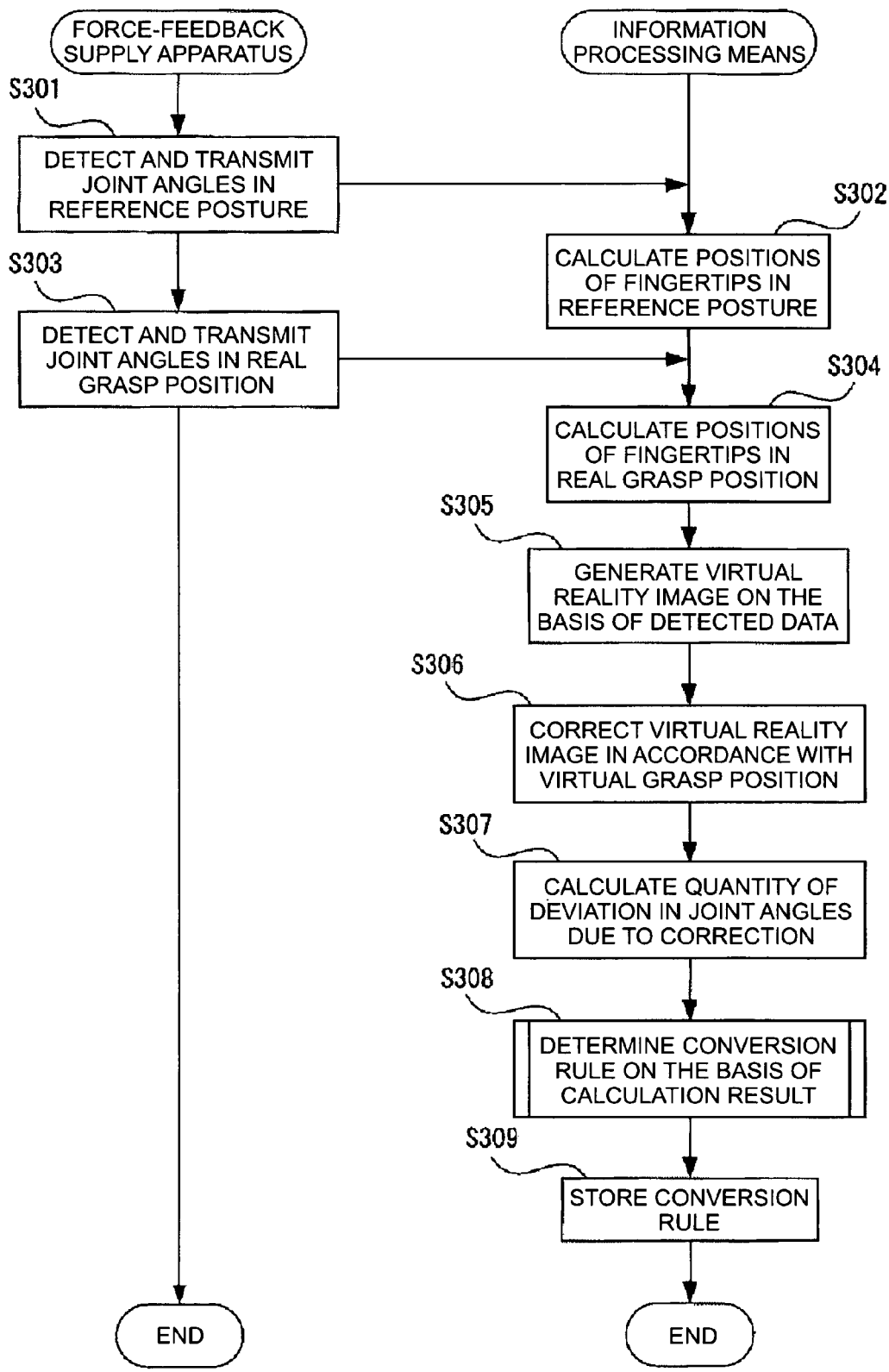
FIG. 26 is a flowchart illustrating an image correcting process according to the present invention.

Next, an image correcting method (image correcting process) according to the present invention will be described with reference to a flowchart of FIG. 26 and schematic views of FIGS. 27 to 29. As a construction of the force-feedback supply apparatus 2, the construction according the fifth embodiment will be representatively described. FIG. 26 is a flowchart illustrating an image correcting process according to the present invention, FIG. 27 is a conceptual diagram (before correction) in a case where a sheet of paper is grasped by two fingers mounted with the force-feedback supply means, FIG. 28 is a conceptual diagram (after correction) in a case where two fingers mounted with the force-feedback supply means are in contact with each other, and FIG. 29 is a conceptual diagram (before and after correction) in a case where a forefinger is corrected through the image correction process according to the present invention.

It is preferable that the image correcting process, similarly to the contrast supply process, is performed (a corresponding application program is executed) when a user mounts the force-feedback supply apparatus 2 according to the present invention, that is, when use of the force-feedback supply apparatus 2 is started. The image correcting process is a process corresponding to calibration of the virtual reality image including the user's fingers, that is, calibration of the force-feedback supply system 1.

Similarly to the flowchart of the force-feedback supply process (FIG. 24) and the contrast supply process (FIG. 25), operations of the virtual reality display device 5 are omitted in this flowchart, but description thereof is added properly as needed. Although description rambles, the force-feedback supply process is always performed in normal use, after the aforementioned initial setting is completed and the contrast supply process of the present invention is performed.

First, a user confirms the virtual reality display device 5 in which a predetermined message is displayed in accordance with instructions of the information processing means 8 (not shown in steps), and moves the hands mounted with the force-feedback supply apparatus 2 into a reference position. Here, a reference posture means a posture where at least joints of a thumb and a finger to be processed (forefinger in this flowchart) are spread, like a state where all the joints of fingers are spread and thus a palm is spread.

In the reference posture, the position and posture detecting sections 23 detect angles of the joint sections 205 of the arm sections 200 to detect positions of the user's fingertips in the virtual reality space. That is, the position and posture detecting sections 23 detect rotation angles of the corresponding motors 201 using the encoders 208 arranged in the respective joint sections 205, and detect positions and postures of the force-feedback supply sections 206, that is, positions and postures of the user's hands and fingers, using the rotation angle detecting means of the connecting sections 204. Then, the control section 24 transmits the detected data (angle data) to the information processing means 8 through the signal processing section 25 and the signal transmitting/receiving section 26 (step S301).

When receiving the detected data transmitted from the force-feedback supply apparatus 2 through the signal transmitting/receiving section 87, the information processing means 8 inputs the data to the calculation processing section 81 through the control section 84. Then, the calculation processing section 81 calculates positions and postures of the user's fingers and hands in the virtual reality space on the basis of the detected data (step S302). Then, the control section 84 stores the calculation result and the joint angels $\theta_i$ (i=1,2, . . . ) of the joint sections in a predetermined storage area of the memory section 85.

In a method of calculating the positions and postures of the user's fingers and back of the user's hand in the virtual reality space, the positions and postures of the fingertips and hand backs are direct-kinematically calculated from a predetermined reference position of the force-feedback supply system 1 (or force-feedback supply apparatus 2) using the joint angles obtained from outputs of the encoders and link lengths of the links 203, and then on the basis of the positions and postures of the fingertips and back of the user's hand obtained from the calculation result, shapes (for example, the joint angles of fingers) of the portions of the user's hands to which detection of the positions and postures are not performed are calculated indirect-kinematically from the positions of the fingertips, using data approximating the joints of fingers with the links. As a result, by performing the indirect kinematical calculation as well as the direct kinematical calculation, it is possible to accurately detect the positions and postures of the user's hands and fingers in the virtual reality space.

If storage of data described above is finished, the user similarly confirms the virtual reality display device 5 in which a predetermined message is displayed in accordance with instructions of the information processing means 8 (not shown in steps), and performs an action of grasping an object with two fingers of a forefinger and a thumb of a hand mounted with the force-feedback supply apparatus 2 in a state where nothing exists.

In this state, the position and posture detecting sections 23 detect angles of the joint sections 205 of the arm sections 200 to detect positions of the user's fingertips in the virtual reality space. That is, the position and posture detecting sections 23 detect rotation angles of the corresponding motors 201 using the encoders 208 arranged in the respective joint sections 205, and detect positions and postures of the force-feedback supply sections 206, that is, positions and postures of the user's hands and fingers, using the rotation angle detecting means of the connecting sections 204. Then, the control section 24 transmits the detected data (angle data) to the information processing means 8 through the signal processing section 25 and the signal transmitting/receiving section 26 (step S303).

When receiving the detected data transmitted from the force-feedback supply apparatus 2 through the signal transmitting/receiving section 87, the information processing means 8 inputs the data to the calculation processing section 81 through the control section 84. Then, the calculation processing section 81 calculates positions and postures of the user's fingers and hands in the virtual reality space on the basis of the detected data (step S304), similarly to the step S302. Then, the control section 84 stores the calculation result and the joint angels φi (i=1, 2, . . . ) of the joint sections in a predetermined storage area of the memory section 85.

Figures 27A, 27B:
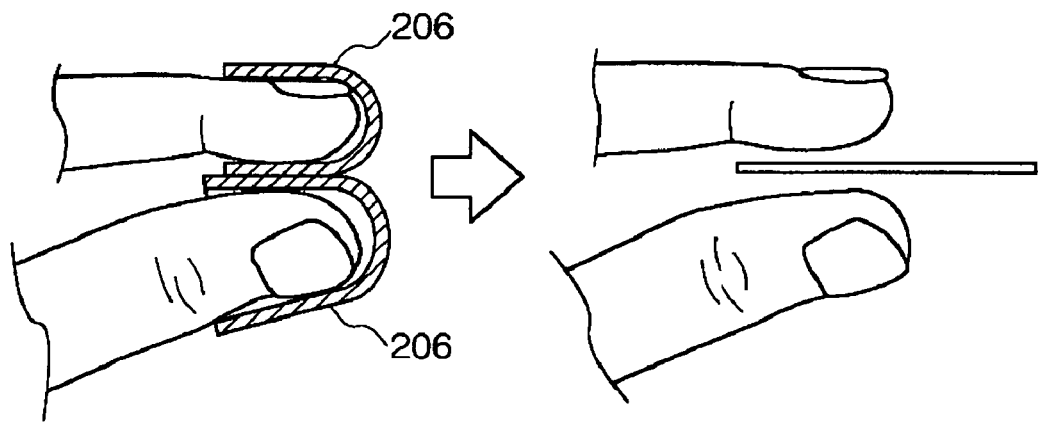
FIG. 27 is a conceptual diagram (before correction) in a case where a sheet of paper is grasped by two fingers mounted with the force-feedback supply means.

If storage of data described above is finished, the image generating section 83 generates the virtual reality image in which the user's hands are fetched, on the basis of the calculation result of the calculation processing section 81 (step S305). Here, a state where the user grasps actually with two fingers mounted with the force-feedback supply apparatus 2 (a state where two fingers are in contact each other) is shown in FIG. 27. In a real space, as shown in FIG. 27A, the user's two fingertips are in contact (interfere) with each other through thicknesses of the force-feedback supply sections 206. On the other hand, as shown in FIG. 27B, since the force-feedback supply sections 206 have a thickness, the virtual reality display device 5 cannot display as if the two fingers are completely in contact with each other in the virtual reality image, so that in the virtual reality space, it is displayed as if the target object (a thin film shaped object such as a paper in FIG. 27) is not in contact between the two fingertips. The positions of the fingertips in a state where the user's fingers take an action of grasping are referred to as real grasp positions.

Figures 28A, 28B:
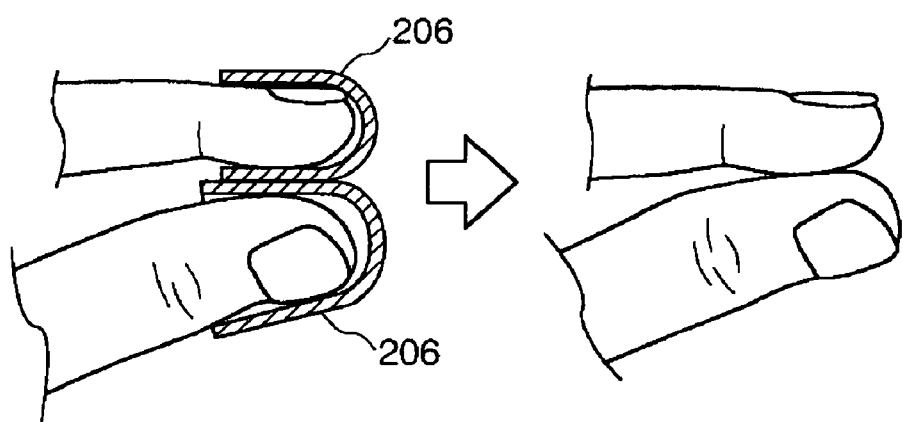
FIG. 28 is a conceptual diagram (after correction) in a case where two fingers mounted with the force-feedback supply means are in contact with each other.

In this state, the image generating section 83 changes (corrects) the virtual reality image from a state in FIG. 27B to a state in FIG. 28B and generates the virtual reality image (step S306), specifies positions of the two fingertips as shown in FIG. 28B, and outputs the positional information (coordinate data) to the calculation processing section 81 through the control section 84. The positions of the fingertips in a state where the user's two fingers are in contact (interfere) with each other are referred to as virtual grasp positions.

Then, the calculation processing section 81 calculates the quantity of deviation in the joint angels of the joint sections 205 on the basis of the quantity of deviation from the real grasp positions to the virtual grasp positions when the positions of the fingertips are deviated due to the aforementioned correction (step S307). The deviation quantity calculation is performed only for one finger (the forefinger in this embodiment) other than a reference finger (the thumb in this embodiment). Accordingly, since the calculation for correcting the virtual reality image is performed only for one fingertip of two fingertips, it is possible to easily perform the calculation in the present invention.

The control section 84 stores the quantity of deviation αi (i=1, 2, . . . ) in the joint angles of the joint sections 205 obtained through the deviation quantity calculation in a predetermined storage area of the memory section 85. Then, on the basis of θi, φi and αi described above, the control section 84 determines a conversion rule for correcting the virtual reality image (step S308). Various methods can be considered as conversion methods used for the conversion rule, but two representative conversion methods are described here.

First, in a first conversion method, the joint angles of the joint sections 205 of the arm sections 200 of the force-feedback supply apparatus 2 are proportionally expanded from a fingertip position of a finger (a forefinger in this embodiment) other than the thumb at the reference posture to the virtual grasp position, on the basis of the quantity of deviation. That is, while the user manipulates the force-feedback supply apparatus 2 according to the present invention, the joint angles of the joint sections 205 of the corresponding arm section 200 are detected at a constant period (for example, 1 or 2 sec) by the encoders 208, and on the basis of the detection result, that is, the joint angles βi (i=1, 2, . . . ) of the joint sections, the calculation processing section 81 calculates the converted joint angles (Equation 2) of the joint sections 205 using constants (Equation 1) specified from the detection result described above.

$$Ki=(\phi i-\theta i+\alpha i)/(\phi i-\theta i) \quad (1)$$

$$\beta \text{ new } i=Ki\cdot(\beta i-\theta i)+\theta i \quad (2)$$

Then, on the basis of the resulted joint angles of the joint sections 205, the image generating section 83 of the information processing means 8 fetches the user's fingers in the virtual reality space to generate (update) the virtual reality image.

Next, in a second conversion method, the quantity of deviation αi in the joint angles of the joint sections 205 detected by the encoders 208 and stored in the memory section 85 is used as it is, and the value is used as an offset value of rotation angles of the motors 201. Specifically, as shown in the step S101 of the aforementioned force-feedback supply process (see FIG. 24), in the force-feedback supply apparatus 2, the rotation angles (joint angles) of the joint sections 205 are detected at a predetermined constant period during drive (manipulation) of the apparatus by the position and posture detecting sections 23. Using the quantity of deviation αi between the detected rotation angles and the joint angles, the calculation processing section 81 calculates the converted joint angles (Equation 3) of the joint sections 205.

$$\beta \text{ new } i=\beta i+\alpha i \quad (3)$$

On the basis of the resulted joint angles of the joint sections 205, the image generating section 83 of the information processing means 8 fetches the user's fingers in the virtual reality space to generate (update) the virtual reality image.

The conversion rule determined in the step S308 is saved (stored) in a predetermined storage area of the memory section 85 of the information processing means 8 (step S309), and the image correcting process is finished. Then, when calibration by the image correcting process is finished, the force-feedback supply apparatus 2 performs the force-feedback supply process (see FIG. 24) as a normal mode during its drive. The joint angles of the joint sections 205 are detected (step S101), and on the basis of them, the positions of the user's fingertips are calculated (step S102). On the basis of the calculation result and the conversion rule stored in the step S309, the image generating section 83 updates and generates the virtual reality image.

Figure 29B:
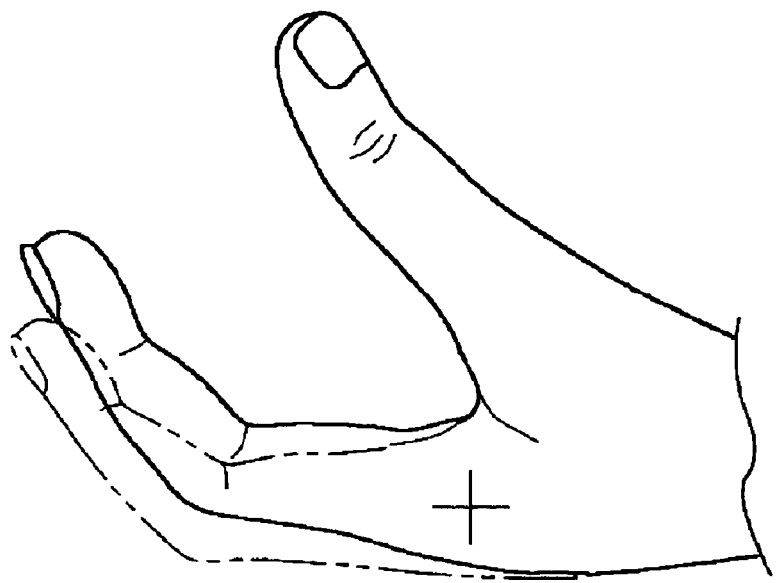
FIG. 29 is a conceptual diagram (before and after correction) in a case where a forefinger is corrected through the image correction process according to the present invention.
Figure 29A:
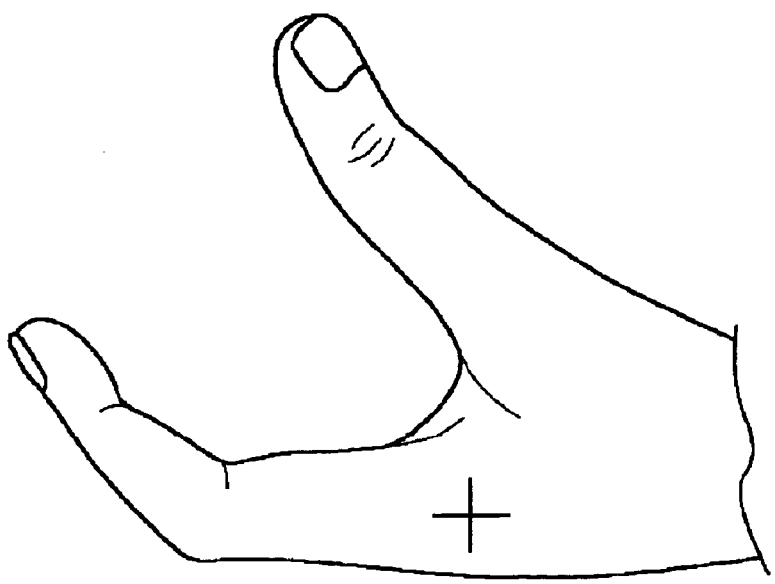

For example, when the second conversion rule is used, as shown in FIG. 29, in a state where the position of the forefinger approaches the position of the user's thumb by the quantity of deviation (distance) corresponding to the thickness of the force-feedback supply section 206, the user's hand is fetched in the virtual reality image and is displayed in the virtual reality display device 5. Further, as shown in FIG. 29B, when the image of the user's fingertips in the virtual reality space is corrected, it is preferable that the thumb is fixed and the image is corrected by the rotation angle (bending angle) of a metacarpophalangeal joint of the forefinger.

Although the two representative conversion methods have been described as a specific image conversion method in this embodiment, the present invention is not limited to this, but may employ any conventional conversion method. Furthermore, in the present invention, the quantity of deviation of the joint angles may be calculated on the basis of the thickness of the force-feedback supply section 206 measured in advance.

As described above, the force-feedback supply apparatus 2, the force-feedback supply system and the image correcting method according to the present invention are constructed to detect the joint angles of the joint sections 205 when the user's hand (fingertips) takes the reference posture and the joint angles of the joint sections 205 when the user's fingertips are in the real grasp positions by means of the encoders 208, to calculate the joint angles of the joint sections 205 in the virtual grasp positions calculated from the real grasp positions, to calculate the quantity of deviation in the joint angles of the joint sections 205 between the real grasp positions and the virtual grasp positions on the basis of the detection result and the calculation result, and then to determine the conversion rule on the basis of the calculated quantity of deviation. After each user performs the calibration using the image correcting method according to the present invention, the force-feedback supply apparatus 2 and the force-feedback supply system 1 present a force-feedback to the user's fingertip mounted with the force-feedback supply apparatus 2 according to the present invention, using the normal force-feedback supply method (for example, the force-feedback supply process shown in the flowchart of FIG. 24).

Therefore, by using the force-feedback supply apparatus 2, the force-feedback supply system 1 and the image correcting method according to the present invention, it is possible to express even positions and postures of sites (a user's fingertips in this embodiment) to which the force-feedback is supplied, in the virtual reality space, wherein they could not been reached (expressed) because the thickness of the force-feedback supply section 206 exists in a real space. Therefore, a user's position and posture can be expressed naturally in the virtual reality space.

Further, in the force-feedback supply apparatus 2 and the force-feedback supply system 1 according to the present invention, when the quantity of deviation of the joint angles obtained in the image correcting method (image correcting process) according to the present invention is thereafter applied to the force-feedback supply process, etc., the image correction of the user's fingertips in the virtual reality image is performed by adjusting the rotation angles of the metacarpophalangeal joints of the fingers other than the thumb, so that it is possible to naturally express the virtual reality image of the present invention using a simple method (without a high-level image correcting method).

Although it has been described in the fifth embodiment that the image correcting method (image correcting process) according to the present invention is applied to the fingertips of the user's thumb and forefinger, the present invention is not limited to this, but may be applied to the fingertips of any two fingers which will come in contact with each other in taking a grasp action, for example, such as the thumb and middle finger, or the thumb and ring finger.

Furthermore, in the fifth embodiment, although the calibration in the user's two fingertips mounted with the force-feedback supply section 206 of the force-feedback supply apparatus 2 has been described, the calibration is not limited to that case (state), but is applicable to, for example, interference (contact) between a target object in the virtual reality space and each of the user's fingertips. In this case, the present invention is applicable to the respective fingertips in contact with the target object, and the image in which positions of the user's fingertips is corrected in the virtual reality image is generated by means of the image generating section 83 of the information processing means 8.

Furthermore, in the present invention, any two or more constructions (features) in the embodiments described above may be properly combined. That is, in the present invention, the force-feedback supply apparatus 2 according to the fifth embodiment may be combined with the tactual sense generating section 21 according to other embodiments.

Furthermore, although the force-feedback supply system 1 according to the present invention is constructed to generate the virtual reality image by means of the image generating section 83 of the information processing means 8 and display the virtual reality image in the virtual reality display device 5, the present invention is not limited to application to the virtual reality space, but may comprise, for example, only the force-feedback supply apparatus 2 and the information processing means 8 without displaying the virtual reality image. Furthermore, the force-feedback supply system 1 according to the present invention may comprise only one apparatus into which the respective means is incorporated, that is, only the force-feedback supply apparatus.

Hitherto, although constructions of the force-feedback supply apparatus and the force-feedback supply system according to the present invention have been described in conjunction with the illustrated embodiments, the present invention is not limited to the embodiments, but constructions of the respective sections may be replaced with arbitrary constructions having the same functions.

The entire disclosure of Japanese Patent Application No. 2002-382473 filed Dec. 27, 2002 is incorporated by reference.

What is claimed is:

1. A force-feedback supply apparatus, comprising:
    image generating means for generating a virtual reality image;
    display means for displaying the virtual reality image generated by the image generating means;
    force-feedback generating means for generating a force-feedback to be supplied to a user's finger in accordance with the virtual reality image;
    force-feedback supply means mounted on the finger for supplying the force-feedback generated by the force-feedback generating means to the finger; and
    image correcting means for correcting the virtual reality image generated by the image generating means, such that when a fingertip mounted with the force-feedback supply means comes in contact with a target object, the quantity of deviation corresponding to a thickness of the force-feedback supply means is removed from the virtual reality image displayed by the display means.

2. A force-feedback supply apparatus, comprising:
    image generating means for generating a virtual reality image;
    display means for displaying the virtual reality image generated by the image generating means;
    force-feedback generating means for generating a force-feedback to be supplied to a user's finger in accordance with the virtual reality image;
    force-feedback supply means mounted on the finger for supplying the force-feedback generated by the force-feedback generating means to the finger; and
    image correcting means for correcting the virtual reality image generated by the image generating means, such that when two fingertips mounted with the force-feedback supply means come in contact with each other, the quantity of deviation corresponding to a thickness of the force-feedback supply means is removed from the virtual reality image displayed by the display means.

3. A force-feedback supply apparatus according to claim 1, wherein the display means displays an indication to the user, such that the virtual reality image is corrected by the image correcting means when the force-feedback supply means is first mounted on the user.

4. A force-feedback supply apparatus according to claim 1, further comprising position detecting means for detecting a position of the finger mounted with the force-feedback supply means in the virtual reality space,
    wherein the image correcting means removes the quantity of deviation corresponding to the thickness of the force-feedback supply means on the basis of positional information of the two fingertips detected by the position detecting means.

5. A force-feedback supply apparatus according to claim 4, wherein the position detecting means detects positions of the fingertips in the virtual reality space, in a state where the two fingertips of the user mounted with the force-feedback supply means are at a reference posture, and
    wherein the image correcting means corrects the virtual reality image on the basis of relative positional information of positions of the two fingertips when the two fingertips are in contact with each other and positions of the two fingertips at the reference posture, and relative positional information of positions of the two fingertips when the quantity of deviation corresponding to the thickness of the force-feedback supply means is removed and the positions of the two fingertips at the reference posture, such that a position of one fingertip of the two fingertips in the virtual reality space is a position proportionally expanded from a position of the other fingertip between the position at the reference posture and the contact position when the quantity of deviation corresponding to the thickness of the force-feedback supply means is removed.

6. A force-feedback supply apparatus according to claim 1, wherein the image correcting means corrects the virtual reality image by offsetting the quantity of deviation corresponding to the thickness of the force-feedback supply means.

7. A force-feedback supply apparatus according to claim 1, wherein the force-feedback supply means comprises an arm section having a plurality of links and a plurality of joints for connecting the links, a force-feedback supply section mounted on the finger, and a connecting section for connecting the arm section and the force-feedback supply section to each other.

8. A force-feedback supply apparatus according to claim 7, wherein the force-feedback generating means comprises a plurality of actuators which are motors arranged in each of the plurality of joints.

9. A force-feedback supply apparatus according to claim 4, wherein the force-feedback supply means comprises an arm section having a plurality of links and a plurality of joints for connecting the links, a force-feedback supply section mounted on the finger, and a connecting section for connecting the arm section and the force-feedback supply section to each other; the force-feedback generating means comprises a plurality of motors arranged in each of the plurality of joints; and the position detecting means detects the position of the fingertip by detecting respective rotational angles of the plurality of motors by means of a plurality of encoders connected to output shafts of the plurality of motors.

10. A force-feedback supply apparatus according to claim 4, further comprising:
    interference judging means for judging whether the finger interferes with the target object or not, on the basis of the positional information of the finger detected by the position detecting means in the virtual reality space and positional information of the target object predetermined in the virtual reality space; and
    calculating means for calculating an operating force to be supplied to the finger on the basis of physical property data and state-quantity data of the target object when it is judged by the interference judging means that the finger interferes with the target object,
    wherein the force-feedback generating means generates a force-feedback to be supplied to the user's fingertip by the force-feedback supply means on the basis of the calculation result of the calculating means.

11. An image correcting method of a force-feedback supply apparatus, comprising:
    generating a virtual reality image;
    displaying the generated virtual reality image;
    generating a force-feedback to be supplied to a user's finger in accordance with the virtual reality image; and
    supplying the force-feedback to the finger through a force-feedback supply section mounted on the finger;
    wherein the virtual reality image is corrected, such that the quantity of deviation corresponding to a thickness of the force-feedback supply section is removed to bring the fingertip into contact with a target object in the virtual reality image displayed when the user's fingertip mounted with the force-feedback supply section comes in contact with the target object.

12. An image correcting method of a force-feedback supply apparatus, comprising:
  generating a virtual reality image;
  displaying the generated virtual reality image;
  generating a force-feedback to be supplied to a user's finger in accordance with the virtual reality image; and
  supplying the force-feedback to the finger through a force-feedback supply section mounted on the finger;
  wherein the virtual reality image is corrected, such that the quantity of deviation corresponding to a thickness of the force-feedback supply section is removed to bring two fingertips into contact with each other in the virtual reality image displayed when the user's two fingertips mounted with the force-feedback supply section come in contact with each other.

13. An image correcting method according to claim 11, wherein a position of the user's finger mounted with the force-feedback supply section in the virtual reality space is detected, and the virtual reality image is corrected to remove the quantity of deviation corresponding to the thickness of the force-feedback supply section on the basis of the detected positional information of the fingertip.

14. An image correcting method according to claim 12, wherein positions of the user's two fingertips in the virtual reality space are detected in a state where the user's two fingertips mounted with the force-feedback supply section are at a reference posture, positions of the two fingertips in a state where the two fingertips are in contact with each other are detected, positions of the two fingertips in the virtual reality space when the quantity of deviation corresponding to the thickness of the force-feedback supply section is removed are calculated on the basis of the positional information in a state where the two fingertips are in contact with each other, and the virtual reality image is corrected on the basis of relative positional information of the positions of the two fingertips at the reference posture and the positions of the two fingertips in a state where the two fingertips are in contact with each other or on the basis of the calculated positions of the two fingertips, such that a position of one fingertip of the two fingertips in the virtual reality space is a position proportionally expanded from a position of the other fingertip between the position at the reference posture and the contact position when the quantity of deviation corresponding to the thickness of the force-feedback supply section is removed.

15. An image correcting method according to claim 12, wherein a position of one fingertip of the two fingertips to be displayed in the virtual reality image is corrected by offsetting the quantity of deviation corresponding to the thickness of the force-feedback supply section.

16. A force-feedback supply apparatus according to claim 2, wherein the display means displays an indication to the user, such that the virtual reality image is corrected by the image correcting means when the force-feedback supply means is first mounted on the user.

17. A force-feedback supply apparatus according to claim 2, further comprising position detecting means for detecting a position of the finger mounted with the force-feedback supply means in the virtual reality space,
  wherein the image correcting means removes the quantity of deviation corresponding to the thickness of the force-feedback supply means on the basis of positional information of the two fingertips detected by the position detecting means.

18. A force-feedback supply apparatus according to claim 17, wherein the position detecting means detects positions of the fingertips in the virtual reality space, in a state where the two fingertips of the user mounted with the force-feedback supply means are at a reference posture, and
  wherein the image correcting means corrects the virtual reality image on the basis of relative positional information of positions of the two fingertips when the two fingertips are in contact with each other and positions of the two fingertips at the reference posture, and relative positional information of positions of the two fingertips when the quantity of deviation corresponding to the thickness of the force-feedback supply means is removed and the positions of the two fingertips at the reference posture, such that a position of one fingertip of the two fingertips in the virtual reality space is a position proportionally expanded from a position of the other fingertip between the position at the reference posture and the contact position when the quantity of deviation corresponding to the thickness of the force-feedback supply means is removed.

19. A force-feedback supply apparatus according to claim 2, wherein the image correcting means corrects the virtual reality image by offsetting the quantity of deviation corresponding to the thickness of the force-feedback supply means.

20. A force-feedback supply apparatus according to claim 2, wherein the force-feedback supply means comprises an arm section having a plurality of links and a plurality of joints for connecting the links, a force-feedback supply section mounted on the finger, and a connecting section for connecting the arm section and the force-feedback supply section to each other.

21. A force-feedback supply apparatus according to claim 20, wherein the force-feedback generating means comprises a plurality of actuators which are motors arranged in each of the plurality of joints.

22. A force-feedback supply apparatus according to claim 17, wherein the force-feedback supply means comprises an arm section having a plurality of links and a plurality of joints for connecting the links, a force-feedback supply section mounted on the finger, and a connecting section for connecting the arm section and the force-feedback supply section to each other; the force-feedback generating means comprises a plurality of motors arranged in each of the plurality of joints; and the position detecting means detects the position of the fingertip by detecting respective rotational angles of the plurality of motors by means of a plurality of encoders connected to output shafts of the plurality of motors.

23. A force-feedback supply apparatus according to claim 17, further comprising:
  interference judging means for judging whether the finger interferes with the target object or not, on the basis of the positional information of the finger detected by the position detecting means in the virtual reality space and positional information of the target object predetermined in the virtual reality space; and
  calculating means for calculating an operating force to be supplied to the finger on the basis of physical property data and state-quantity data of the target object when it is judged by the interference judging means that the finger interferes with the target object,
  wherein the force-feedback generating means generates a force-feedback to be supplied to the user's fingertip by the force-feedback supply means on the basis of the calculation result of the calculating means.

24. An image correcting method according to claim 12, wherein a position of the user's finger mounted with the force-feedback supply section in the virtual reality space is detected, and the virtual reality image is corrected to remove the quantity of deviation corresponding to the thickness of the force-feedback supply section on the basis of the detected positional information of the fingertip.

25. A force-feedback supply apparatus comprising:
a virtual reality image generator;
a display communicating with the image generator and displaying a virtual reality image generated by the image generator;
a force-feedback generator generating force-feedback to be supplied to a user's finger, the force-feedback corresponding to the virtual reality image on the display;
a force-feedback supplier mounted on the finger and communicating with the force-feedback generator, the force-feedback supplier supplying the force-feedback to the finger; and
an image corrector communicating with the image generator and correcting the virtual reality image generated by the image generator such that when a finger mounted with the force-feedback supplier comes in contact with a target object, a deviation corresponding to a thickness of the force-feedback supplier is removed from the virtual reality image on the display.

\* \* \* \* \*